(12) United States Patent
Tsuchida et al.

(10) Patent No.: US 12,147,547 B2
(45) Date of Patent: Nov. 19, 2024

(54) INFORMATION PROCESSING APPARATUS, SECURE COMPUTATION METHOD, AND PROGRAM

(71) Applicant: NEC Corporation, Tokyo (JP)

(72) Inventors: Hikaru Tsuchida, Tokyo (JP); Toshinori Araki, Tokyo (JP); Kazuma Ohara, Tokyo (JP); Takuma Amada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 594 days.

(21) Appl. No.: 17/429,780

(22) PCT Filed: Feb. 12, 2019

(86) PCT No.: PCT/JP2019/004793
§ 371 (c)(1),
(2) Date: Aug. 10, 2021

(87) PCT Pub. No.: WO2020/165931
PCT Pub. Date: Aug. 20, 2020

(65) Prior Publication Data
US 2022/0129567 A1    Apr. 28, 2022

(51) Int. Cl.
*G06F 21/60*    (2013.01)
*G06F 7/58*    (2006.01)
(Continued)

(52) U.S. Cl.
CPC ............ *G06F 21/602* (2013.01); *G06F 7/588* (2013.01); *G06F 7/764* (2013.01); *G06F 21/31* (2013.01); *H04L 2209/46* (2013.01)

(58) Field of Classification Search
CPC ........ G06F 21/602; G06F 7/588; G06F 7/764; G06F 21/31; G06F 21/44; G06F 21/445;
(Continued)

(56) References Cited

U.S. PATENT DOCUMENTS

2015/0193633 A1    7/2015    Chida et al.
2016/0218862 A1    7/2016    Ikarashi et al.
(Continued)

FOREIGN PATENT DOCUMENTS

JP    2011199821 A    10/2011
JP    2017028617 A    2/2017
(Continued)

OTHER PUBLICATIONS

International Search Report for PCT Application No. PCT/JP2019/004793, mailed on May 14, 2019.
(Continued)

*Primary Examiner* — Shaqueal D Wade-Wright

(57) ABSTRACT

The information processing apparatus comprises a basic operation seed storage part, a reshare value computation part, and a share construction part. The basic operation seed storage part stores a seed for generating a random number used when computation is performed on a share. The reshare value computation part generates a random number using the seed, computes a share reshare value using the generated random number, and transmits data regarding the generated random number to other apparatuses. The share construction
(Continued)

part constructs a share for type conversion using the data regarding the generated random number and the share reshare value received from other apparatuses.

20 Claims, 25 Drawing Sheets

(51) Int. Cl.
 *G06F 7/76* (2006.01)
 *G06F 21/31* (2013.01)
(58) Field of Classification Search
 CPC ..... H04L 2209/46; H04L 9/06; H04L 9/0662; H04L 9/0861; H04L 9/0869; G09C 1/00
 See application file for complete search history.

(56) References Cited

U.S. PATENT DOCUMENTS

| | | | |
|---|---|---|---|
| 2016/0335924 A1* | 11/2016 | Ikarashi | .................. G09C 1/00 |
| 2018/0225431 A1 | 8/2018 | Ikarashi et al. | |
| 2021/0209247 A1* | 7/2021 | Mohassel | ............. A63B 21/023 |
| 2022/0006614 A1* | 1/2022 | Mishina | ................. H04L 9/085 |
| 2022/0141000 A1* | 5/2022 | Tsuchida | .............. H04L 9/0869 380/28 |

FOREIGN PATENT DOCUMENTS

| | | | |
|---|---|---|---|
| TW | 201040743 A | * | 11/2010 |
| WO | 2014007311 A1 | | 1/2014 |
| WO | 2015053185 A1 | | 4/2015 |

OTHER PUBLICATIONS

T. Araki et al., "High-Throughput Semi-Honest Secure Three-Party Computation with an Honest Majority", 2016, Proceedings of the 2016 ACM SIGSAC Conference on Computer and Communications Security (CCS'16), ACM, Viena, Austria, Oct. 24, 2016, pp. 1-13.

T. Araki et al., "Optimized Honest-Majority MPC for Malicious Adversaries—Breaking the 1 Billion-Gate Per Second Barrier", 2017, IEEE Symposium on Security and Privacy, pp. 843-862.

T. Araki et al., "Generalizing the SPDZ Compiler For Other Protocols", Cryptology ePrint Archive [online], Oct. 2018, Report 2018/762, Ver. 20181002:054546, pp. 1-35.

S. Dov Gordon et al., "Secure Computation with Low Communication from Crosschecking", Cryptology ePrint Archive, Report 2018/216, 2018, pp. 1-24, (https://eprint.iacr.org/2018/216).

I. Damgård et al., "Unconditionally Secure Constant-Rounds Multi-Party Computation for Equality, Comparison, Bits and Exponentiation", Theory of Cryptography Conference, Springer, Berlin, Heidelberg, 2006, pp. 1-20.

P. Mohassel et al., "ABY3: A Mixed Protocol Framework for Machine Learning", Cryptology ePrint Archive [online], Sep. 2018, Report 2018/403, Ver. 20180907:215141, pp. 1-40, [retrieved on Apr. 26, 2019] <URL: https://eprint.iacr.org/2018/403/20180907:215141>.

K. Ohara et al., "Multiparty Computation Capable of Detecting Impropriety with Intermingled Loops of Different Sizes", Proceedings of the 2018 Symposium on Cryptography and Information Security (SCIS 2018), 2AI-4, Jan. 23, 2018, pp. 1-8.

\* cited by examiner

INFORMATION PROCESSING APPARATUS, SECURE COMPUTATION METHOD, AND PROGRAM

This application is a National Stage Entry of PCT/JP2019/004793 filed on Feb. 12, 2019, the contents of all of which are incorporated herein by reference, in their entirety.

FIELD

The present invention relates to an information processing apparatus, secure computation method, and program, and particularly to an information processing apparatus, secure computation method, and program with respect to the type conversion of shares in four-party secure computation capable of detecting dishonesty.

BACKGROUND

In recent years, research and development on secure computation have been quite active. In secure computation, predetermined processing can be executed and the results can be obtained while input data remain secret.

Secure computation protocols are roughly divided into two types. Secure computation protocols in the first type can be executed only for a specific computation. Ones in the second type can perform any computation. Further, the second type includes various methods with tradeoffs between various costs such as the communication volume (data amount) and the number of communication rounds. For instance, there are methods offering a small communication volume but many communication rounds, or ones offering fewer communication rounds but a large communication volume.

A typical secure computation protocol is multiparty computation (MPC). MPC is a secure computation protocol in which an arbitrary function can be calculated by a plurality of participants while each participant's input is concealed. There are several MPC methods, but a method that has attracted attention in recent years is the secret-sharing-based MPC, in which input is distributed to each participants. Here, distributed data are referred to as shares. The participants compute the desired function using their own shares and cooperating with each other. Here, since the shared format is maintained for the values during the computation process, the original input and the values during the computation process are not revealed. Only the shares of the final computation result are reconstructed, and any function can be computed securely. Hereinafter, when $n \geq 2$, a share of the value $x \in \mathbb{Z}_{2^n}$ is denoted as $[x]^n$. When $n=1$, a share of the value $x \in \mathbb{Z}_{\epsilon_2}$ is denoted as $[x]$.

Here, MPC mainly achieves two types of security. One is secrecy and the other is correctness. Secrecy guarantees that the information with respect to input is not leaked to the participants even if there is a potential adversary when MPC is executed. Correctness guarantees that the execution result is correct even if there is a potential adversary when a secure computation protocol is executed.

Here, there are several indicators for the "potential adversaries." As a typical indicator, the first is the behavior of an adversary. The second is the ratio of adversaries among participants.

In terms of the adversarial behavior, typical types of adversaries include semi-honest adversaries and malicious adversaries. Semi-honest adversaries follow the protocol but try to obtain as much information as possible. Malicious adversaries attempt to increase the amount of information they can obtain by behaving in a way that deviates from the protocol. Here, the behaviors deviating from the protocol include, for instance, tampering with transmitted data by performing bit inversion on the data that should be simply transmitted.

In terms of the ratio of adversaries among participants, there are two main cases. The first is a case where the majority is dishonest. The second is a case where the majority is honest. Here, let n be the total number of participants and t be the number of adversaries. A dishonest majority means that $t<n$ holds. An honest majority means that $t<n/2$ holds. An honest majority also includes a case where $t<n/3$ holds, however, unless otherwise specified, an honest majority herein denotes a case where $t<n/2$ holds.

Three-party computation is MPC that has been attracting attention in recent years. Non-Patent Literature 1 discloses three-party computation with an honest majority and semi-honest adversaries. The MPC disclosed in Non-Patent Literature 1 performs arithmetic operations on $\mathbb{Z}_{2^n}$. The MPC disclosed in Non-Patent Literature 1 requires a communication cost of 3n bits for each multiplication on $\mathbb{Z}_{2^n}$. In other words, each multiplication can be performed with a communication cost of n bits per participant.

Non-Patent Literature 2 discloses three-party computation with an honest majority and malicious adversaries. This is based on the method of Non-Patent Literature 1. Unlike the MPC disclosed in Non-Patent Literature 1, the MPC disclosed in Non-Patent Literature 2 allows the presence of a malicious adversary. In the MPC disclosed in Non-Patent Literature 2, it is possible to detect cheating by a malicious adversary probabilistically. The higher the detection probability is, i.e., the lower the probability of successful cheating is, the more the communication cost increases. For instance, when the probability of successful cheating is $2^{-40}$, in Non-Patent Literature 2, a communication cost of 21n bits is required for each multiplication on $\mathbb{Z}_{2^n}$. In other words, a multiplication with a cheating detection function can be performed with a communication cost of 7n bits per participant.

Non-Patent Literature 3 proposes a method for converting the type of a share in Non-Patent Literature 1. For instance, in the share type conversion, from $[x]^n$, a series of shares $$[x_0], \ldots, [x_{n-1}](x = \Sigma_{i=0}^{n-1} 2^i \cdot x_i, x_i \in \mathbb{Z}_2).$$

can be obtained. This type conversion is called bit decomposition. Further, in another example of the type conversion, $[x]^n$ is obtained from $$[x_0], \ldots, [x_{n-1}](x = \Sigma_{i=0}^{n-1} 2^i \cdot x_i, x_i \in \mathbb{Z}_2).$$

This type conversion is called ring composition.

Non-Patent Literature 3 discloses that, for instance, bit decomposition requires a communication cost of 6n–6 bits. Such processing is important when it is desired to efficiently execute MPC on a mixed circuit in which an arithmetic circuit and a logic circuit are mixed. For instance, when the bit decomposition proposed in Non-Patent Literature 3 is executed using the method of Non-Patent Literature 2, the presence of a malicious adversary may be allowed, but the communication cost is 42n–42 bits.

In many cases, the communication cost in MPC is lower with fewer participants and an honest majority. Therefore, many regard the three-party computation described above as a computationally efficient method. However, when the potential adversary is a malicious one, four-party computation may be more computationally efficient.

For instance, Non-Patent Literature 4 discloses four-party computation when $t<n/3$, i.e., $t=1$, and the adversary is a malicious one. The MPC disclosed in Non-Patent Literature 4 requires a communication cost of 6n bits for each multiplication on $\mathbb{Z}_{2^n}$. In other words, each multiplication can be performed with a communication cost of 1.5n bits per participant. Non-Patent Literature 4, however, does not propose method-specific type conversion. Therefore, for instance, bit decomposition such as one disclosed in Non-Patent Literature 5 must be used.

Since the method proposed by Non-Patent Literature 5 performs bit decomposition over a ring, a series of shares $$[x_0]^n, \ldots, [x_{n-1}]^n (x = \Sigma_{i=0}^{n-1} 2^i \cdot x_i, x_i \in \mathbb{Z}_2)$$

is computed from $[x]^n$. Therefore, a result of the bit decomposition protocol of Non-Patent Literature 5 cannot be used for computation on $\mathbb{Z}_2$, and it is inefficient for the computation of a mixed circuit.

[Non-Patent Literature 1]

T. Araki et al., "High-Throughput Semi-Honest Secure Three-Party Computation with an Honest Majority," 2016, In Proceedings of the 2016 ACM SIGSAC Conference on Computer and Communications Security (CCS'16), ACM, New York, NY, USA, 805-817.

[Non-Patent Literature 2]

T. Araki et al., "Optimized Honest-Majority MPC for Malicious Adversaries-Breaking the 1 Billion-Gate Per Second Barrier," 2017, IEEE Symposium on Security and Privacy (SP), San Jose, California, USA, 2017, pp. 843-862.

[Non-Patent Literature 3]

T. Araki et al., "Generalizing the SPDZ Compiler For Other Protocols," 2018, In Proceedings of the 2018 ACM SIGSAC Conference on Computer and Communications Security (CCS'18), ACM, New York, NY, USA, 880-895.

[Non-Patent Literature 4]

S. Dov Gordon et al., "Secure Computation with Low Communication from Cross-checking," Cryptology ePrint Archive, Report 2018/216, 2018, https://eprint.iacr.org/2018/216.

[Non-Patent Literature 5]

I. Damgård et al., "Unconditionally Secure Constant-Rounds Multi-Party Computation for Equality, Comparison, Bits and Exponentiation," In Theory of Cryptography Conference (pp. 285-304), Springer, Berlin, Heidelberg, 2006.

SUMMARY

The disclosure of each Non-Patent Literature cited above is incorporated herein in its entirety by reference thereto. The following analysis is given by the present inventors.

In the execution of MPC, it is desired to reduce the communication cost as much as possible. The communication cost includes the communication volume and the number of communication rounds, and the communication volume becomes particularly important when the efficiency in terms of the number of processed cases per unit time is prioritized.

For instance, when t<n<3, i.e., t=1, and an adversary is a malicious one, four-party computation can achieve each multiplication on $\mathbb{Z}_{2^n}$ with a communication cost of 5n bits. In other words, each multiplication can be performed with a communication cost of 1.25n bits per participant. This is a method using 2-out-of-4 replicated secret sharing.

When each party is P_i (i=1, . . . , 4), let shares of $x \in \mathbb{Z}_{2^n}$ (n≥2) be $[x]^n = ([x]_1^n, [x]_2^n, [x]_3^n, [x]_4^n)$ and let $[x]_i^n$ be the share of P_i. Further, let shares of $x \in \mathbb{Z}_2$ be $[x] = ([x]_1, [x]_2, [x]_3, [x]_4)$ and let $[x]_i$ be the share of P_i. Here, if $x = x_1 + x_2 + x_3$ for $x \in \mathbb{Z}_{2^n}$ (n≥2), $[x]_1^n = (x_1, x_2), [x]_2^n = (x_2, x_3), [x]_3^n = (x_3, x_1)$, $[x]_4^n = (x_1 - x_2, x_2 - x_3)$. Further, if $x = x_1 \oplus x_2 \oplus x_3$ for $x \in \mathbb{Z}_2$, $[x]_1 = (x_1, x_2), [x]_2 = (x_2, x_3), [x]_3 = (x_3, x_1), [x]_4 = (x_1 \oplus x_2, x_2 \oplus x_3)$.

Further, let $seed_i, sid \in \{0,1\}^* (i=1, 2, 3, 4)$ and a pseudo-random function $h: \{0,1\}^* \times \{0,1\}^* \to \{0,1\}^n$. Further, let $\|$ be a string concatenation operator. Here, P_1 has $(seed_1, seed_2, seed_4)$, P_2 has $(seed_2, seed_3, seed_4)$, P_3 has $(seed_3, seed_i, seed_4)$, and P_4 has $(seed_1, seed_2, seed_3)$, respectively.

Note that, with respect to $seed_1, sid$, it is intended to create a situation where one of the parties cannot compute the output of h, and the other three parties can compute the output of h. If this situation can be created, the handling of $seed_i, sid$ is not particularly limited. Here $seed_i$, sid are merely an example.

Here, let +, −, · be an additive operator, subtraction operator, and multiplicative operator with respect to shares on $\mathbb{Z}_{2^n}$ (n≥2). Further, note that these are also used hereinafter as an additive operator, subtraction operator, and multiplicative operator, which serve as binary operators for elements of $\mathbb{Z}_{2^n}$ (n≥2). When a, b, $c \in \mathbb{Z}_{2^n}$ for the additive operator and the multiplicative operator with respect to shares on $\mathbb{Z}_{2^n}$ (n≥2), the following four equations hold.

$$[a]^n + [b]^n = [a+b]^n,$$

$$[a]^n + c = [a+c]^n,$$

$$[a]^n \cdot [b]^n = [a \cdot b]^n,$$

$$[a]^n \cdot c = [a \cdot c]^n.$$

Further, let $\oplus$, · be the exclusive OR and logical conjunction with respect to shares on $\mathbb{Z}_2$. Further, note that these are also used hereinafter as exclusive OR and logical conjunction operators, which serve as binary operators for elements of $\mathbb{Z}_2$. When a, b, $c \in \mathbb{Z}_2$ for the exclusive OR and logical conjunction with respect to shares on $\mathbb{Z}_2$, the following four equations hold.

$$[a] \oplus [b] = [a \oplus b],$$

$$[a] \oplus c = [a \oplus c],$$

$$[a] \cdot [b] = [a \cdot b],$$

$$[a] \cdot c = [a \cdot c].$$

For instance, in the four-party computation using 2-out-of-4 replicated secret sharing, $$[a+b]_1^n = ((a_1 b_1), (a_2 + b_2)),$$

$$[a+b]_2^n = ((a_2 b_2), (a_3 + b_3)),$$

$$[a+b]_3^n = ((a_3 b_3), (a_1 + b_1)),$$

$$[a+b]_4^n = ((a_1 - a_2) + (b_1 - b_2), (a_2 - a_3) + (b_2 - b_3)) =$$
$$((a_1 + b_1) - (a_2 + b_2), (a_2 + b_2) - (a_3 + b_3)),$$

and, $[a+b]^n$ can be computed from $[a]^n$, $[b]^n$. Further, when $c = a \cdot b$, $[c]^n$ can be computed in the following procedure using $[a]^n$, $[b]^n$.

1. Each party (P_1 to P_3) performs the following computations.

P_1:

$$u_1 = a_1 \cdot b_1 + h(sid\|1, seed_4),$$

$$u_2 = a_2 \cdot b_2 + h(sid\|2, seed_4),$$

$c_1=(a_1+a_2)\cdot(b_1+b_2)-a_1\cdot b_1+h(sid,seed_1)-h(sid,seed_2)-h(sid\|2,seed_4)+h(sid\|3,seed_4),$ $v_1=u_1-u_2.$

P_2:

$u_2=a_2\cdot b_2+h(sid\|2,seed_4),$ $u_3=a_3\cdot b_3+h(sid\|3,seed_4),$ $c_2=(a_2+a_3)\cdot(b_2+b_3)-a_2\cdot b_2+h(sid,seed_2)-h(sid,seed_3)-h(sid\|3,seed_4)+h(sid\|1,seed_4),$ $v_2=u_2-u_3.$

P_3:

$u_3=a_3\cdot b_3+h(sid\|3,seed_4),$ $u_1=a_1\cdot b_1+h(sid\|1,seed_4),$ $c_3=(a_3+a_1)\cdot(b_3+b_1)-a_3\cdot b_3+h(sid,seed_3)-h(sid,seed_1)-h(sid\|1,seed_4)+h(sid\|2,seed_4),$ $v_3=u_3-u_1.$ 2. After completing the above computations, each party performs the following communication.

P_1 transmits $c_1$ to P_3.
P_2 transmits $c_2$ to P_1.
P_3 transmits $c_3$ to P_2.
P_1 transmits $v_1$ to P_4.
P_2 transmits $v_2$ to P_4.

3. Using information acquired from the communication above, each party performs the following computations to obtain $[c]_i^n$.

$[c]_1^n=(c_1,c_2),$ $[c]_2^n=(c_2,c_3),$ $[c]_3^n=(c_3,c_1),$ $[c]_4^n=(c_1-c_2,c_2-c_3).$

Further, P_4's share is computed as follows.
P_4:

$c_2=-(x_1-x_2)\cdot(y_1-y_2)+(x_2-x_3)\cdot(y_2-y_3)+v_2-v_3+h(sid,seed_1)-2\cdot h(sid,seed_2)+h(sid,seed_3),$ $c_2-c_3=-(x_2-x_3)\cdot(y_2-y_3)+(x_3-x_1)\cdot(y_3-y_1)+v_3-v_1+h(sid,seed_2)-2\cdot h(sid,seed_3)+h(sid,seed_1).$ Since constant multiplication and addition of shares are evident to a skilled person, the description thereof will be omitted. Further, the computation of shares on $\mathbb{Z}_2$ can be executed in the same way as the computation of shares on $\mathbb{Z}_{2^n}$, therefore the description thereof will be omitted. Even when a malicious adversary is present among the parties, each party can verify whether or not a value has been corrupted using his own share and the values received from the other parties. If any value has been corrupted, the protocol will be aborted.

In the four-party computation using 2-out-of-4 replicated secret sharing, however, it is difficult to perform type conversion. This is because the share format is different and the method disclosed in Non-Patent Literature 3 cannot be directly used. Further, a general type conversion method such as one disclosed in Non-Patent Literature 5 is performed over a ring in which the bit length of the order is 2 or more, and the computation efficiency of the logic circuit part in a mixed circuit is poor. Therefore, when one wants to efficiently perform the computation of a mixed circuit by means of MPC capable of detecting dishonesty, efficient type conversion processing executable in the four-party computation disclosed in Non-Patent Literature 4 or the four-party computation using 2-out-of-4 replicated secret sharing is desired.

It is a main object of the present invention to provide an information processing apparatus, secure computation method, and program contributing to the execution of efficient type conversion processing in four-party computation using 2-out-of-4 replicated secret sharing.

Solution to Problem

According to a first aspect of the present invention or the present disclosure, there is provided an information processing apparatus comprising a basic operation seed storage part that stores a seed for generating a random number used in computing on a share; a reshare value computation part that generates a random number using the seed, computes a reshare value using the generated random number, and transmits data regarding the generated random number to other apparatuses; and a share construction part that constructs a share for type conversion using the data regarding the generated random number and the reshare value received from other apparatuses.

According to a second aspect of the present invention or the present disclosure, there is provided a secure computation method including a step of generating a random number using a seed; of computing a reshare value using the generated random number and transmitting data regarding the generated random number to other apparatuses; and constructing a share for type conversion using the data regarding the generated random number and the reshare value received from other apparatuses.

According to a third aspect of the present invention or the present disclosure, there is provided a program causing a computer to execute generating a random number using a seed; computing a reshare value using the generated random number and transmitting data regarding the generated random number to other apparatuses; and constructing a share for type conversion using the data regarding the generated random number and the reshare value received from other apparatuses.

Further, this program can be stored in a computer-readable storage medium. The storage medium may be non-transient one such as a semiconductor memory, a hard disk, a magnetic recording medium, an optical recording medium, and the like. The present invention can be realized as a computer program product.

According to each aspect of the present invention or the present disclosure, there is provided an information processing apparatus, secure computation method, and program contributing to the execution of type conversion that can be computed efficiently including the computation part of a logic circuit when a mixed circuit is computed by means of four-party computation using 2-out-of-4 replicated secret sharing.

MODES

Figure 1:
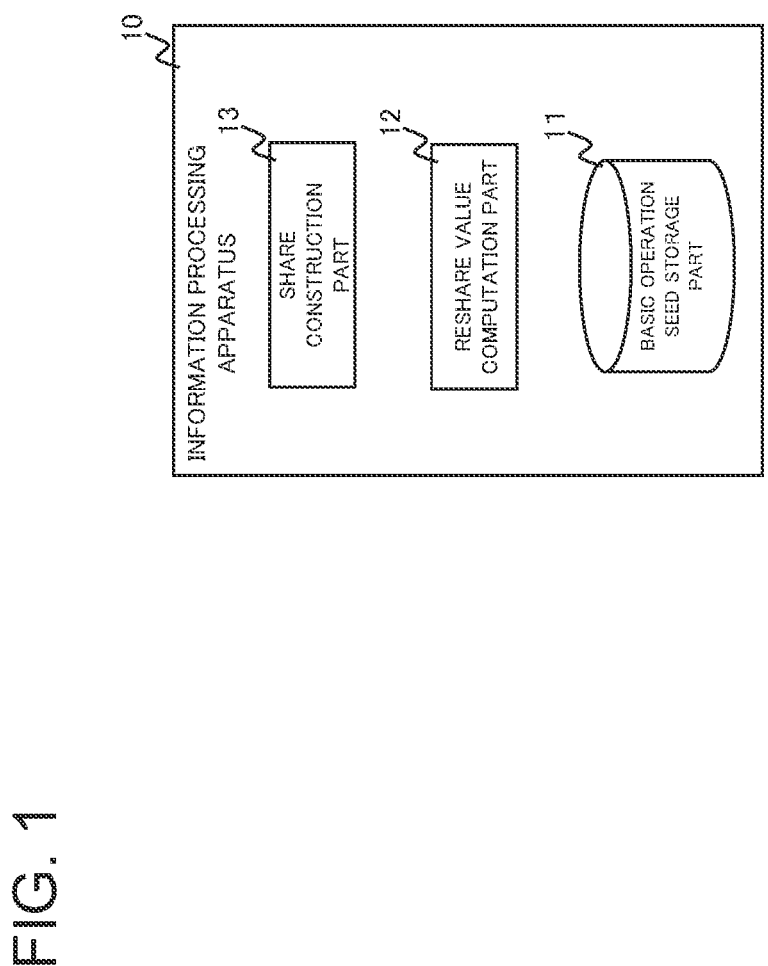
FIG. 1 is a drawing for explaining an outline of an example embodiment.

First, an outline of an example embodiment of the present invention will be given. It should be noted that the drawing reference signs in the outline are given to each element for convenience as an example to facilitate understanding, and the description in the outline is not intended to limit the present invention. Further, connection lines between blocks in each drawing can be both bidirectional and unidirectional. A unidirectional arrow schematically shows the main flow of a signal (data) and does not exclude bidirectionality. Further, in circuit diagrams, block diagrams, internal configuration diagrams, and connection diagrams shown in the disclosure of the present application, the input and output ends of each connection line have an input port and an output port, respectively, although not shown explicitly. The same applies to input/output interfaces.

An information processing apparatus 10 relating to an example embodiment comprises a basic operation seed storage part 11, a reshare value computation part 12, and a share construction part 13 (refer to FIG. 1). The basic operation seed storage part 11 stores a seed for generating a random number used when computation is performed on a share. The reshare value computation part 12 generates a random number using the seed, computes a reshare value using the generated random number, and transmits data regarding the generated random number to other apparatuses. The share construction part 13 constructs a share for type conversion using the data regarding the generated random number and the reshare value received from other apparatuses.

Bit decomposition and ring composition are useful methods of type conversion for efficiently executing secure computation in four-party computation, however, if the format of a share held by each apparatus is not uniform, the benefits of bit decomposition and the like cannot be obtained. Therefore, the information processing apparatus 10 unifies the format of shares held by the apparatuses and reconstructs the shares to facilitate type conversion such as bit decomposition.

Specific example embodiments will be described in more detail with reference to the drawings. Note that the same reference signs are given to the same elements in each example embodiment, and the description thereof will be omitted.

First Example Embodiment

A first example embodiment will be described in detail with reference to the drawings.

A type conversion processing system relating to the first example embodiment will be described with reference to FIGS. 2 to 5.

Figure 2:
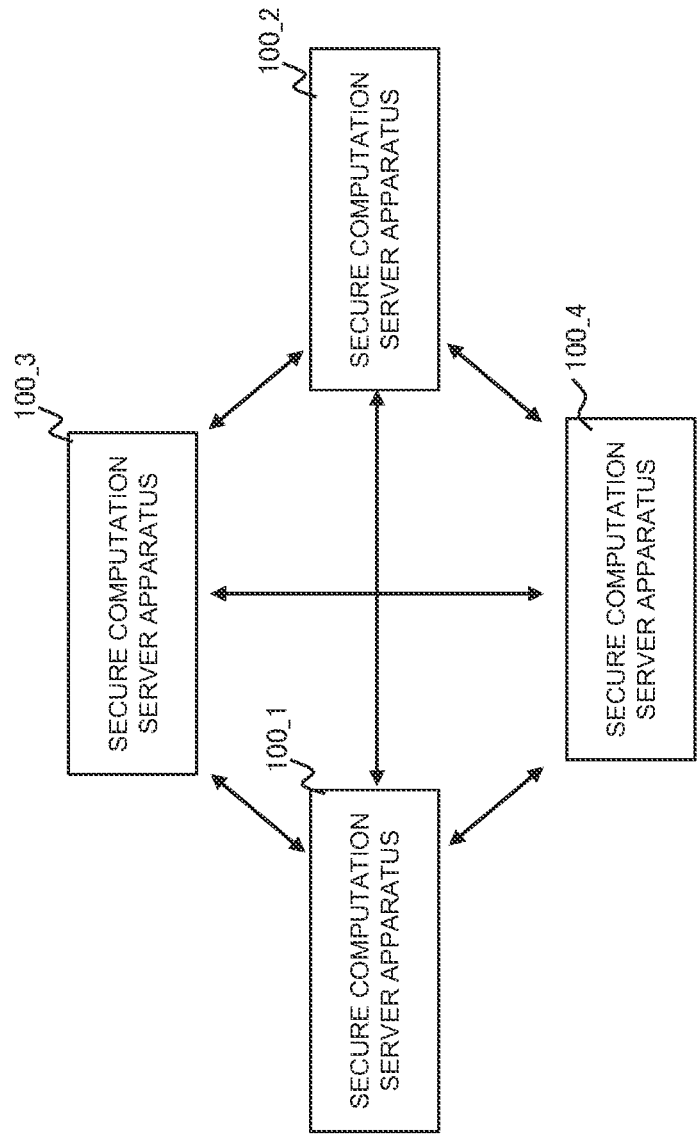
FIG. 2 is a block diagram illustrating an example of the functional configuration of a type conversion system according to a first example embodiment.

FIG. 2 is a block diagram illustrating an example of the functional configuration of the type conversion processing system according to the first example embodiment. With reference to FIG. 2, the type conversion processing system according to the first example embodiment is constituted by i-th secure computation server apparatuses (i=1, 2, 3, 4) referred to in FIG. 3 described later. (The secure computation server apparatus is simply referred to as the server apparatus.) In the type conversion processing system according to the first example embodiment, the server apparatuses 100_1, 100_2, 100_3, and 100_4 are connected to each other via a network and are able to communicate with each other.

Figure 3:
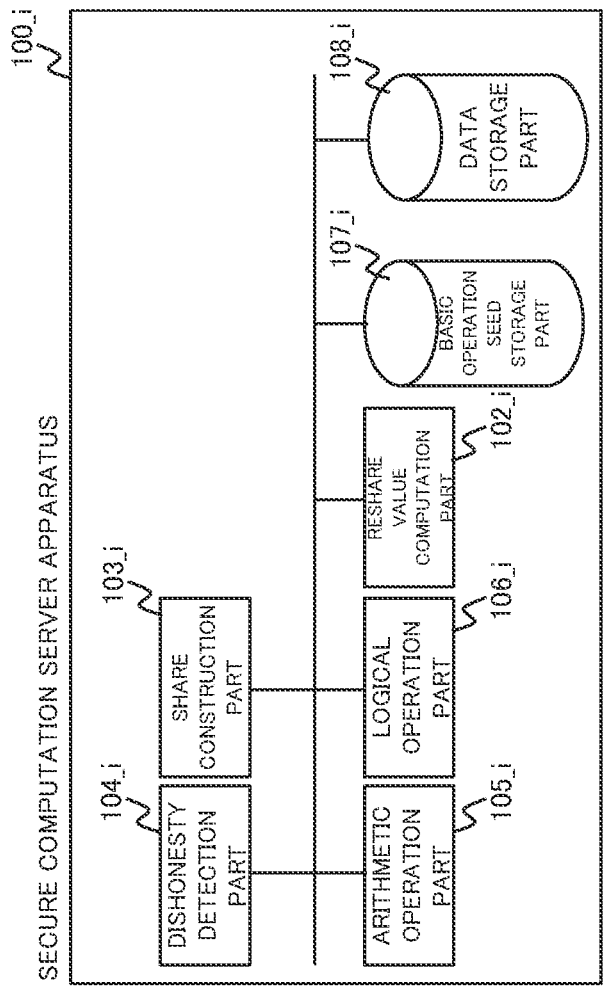
FIG. 3 is a block diagram illustrating the functional configuration of a server apparatus according to the first example embodiment.

FIG. 3 is a block diagram illustrating an example of the functional configuration of the i-th server apparatus 100_$i$ (i=1, 2, 3, 4). As shown in FIG. 3, the i-th server apparatus 100_$i$ includes an i-th reshare value computation part 102_$i$, an i-th share construction part 103_$i$, an i-th dishonesty detection part 104_$i$, an i-th arithmetic operation part 105_$i$, an i-th logical operation part 106_$i$, an i-th basic operation seed storage part 107_$i$, and an i-th data storage part 108_$i$. Further, the i-th reshare value computation part 102_$i$, the i-th share construction part 103_$i$, the i-th dishonesty detection part 104_$i$, the i-th arithmetic operation part 105_$i$, the i-th logical operation part 106_$i$, the i-th basic operation seed storage part 107_$i$, and the i-th data storage part 108_$i$ are connected to each other.

In the type conversion processing system configured as described above, for a value $x \in \mathbb{Z}_{2^n}$ input by any of the first to the fourth server apparatuses 100_1 to 100_4 or shares $[x]^n$ stored in the first to the fourth data storage parts 108_1 to 108_4 or a share $[x]^n$ supplied by an external apparatus that is not any of the first to the fourth server apparatuses 100_1 to 100_4, while the value of x is not known from the input and the values during the computation process, $[x_0], \ldots [x_{n-1}](x=\Sigma_{i=0}^{n-1} 2^i \cdot x_i, x_i \in \mathbb{Z}_2)$ is computed and the result is stored in the first to the fourth data storage parts 108_1 to 108_4. Shares of the computation result above may be reconstructed by having the first to the fourth server apparatuses 100_1 to 100_4 transmit/receive the shares. Alternatively, the shares may be transmitted to an external apparatus that is not any of the first to the fourth server apparatuses 100_1 to 100_4 and reconstructed thereby.

Further, in the type conversion processing system configured as described above, for a value $x_0, \ldots, x_{n-1} = (x=\Sigma_{i=0}^{n-1} 2^i \cdot x_i, x_i \in \mathbb{Z}_2)$ received by any of the first to the fourth server apparatuses 100_1 to 100_4 or shares $[x_0], \ldots, [x_{n-1}](x=\Sigma_{i=0}^{n-1} 2^i \cdot x_i, x_i \in \mathbb{Z}_2)$ stored in the first to the fourth data storage parts 108_1 to 108_4 or a share $[x_0], \ldots, [x_{n-1}](x=\Sigma_{i=0}^{n-1} 2^i \cdot x_i, x_i \in \mathbb{Z}_2)$ supplied by an external apparatus that is not any of the first to the fourth server apparatuses 100_1 to 100_4, while the value of $x_0, \ldots, x_{n-1}$ $(x=\Sigma_{i=0}^{n-1} 2^i \cdot x_i, x_i \in \mathbb{Z}_2)$ is not known from the input and the values during the computation process, $[x]^n$ is computed and the result is stored in the first to the fourth data storage parts 108_1 to 108_4.

Shares of the computation result above may be reconstructed by having the first to the fourth server apparatuses 100_1 to 100_4 transmit/receive the shares. Alternatively, the shares may be transmitted to an external apparatus that is not any of the first to the fourth server apparatuses 100_1 to 100_4 and reconstructed thereby.

Figure 4:
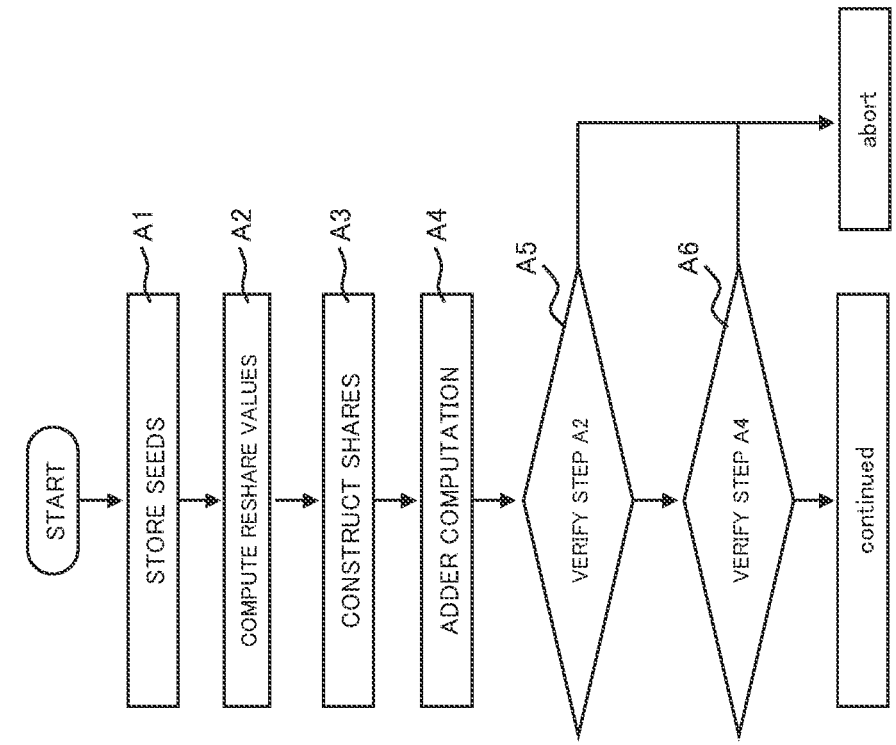
FIG. 4 is a flowchart showing an example of the operation by the type conversion system with respect to bit decomposition in the first example embodiment.
Figure 5:
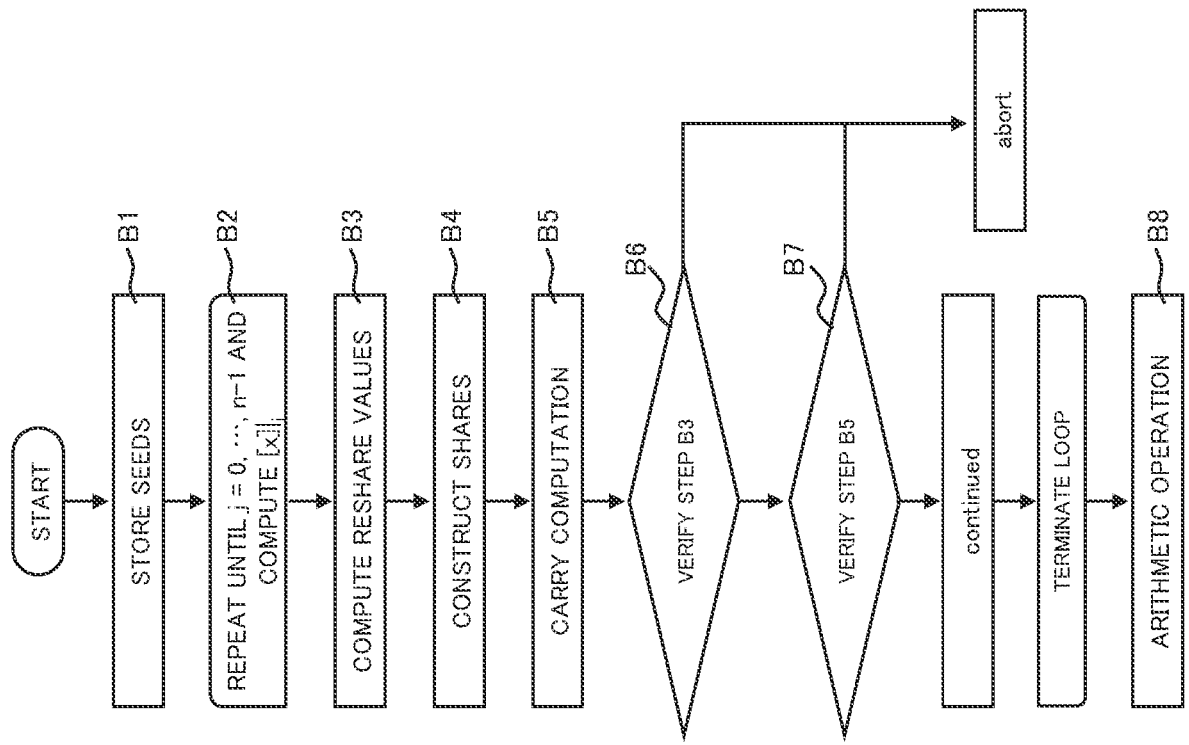
FIG. 5 is a flowchart showing an example of the operation by the type conversion system with respect to ring composition in the first example embodiment.

Next, the operation of the type conversion processing system and the first to the fourth server apparatuses 100_1 to 100_4 in the first example embodiment will be described in detail. FIG. 4 is a flowchart showing an example of the operation by the first to the fourth server apparatuses 100_1 to 100_4 with respect to bit decomposition. FIG. 5 is a flowchart showing an example of the operation by the first to the fourth server apparatuses 100_1 to 100_4 with respect to ring composition.

First, the flowchart regarding bit decomposition shown in FIG. 4 will be described.

(Step A1)
The basic operation seed storage parts 107_1, 107_2, 107_3, and 107_4 store the following, respectively.
(seed$_1$,seed$_2$,seed$_4$,seed$_1$",seed$_2$"),
(seed$_2$,seed$_3$,seed$_4$,seed$_2$",seed$_3$"),
(seed$_3$,seed$_1$,seed$_4$,seed$_3$",seed$_1$"),
(seed$_1$,seed$_2$,seed$_3$).

The server apparatuses 100_1 to 100_4 share a pseudorandom function h. Further, let seed$_i$,seed$_1$",seed$_2$", seed$_3$"$\in \{0,1\}^*$ (i=1, 2, 3, 4), and the pseudorandom function h:$\{0,1\}^* \times \{0,1\}^* \to \{0,1\}^n$. The data storage parts 108_1 to 108_4 store $[x]_1^n$, $[x]_2^n$, $[x]_3^n$, $[x]_4^n$ respectively.

Further, with respect to seed$_i$, it is intended to create a situation where one of the parties (the server apparatuses 100_$i$ (i=1 to 4)) is unable to compute the output of h, and the other three parties are able to compute the output of h. As for seed$_1$",seed$_2$",seed$_3$", it is intended to create a situation where one party out of the server apparatuses 100_1, 100_2, and 100_3 is unable to compute the output of h, and the other two parties are able to compute the output of h. If this situation can be created, the handling of seed$_i$,seed$_1$", seed$_2$",seed$_3$" is not particularly limited. Note that seed$_i$, seed$_1$",seed$_2$",seed$_3$" are merely an example.

(Step A2)
The first reshare value computation part 102_1 and the second reshare value computation part 102_2 obtain seed$_2$" from the first basic operation seed storage part 107_1 and the second basic operation seed storage part 107_2, respectively. Next, the first reshare value computation part 102_1 and the second reshare value computation part 102_2 generate $$r_2|_j = (h(sid, \text{seed}_2''))|_j,$$

$$r_2'|_j = (h(sid', \text{seed}_2''))|_j,$$

$$x_2'|_j = x_2|_j \oplus r_2|_j \oplus r_2'|_j (j=0, \ldots n-1).$$

Then, the first reshare value computation part 102_1 stores $x_2'|_j, r_2|_j, r_2'|_j$ (j=0, ... n−1) in the first data storage part 108_1. The second reshare value computation part 102_2 transmits $r_2|_j, r_2'|_j$ (j=0, ... n−1) to the third share construction part 103_3. Further, the second reshare value computation part 102_2 transmits $$r_2|_j \oplus x_2'|_j,$$

$$x_2'|_j \oplus r_2''|_j (j=0, \ldots n-1)$$

to the fourth share construction part 103_4.

Likewise, the second reshare value computation part 102_2 and the third reshare value computation part 102_3 generate $$r_3|_j = (h(sid, \text{seed}_3''))|_j,$$

$$r_3'|_j = (h(sid', \text{seed}_3''))|_j,$$

$$x_3'|_j = x_3|_j \oplus r_3|_j \oplus r_3'|_j (j=0, \ldots n-1).$$

The second reshare value computation part 102_2 stores $x_3'|_j, r_3|_j, r_3'|_j$ (j=0, ... n−1) in the second data storage part 108_2. The third reshare value computation part 102_3 transmits $r_3|_j, r_3'|_j$ (j=0, ... n−1) to the first share construction part 103_1. Further, the third reshare value computation part 102_3 transmits $r_3|_j \oplus r_3''|_j, r_3''|_j, \oplus x_3'|_j$ (j=0, ... n−1) to the fourth share construction part 103_4.

Further, likewise, the third reshare value computation part 102_3 and the first reshare value computation part 102_1 generate $$r_1|_j = (h(sid, seed_1''))|_j,$$

$$r_1'|_j = (h(sid', seed_1''))|_j,$$

$$x_1'|_j = x_1|_j \oplus r_1|_j \oplus r_1'|_j (j=0, \ldots n-1).$$

The third reshare value computation part 102_3 stores $x_1'|_j, r_1|_j, r_1'|_j$ (j=0, ... n−1) in the third data storage part 108_3. The first reshare value computation part 102_1 transmits $r_1|_j, r_1'|_j$ (j=0, ... n−1) to the second share construction part 103_2. Further, the first reshare value computation part 102_1 transmits $x_1'|_j \oplus r_1|_j$, $r_1|_j \oplus r_1''|_j$ (j=0, ... n−1) to the fourth share construction part 103_4.

As described, using a seed stored in the basic operation seed storage part 107_i, the i-th reshare value computation part 102_i generates random numbers (for instance, $r_2|_j$, $r_2'|_j$). Further, the reshare value computation part 102_i computes a reshare value (for instance, $x_2'|_j$) of a share (for instance, $x_2|_j$). Then, the reshare value computation part 102_i transmits data regarding the generated random numbers (for instance, $r_2|_j, r_2'|_j$ (j=0, ... n−1), $r_2|_j \oplus x_2'|_j, x_2'|_j \oplus r_2''|_j$ (j=0, ... n−1) to the reshare value computation parts 102_i of the other server apparatuses. Note that the data regarding the generated random numbers include the random numbers themselves.

Here, sid,sid'∈{0,1}*. sid,sid' are, for instance, counters shared by each of the server apparatuses 100_1 to 100_4.
(Step A3)
Using the values transmitted in the step A2, the share construction parts 103_1, 103_2, 103_3, and 103_4 construct shares with the following 12 equations.

$$[x_2|_j]_1 = (r_2|_j, x_2'|_j),$$

$$[x_2|_j]_2 = (x_2'|_j, r_2''|_j),$$

$$[x_2|_j]_3 = (r_2''|_j, r_2|_j),$$

$$[x_2|_j]_4 = (r_2|_j \oplus x_2'|_j, x_2'|_j \oplus r_2''|_j),$$

$$[x_3|_j]_1 = (r_3|_j, r_3''|_j),$$

$$[x_3|_j]_2 = (r_3''|_j, x_3'|_j),$$

$$[x_3|_j]_3 = (x_3'|_j, r_3|_j),$$

$$[x_3|_j]_4 = (r_3|_j \oplus r_3''|_j, r_3''|_j \oplus x_3'|_j),$$

$$[x_1|_j]_1 = (x_1'|_j, r_1|_j),$$

$$[x_1|_j]_2 = (r_1|_j, r_1''|_j),$$

$$[x_1|_j]_3 = (r_1''|_j, x_1'|_j),$$

$$[x_1|_j]_4 = (x_1'|_j \oplus r_1|_j, r_1|_j \oplus r_1''|_j).$$

Here, for $x \in \mathbb{Z}_{2^n}$, $x|_j \in \mathbb{Z}_2$ denotes the j-th bit (j=0, ..., n−1) of x. $[x_1|_j]_i$, $[x_2|_j]_i$, $[x_3|_j]_i$ are stored in each i-th data storage part 108_i.

As described, the i-th share construction part 103_i constructs (reconstructs) a share for type conversion (for bit decomposition in the step A3) using the data regarding the random numbers received from the other server apparatuses and the share reshare values. In other words, the value x is reshared as shares $x_1$, $x_2$, and $x_3$. Further, these shares are reshare and reshare values $x_1'$, $x_2'$, and $x_3'$ are computed. On the basis of these reshare values and the random number r used to compute the reshare values, the initial shares $x_1$, $x_2$, and $x_3$ are reconstructed as shares for bit decomposition. Here, although the fourth server apparatus 100_4 has a different share format from the other server apparatuses 100_1 to 100_3 as indicated in the 12 equations above, the value x is reshared and the shares are reconstructed so as to maintain the share format of each server apparatus in the disclosure of the present application. As described above, in four-party computation, when $x=x_1 \oplus x_2 \oplus x_3$ for the value $x \in \mathbb{Z}_2$, $[x]_1=(x_1, x_2)$, $[x]_2=(x_2, x_3)$, $[x]_3=(x_3, x_1)$, $[x]_4=(x_1 \oplus x_2, x_2 \oplus x_3)$. The share format of the server apparatuses 100_1 to 100_3 is constituted by a combination of two values, and the share format of the server apparatus 100_4 is a combination of the computation results of two exclusive ORs. In the disclosure of the present application, these share formats are the ones before the conversion, and the share formats expressed by the 12 equations above are the formats after the conversion. In the disclosure of the present application, when the formats before and after the conversion are compared, the shares are reconstructed (as shares for bit decomposition) while the formats are maintained before and after the conversion.
(Step A4)
By communicating with each other, the i-th logical operation parts 106_i compute n-bit adder processing BitwiseAdd as follows. Here, BitwiseAdd is a process of receiving, for instance, $$([a_1|_j])_{j=0}^{n-1},$$

$$([a_2|_j])_{j=0}^{n-1}$$

as input and outputting $$([(a_1+a_2)|_j])_{j=0}^{n-1}.$$

$$([(x_1+x_2)|_j])_{j=0}^{n-1} \leftarrow \text{BitwiseAdd}(([x_1|_j])_{j=0}^{n-1}, ([x_2|_j])_{j=0}^{n-1}),$$

$$([(x_1+x_2+x_3)|_j])_{j=0}^{n-1} \leftarrow \text{BitwiseAdd}(([(x_1+x_2)|_j])_{j=0}^{n-1}, ([x_3|_j])_{j=0}^{n-1})$$

Here, since $x_1+x_2+x_3=x$, $([x|_j])_{j=0}^{n-1}$ can be computed. Note that $([x|_j])_{j=0}^{n-1}$ denotes a series of shares $[x|_0], \ldots, [x|_{n-1}]$. Each i-th logical operation part 106_i stores $([x|_j]_i)_{j=0}^{n-1}$ in the data storage part 108_i thereof.

As described, the i-th logical operation part 106_i performs a logical operation on the type-converted shares (for bit-decomposition). More specifically, the i-th logical operation part 106_i executes the process of adding the type-converted shares by communicating with the other server apparatuses.

Here, the steps A3 and A4 will be described more specifically using a concrete example.

The following describes a case where a share $[x]^n$ on $\mathbb{Z}_{2^n}$ is bit-decomposed. If $x=x_1+x_2+x_3$ mod $2^n$, each server apparatus holds the share $[x]^n$ in the following format.
The server apparatus 100_1: $[x]_1^n=(x_1,x_2)$.
The server apparatus 100_2: $[x]_2^n=(x_2,x_3)$.
The server apparatus 100_3: $[x]_3^n=(x_3,x_1)$.
The server apparatus 100_4: $[x]_4^n=(x_1-x_2, x_2-x_3)$.

In the steps A3 and A4 described above, first, the bit shares of each digit of $x_1$, $x_2$, $x_3$ were obtained (the step A3) and then, by performing the adder computation using the bit shares obtained in the step A3, the bit shares of each digit of the value x were obtained (the step A4). The significance of this is that the step A3 has the purpose of generating (resharing the value x) the bit shares of each digit whose sum result is the value x, and the number of reshared shares is reduced so as to decrease the load associated with the adder computation in the subsequent step A4.

In the disclosure of the present application, in order to obtain the reconstructed shares, each server apparatus $100\_i$ uses $[x]_i''$. Here, each server apparatus $100\_i$ may not be able to generate the reconstructed shares only using $[x]_i''$ of its own. Therefore, each server apparatus $100\_i$ needs to obtain from another server apparatus part of $[x]_i''$ held by the another server apparatus, but this value cannot be obtained from another server apparatus from the perspective of preventing secret leakage. Therefore, each server apparatus $100\_i$ transmits/receives values masked with random numbers (reshare values) and uses these values to reconstruct the shares as described above. In the disclosure of the present application, the random numbers (for masking) are used and the shares are reconstructed so as to decrease the load associated with the adder computation after the reconstruction of the shares.

For instance, $[x_2|_j]_1$ in the 12 equations above is reshared by $[x]''$, and out of reconstructed $[x_1|_j]$, $[x_2|_j]$, $[x_3|_j]$, the value (value set) held by the server apparatus $100\_1$ is $[x_2|_j]$. Here, $r_2|_j$ are random bits for masking, and $x_2'|_j = x_2|_j \oplus r_2|_j \oplus r_2'|_j$ is a reshare value generated by masking $x_2|_j$ with $r_2|_j$, $r_2'|_j$.

Here, in view of the purpose and the significance of the step A3, since the server apparatuses $100\_3$ and $100\_4$ do not directly have the value $x_2$, it is difficult for these server apparatuses to generate $[x_2|_j]$. Therefore, the server apparatuses $100\_3$ and $100\_4$ need to receive the value from the server apparatus $100\_1$ or $100\_2$ who has it or construct $[x_2|_j]$ using computable random numbers. However, the random numbers for masking are used because the risk of secret leakage will increase if the server apparatus $100\_1$ or $100\_2$ transmits its own value. While the each reshare value computation part $102\_i$ computes random numbers for masking, for instance, the server apparatus $100\_2$ transmits $x_2'|_j$ to the server apparatus $100\_4$ (the step A2). Then, in the step A3, the shares including $[x_2|_j]$ are reconstructed.

Further, as described above, when the shares are reconstructed, the formats thereof must be satisfied. For instance, when $x_2|_j = x_1' \oplus x_2' \oplus x_3'$, substitutions can be performed as follows in the 12 equations above.

$$x_1' = r_2|_j,$$

$$x_2' = x_2'|_j,$$

$$x_3' = r_2'|_j.$$

Therefore, the server apparatus $100\_1$ must set $[x_2|_j]_1 = (x_1', x_2') = (r_2|_j, x_2'|_j)$ (performing the reconstruction of the shares). In other words, $r_2|_j$ and $x_2'|_j$ are selected so that the formats of the shares are satisfied. Further, in the present example embodiment, the step A3 is executed in order to reduce the number of reshared shares so as to decrease the load associated with the adder computation in the step A4. In other words, since the computation cost of the adder accounts for most of the communication cost of the entire bit decomposition process, resharing is performed so as to reduce the computation cost of the adder that has heavy communication cost. The purposes of resharing, however, are not limited to the above, and as described in the other example embodiments, resharing may be performed in order to "adapt to the form of communication and improve the efficiency of the communication cost in ring composition with an increased number of shares" or "reduce the cost of resharing in the step A3 with the same number of reshared shares."

(Step A5)

The first reshare value computation part $102\_1$ reads $x_2'|_j$, $r_2|_j$, $r_2'|_j$ ($j=0, \ldots n-1$) from the first data storage part $108\_1$. Next, the first reshare value computation part $102\_1$ transmits $r_2|_j$, $r_2'|_j$ ($j=0, \ldots n-1$) to the third dishonesty detection part $104\_3$. Further, the first reshare value computation part $102\_1$ transmits $r_2|_j \oplus x_2'|_j$, $x_2'|_j \oplus r_2''|_j$ ($j=0, \ldots n-1$) to the fourth dishonesty detection part $104\_4$. The third and the fourth dishonesty detection parts $104\_3$ and $104\_4$ read $[x_2|_j]_3$ stored in the third data storage part $108\_3$ and $[x_2|_j]_4$ stored in the fourth data storage part $108\_4$, respectively, and verify if the values match.

When the values match, the third dishonesty detection part $104\_3$ or the fourth dishonesty detection part $104\_4$ broadcasts a string "success" to the server apparatuses $100\_1$, $100\_2$, $100\_3$, and $100\_4$, and proceeds to the next step. When the values do not match, the third dishonesty detection part $104\_3$ or the fourth dishonesty detection part $104\_4$ broadcasts a string "abort" to the server apparatuses $100\_1$, $100\_2$, $100\_3$, and $100\_4$, and aborts the protocol.

Further, when a large amount of type conversion processing is performed in parallel, the verification described above may be performed by verifying if a hash value for the value obtained by concatenating each of $r_2|_j$, $r_2'|_j$ ($j=0, \ldots n-1$) matches a hash value for the value obtained by concatenating each value with respect to $[x_2|_j]_3$. In this case, for the communication volume of the entire processing, the hash value for the value obtained by concatenating each of $r_2|_j$, $r_2'|_j$ ($j=0, \ldots n-1$) can be regarded as negligible. The same applies to $r_2|_j \oplus x_2'|_j$, $x_2'|_j \oplus r_2''|_j$, $[x_2|_j]_4$ ($j=0, \ldots n-1$).

Likewise, the second reshare value computation part $102\_2$ reads $x_3'|_j$, $r_3|_j$, $r_3'|_j$ ($j=0, \ldots n-1$) from the second data storage part $108\_2$. Next, the second reshare value computation part $102\_2$ transmits $r_3|_j$, $r_3'|_j$ ($j=0, \ldots n-1$) to the first dishonesty detection part $104\_1$. Further, the second reshare value computation part $102\_2$ transmits $r_3|_j \oplus x_3'|_j$, $x_3'|_j \oplus r_3''|_j$ ($j=0, \ldots n-1$) to the fourth dishonesty detection part $104\_4$. The first and the fourth dishonesty detection parts $104\_1$ and $104\_4$ read $[x_3|_j]_1$ stored in the first data storage part $108\_1$ and $[x_3|_j]_4$ stored in the fourth data storage part $108\_4$, respectively, and verify if the values match.

When the values match, the first dishonesty detection part $104\_1$ or the fourth dishonesty detection part $104\_4$ broadcasts a string "success" to the server apparatuses $100\_1$, $100\_2$, $100\_3$, and $100\_4$, and proceeds to the next step. When the values do not match, the first dishonesty detection part $104\_1$ or the fourth dishonesty detection part $104\_4$ broadcasts a string "abort" to the server apparatuses $100\_1$, $100\_2$, $100\_3$, and $100\_4$, and aborts the protocol.

When a large amount of type conversion processing is performed in parallel, the verification described above may be performed by verifying if a hash value for the value obtained by concatenating each of $r_3|_j$, $r_3'|_j$ ($j=0, \ldots n-1$) matches a hash value for the value obtained by concatenating each value with respect to $[x_3|_j]_1$. In this case, for the communication volume of the entire processing, the hash value for the value obtained by concatenating each of $r_3|_j$, $r_3'|_j$ ($j=0, \ldots n-1$) can be regarded as negligible. The same applies to $r_3|_j \oplus x_3'|_j$, $x_3'|_j \oplus r_3''|_j$, $[x_3|_j]_4$ ($j=0, \ldots n-1$). Likewise, the third reshare value computation part $102\_3$ reads $x_1'|_j$, $r_1|_j$, $r_1'|_j$ ($j=0, \ldots n-1$) from the third data storage part $108\_3$. Next, the third reshare value computation part $102\_3$ transmits $r_1|_j$, $r_1'|_j$ ($j=0, \ldots n-1$) to the second dishonesty detection part $104\_2$. Further, the third reshare value computation part $102\_3$ transmits $x_1'|_j \oplus r_1|_j$, $r_1|_j \oplus r_1''|_j$ ($j=0, \ldots n-1$) to the fourth dishonesty detection part $104\_4$. The second and the fourth dishonesty detection parts $104\_2$ and 104_4 read $[x_1|_j]_2$ stored in the second data storage part 108_2 and $[x_1|_j]_4$ stored in the fourth data storage part 108_4, respectively, and verify if the values match.

When the values match, the second dishonesty detection part 104_2 or the fourth dishonesty detection part 104_4 broadcasts a string "success" to the server apparatuses 100_1, 100_2, 100_3, and 100_4, and proceeds to the next step. When the values do not match, the second dishonesty detection part 104_2 or the fourth dishonesty detection part 104_4 broadcasts a string "abort" to the server apparatuses 100_1, 100_2, 100_3, and 100_4, and aborts the protocol.

When a large amount of type conversion processing is performed in parallel, the verification described above may be performed by verifying if a hash value for the value obtained by concatenating each of $r_1|_j$, $r_1'|_j$ (j=0, ... n−1) matches a hash value for the value obtained by concatenating each value with respect to $[x_1|_j]_2$. In this case, for the communication volume of the entire processing, the hash value for the value obtained by concatenating each of $r_1|_j$, $r_1'|_j$ (j=0, ... n−1) can be regarded as negligible. The same applies to $x_1'|_j \oplus r_1|_j$, $r_1|_j \oplus r_1''|_j$, $[x_1|_j]_4$ (j=0, ... n−1).

As described, the i-th dishonesty detection part 104_i detects dishonesty in the protocol on the basis of the data regarding the random numbers received from the other apparatuses. More specifically, the i-th dishonesty detection part 104_i detects dishonesty (dishonest party) on the basis of whether or not the data regarding the random numbers received from the other apparatuses match the data regarding the random numbers stored in its own data storage part.

(Step A6)

Each i-th dishonesty detection part 104_i performs dishonesty detection by comparing the transmitted/received data in BitwiseAdd in the step A4. When not detecting dishonesty, the first to the fourth server apparatuses 100_1, 100_2, 100_3, and 100_4 broadcast a string "success" to each server apparatus. When detecting dishonesty, the first to the fourth server apparatuses 100_1, 100_2, 100_3, and 100_4 broadcast a string "abort" to each server apparatus and abort the protocol. This is achieved by the above-described four-party secure computation capable of detecting dishonesty. The step A6 can be executed in parallel with the step A5.

As described, the i-th dishonesty detection part 104_i detects the presence of a dishonest party using the data transmitted/received during the process of adding the type-converted shares.

The following describes a flowchart of ring composition shown in FIG. 5.

(Step B1)

The basic operation seed storage parts 107_1, 107_2, 107_3, and 107_4 store the following, respectively.

$(seed_1, seed_2, seed_4, seed_1'', seed_2'')$,
$(seed_2, seed_3, seed_4, seed_2'', seed_3'')$,
$(seed_3, seed_1, seed_4, seed_3'', seed_1'')$,
$(seed_1, seed_2, seed_3)$.

The server apparatuses 100_1 to 100_4 share a pseudorandom function h'. Further, let $seed_i, seed_1'', seed_2'', seed_3'' \in \{0,1\}^*$ (i=1, 2, 3, 4), and the pseudorandom function $h': \{0,1\}^* \times \{0,1\}^* \to \{0,1\}$.

Then, the data storage parts 108_1 to 108_4 store the following, respectively.

$([x_j]_1)_{j=0}^{n-1}$, $([x_j]_2)_{j=0}^{n-1}$, $([x_j]_3)_{j=0}^{n-1}$, $([x_j]_4)_{j=0}^{n-1}$,

Further, the data storage parts 108_1 to 108_4 store a loop counter j(=0). Here, $x_j = x_{j,1} \oplus x_{j,2} \oplus x_{j,3}$, $[x_j]_1 = (x_{j,1}, x_{j,2})$, $[x_j]_2 = (x_{j,2}, x_{j,3})$, $[x_j]_3 = [x_j]_4 = (x_{j,1} \oplus x_{j,2}, x_{j,2} \oplus x_{j,3})$.

Further, with respect to $seed_1$, it is intended to create a situation where one of the parties (the server apparatuses 100_i (i=1 to 4)) is unable to compute the output of h', and the other three parties are able to compute the output of h'. As for $seed_1'', seed_2'', seed_3''$, it is intended to create a situation where one party out of the server apparatuses 100_1, 100_2, and 100_3 is unable to compute the output of h', and the other two parties are able to compute the output of h'. If this situation can be created, the handling of $seed_1, seed_1'', seed_2'', seed_3''$ is not particularly limited. Note that $seed_1, seed_1'', seed_2'', seed_3''$ herein are merely an example.

(Step B2)

Each server apparatus 100_i reads the loop counter j from the data storage part 108_i. Each server apparatus 100_i executes steps B3 to B7 when j<n and executes step B8 when j=n.

Further, the logical operation parts 106_1 to 106_4 read $[x_j], [c_j], [c_j']$ from the data storage parts 108_1 to 108_4. Here, $[c_j], [c_j']$ are carries for the j-th bit. Then, the logical operation parts 106_1 to 106_4 compute $[x]|_j = [x_j] \oplus [c_j] \oplus [c_j']$ and store $[x]|_j$ in each of the data storage parts 108_1 to 108_4.

Note that $[x]|_j$ stored by the i-th data storage part 108_i is denoted as $([x]|_j)_i = (([x]|_j)_{i,1}, ([x]|_j)_{i,2})$.

Further, $([x]|_j)_1 = ([x]|_{j,1}, [x]|_{j,2}), ([x]|_j)_2 = ([x]|_{j,2}, [x]|_{j,3})$, $([x]|_j)_3 = ([x]|_{j,3}, [x]|_{j,1}), ([x]|_j)_4 = ([x]|_{j,1} \oplus [x]|_{j,2} \oplus [x]|_{j,3})$.

(Step B3)

The first reshare value computation part 102_1 and the second reshare value computation part 102_2 obtain $seed_1''$ from the first basic operation seed storage part 107_1 and the second basic operation seed storage part 107_2, respectively. Next, the first reshare value computation part 102_1 and the second reshare value computation part 102_2 generate $r_{j,2} = h'(sid_j, seed_2'')$, $r_{j,2}' = h'(sid_j', seed_2'')$, $x_{j,2}' = [x]|_{j,2} \oplus r_{j,2} \oplus r_{j,2}'$ (j=0, ... n−1).

Then, the first reshare value computation part 102_1 stores $x_{j,2}', r_{j,2}, r_{j,2}'$ (j=0, ... n−1)

in the first data storage part 108_1. The second reshare value computation part 102_2 transmits $r_{j,2}, r_{j,2}'$ (j=0, ... n−1)

to the third share construction part 103_3. Further, the second reshare value computation part 102_2 transmits $r_{j,2} \oplus x_{j,2}'$, $x_{j,2}' \oplus r_{j,2}'$ (j=0, ... n−1)

to the fourth share construction part 103_4.

Likewise, the second reshare value computation part 102_2 and the third reshare value computation part 102_3 generate $r_{j,3} = h'(sid_j, seed_3'')$, $r_{j,3}' = h'(sid_j', seed_3'')$, $x_{j,3}' = [x]|_{j,3} \oplus r_{j,3} \oplus r_{j,3}'$ (j=0, ... n−1). The second reshare value computation part 102_2 stores $x_{j,3}', r_{j,3}, r_{j,3}'$ (j=0, ... n−1) in the second data storage part 108_2. The third reshare value computation part 102_3 transmits $r_{j,3}, r_{j,3}'$ (j=0, ... n−1) to the first share construction part 103_1. Further, the third reshare value computation part 102_3 transmits $r_{j,3} \oplus r_{j,3}'$, $r_{j,3}' \oplus x_{j,3}'$ (j=0, ... n−1) to the fourth share construction part 103_4.

Further, likewise, the third reshare value computation part 102_3 and the first reshare value computation part 102_1 generate $r_{j,1}=h'(sid_j, seed_1'')$, $r_{j,1}'=h'(sid_j', seed_1'')$, $x_{j,1}'=[x]|_{j,1} \oplus r_{j,1}'$ (j=0, ..., n−1). The third reshare value computation part 102_3 stores $x_{j,1}', r_{j,1}, r_{j,1}'$ (j=0, ... n−1) in the third data storage part 108_3. The first reshare value computation part 102_1 transmits $r_{j,1}, r_{j,1}'$ (j=0, ... n−1) to the second share construction part 103_2. Further, the first reshare value computation part 102_1 transmits $x_{j,1}' \oplus r_{j,1}$, $r_{j,1} \oplus r_{j,1}'$ (j=0, ... n−1) to the fourth share construction part 103_4.

Here, $sid_j, sid_j' \in \{0,1\}^*$. For instance, $sid_j, sid_j'$ are counters shared by each of the server apparatuses 100_1 to 100_4.
(Step B4)
Using the values transmitted in the step A3, the share construction parts 103_1, 103_2, 103_3, and 103_4 construct shares with the following 12 equations.

$[[x]|_{j,2}]_1 = (r_{j,2}, x_{j,2}')$, $[[x]|_{j,2}]_2 = (x_{j,2}', r_{j,2}')$, $[[x]|_{j,2}]_3 = (r_{j,2}', r_{j,2})$, $[[x]|_{j,2}]_4 = (r_{j,2} \oplus x_{j,2}', x_{j,2}' \oplus r_{j,2}')$, $[[x]|_{j,3}]_1 = (r_{j,3}, r_{j,3}')$, $[[x]|_{j,3}]_2 = (r_{j,3}', x_{j,3}')$, $[[x]|_{j,3}]_3 = (x_{j,3}', r_{j,3})$, $[[x]|_{j,3}]_4 = (r_{j,3} \oplus r_{j,3}', r_{j,3}' \oplus x_{j,3}')$, $[[x]|_{j,1}]_1 = (x_{j,1}', r_{j,1})$, $[[x]|_{j,1}]_2 = (r_{j,1}, r_{j,1}')$, $[[x]|_{j,1}]_3 = (r_{j,1}', x_{j,1}')$, $[[x]|_{j,1}]_4 = (x_{j,1}' \oplus r_{j,1}, r_{j,1} \oplus r_{j,1}')$.

Here, $[[x]|_{j,1}]$, $[[x]|_{j,2}]$, $[[x]|_{j,3}]$ are stored in each i-th data storage parts 208_i.
(Step B5)
By communicating with each other, the i-th logical operation parts 106_i perform a carry computation process $Compute_2 Bit_Carry$ as follows. Here, $Compute_2 Bit_Carry$ is a process of receiving five inputs, which are a full adder $[\alpha_j], [\beta_j], [\gamma_j]$ and carry inputs from lower digits $[c_j], [c_j']$, and outputting carry outputs $[c_{j+1}], [c_{j+1}']$. That is as shown in the equation below.

$([c_{j+1}], [c_{j+1}']) \leftarrow Compute_2 Bit_Carry([[x]|_{j,1}], [[x]|_{j,2}], [[x]|_{j,3}], [c_j], [c_j'])$.

Each of the i-th logical operation parts 106_i stores $([c_{j+1}], [c_{j+1}'])$ in the data storage part 108_i thereof. Each i-th server apparatus 100_i reads the loop counter j from the data storage part 208_i, makes it j=j+1, and stores it in each data storage part 108_i. Note that it is unnecessary to execute the step B5 when j=n−1.

As described, the i-th logical operation part 106_i executes the process of computing carries for the type-converted shares by communicating with the other server apparatuses.
(Step B6)
The first reshare value computation part 102_1 reads $x_{j,2}', r_{j,2}, r_{j,2}'$ (j=0, ... n−1) from the first data storage part 108_1. Next, the first reshare value computation part 102_1 transmits $r_{j,2}, r_{j,2}'$ (j=0, ... n−1) to the third dishonesty detection part 104_3. Further, the first reshare value computation part 102_1 transmits $r_{j,2} \oplus x_{j,2}'$, $x_{j,2}' \oplus r_{j,2}'$ (j=0, ... n−1) to the fourth dishonesty detection part 104_4. The third and the fourth dishonesty detection parts 104_3 and 104_4 read $[[x]|_{j,2}]_3$ stored in the third data storage part 108_3 and $[[x]|_{j,2}]_4$ stored in the fourth data storage part 108_4, respectively, and verify if the values match.

When the values match, the third dishonesty detection part 104_3 or the fourth dishonesty detection part 104_4 broadcasts a string "success" to the server apparatuses 100_1, 100_2, 100_3, and 100_4, and proceeds to the next step. When the values do not match, the third dishonesty detection part 104_3 or the fourth dishonesty detection part 104_4 broadcasts a string "abort" to the server apparatuses 100_1, 100_2, 100_3, and 100_4, and aborts the protocol.

Further, when a large amount of type conversion processing is performed in parallel, the verification described above may be performed by verifying if a hash value for the value obtained by concatenating each of $r_{j,2}, r_{j,2}'$ (j=0, ... n−1) matches a hash value for the value obtained by concatenating each value with respect to $[[x]|_{j,2}]_4$. In this case, for the communication volume of the entire processing, the hash value for the value obtained by concatenating each of $r_{j,2}, r_{j,2}'$ (j=0, ... n−1) can be regarded as negligible. The same applies to $r_{j,2} \oplus x_{j,2}'$, $x_{j,2}' \oplus r_{j,2}'$, $[[x]|_{j,2}]_4$ (j=0, ... n−1).

Likewise, the second reshare value computation part 102_2 reads $x_{j,3}', r_{j,3}, r_{j,3}'$ (j=0, ... n−1) from the second data storage part 108_2. Next, the second reshare value computation part 102_2 transmits $r_{j,3}, r_{j,3}'$ (l=0, ... n−1) to the first dishonesty detection part 104_1. Further, the second reshare value computation part 102_2 transmits $r_{j,3} \oplus r_{j,3}', r_{j,3}' \oplus x_{j,3}'$ (j=0, ... n−1) to the fourth dishonesty detection part 104_4. The first and the fourth dishonesty detection parts 104_1 and 104_4 read $[[x]|_{j,3}]_1$ stored in the first data storage part 108_1 and $[[x]|_{j,3}]_4$ stored in the fourth data storage part 108_4, respectively, and verify if the values match.

When the values match, the first dishonesty detection part 104_1 or the fourth dishonesty detection part 104_4 broadcasts a string "success" to the server apparatuses 100_1, 100_2, 100_3, and 100_4, and proceeds to the next step. When the values do not match, the first dishonesty detection part 104_1 or the fourth dishonesty detection part 104_4 broadcasts a string "abort" to the server apparatuses 100_1, 100_2, 100_3, and 100_4, and aborts the protocol.

When a large amount of type conversion processing is performed in parallel, the verification described above may be performed by verifying if a hash value for the value obtained by concatenating each of $r_{j,3}, r_{j,3}'$ (j=0, ... n−1) matches a hash value for the value obtained by concatenating each value with respect to $[[x]|_{j,3}]_1$. In this case, for the communication volume of the entire processing, the hash value for the value obtained by concatenating each of $r_{j,3}, r_{j,3}'$ (j=0, ... n−1) can be regarded as negligible. The same applies to $r_{j,3} \oplus r_{j,3}', r_{j,3}' \oplus x_{j,3}', [[x]|_{j,3}]_4$ (j=0, ... n−1).

Likewise, the third reshare value computation part 102_3 reads $x_{j,1}', r_{j,1}, r_{j,1}'$ (j=0, ... n−1) from the third data storage part 108_3. Next, the third reshare value computation part 102_3 transmits $r_{j,1}, r_{j,1}'$ (j=0, ... n−1) to the second dishonesty detection part 104_2. Further, the third reshare value computation part 102_3 transmits $x_{j,1}' \oplus r_{j,1}, r_{j,1} \oplus r_{j,1}'$ (j=0, ... n−1) to the fourth dishonesty detection part 104_4. The second and the fourth dishonesty detection parts 104_2 and 104_4 read $[[x]|_{j,1}]_2$ stored in the second data storage part 108_2 and $[[x]|_{j,1}]_4$ stored in the fourth data storage part 108_4, respectively, and verify if the values match.

When the values match, the second dishonesty detection part 104_2 or the fourth dishonesty detection part 104_4 broadcasts a string "success" to the server apparatuses 100_1, 100_2, 100_3, and 100_4, and proceeds to the next step. When the values do not match, the second dishonesty detection part 104_2 or the fourth dishonesty detection part 104_4 broadcasts a string "abort" to the server apparatuses 100_1, 100_2, 100_3, and 100_4, and aborts the protocol.

When a large amount of type conversion processing is performed in parallel, the verification described above may be performed by verifying if a hash value for the value obtained by concatenating each of $r_{j,1}, r_{j,1}'$ (j=0, ... n−1) matches a hash value for the value obtained by concatenating each value with respect to $[[x]_{j,1}]_2$. In this case, for the communication volume of the entire processing, a hash value for the value obtained by concatenating each of $r_{j,3}, r_{j,3}'$ (j=0, ... n−1) can be regarded as negligible. The same applies to $x_{j,1}' \oplus r_{j,1}$, $r_{j,1} \oplus r_{j,1}'$, $[[x]|_{j,1}]_4$ (j=0, ... n−1).

(Step B7)

Each i-th dishonesty detection part 104_i performs dishonesty detection by comparing the transmitted/received data in Compute$_2$ Bit$_{Carry}$ in the step B5. When not detecting dishonesty, the first to the fourth server apparatuses 100_1, 100_2, 100_3, and 100_4 broadcast a string "success" to each server apparatus. When detecting dishonesty, the first to the fourth server apparatuses 100_1, 100_2, 100_3, and 100_4 broadcast a string "abort" to each server apparatus and abort the protocol. This is achieved by the above-described four-party secure computation capable of detecting dishonesty. The step B7 can be executed in parallel with the step B6. Further, one may execute n loops of the steps B6 and B7 in parallel when j=n−1 rather than execute each loop.

As described, the i-th dishonesty detection part 104_i detects the presence of a dishonest party using the data exchanged for the process of computing carries for the type-converted shares.

(Step B8)

Each i-th arithmetic operation part 105_i reads $(([x]|_j)_i)_{j=0}^{n-1}$ from the data storage part 108_i, and then performs the following computation.

$$[x]_i^n = \Sigma_{j=0}^{n-1} 2^j \cdot [x]|_j.$$

Each i-th arithmetic operation part 105_i stores $[x]_i^n$ in the data storage part 108_i.

According to the first example embodiment described above, the following effects can be obtained.

The first effect is that type conversion can be executed on shares using four-party secure computation capable of detecting dishonesty. When the steps of detecting dishonesty are performed in parallel in the execution of a complex mixed circuit, the communication cost related to dishonesty detection can be eliminated. For instance, if an n-bit ripple-carry adder is used in the adder computation, the communication cost of bit decomposition will be (16n−10) bits·n+1 rounds. The communication cost of ring composition will be (16n−16) bits·2n−2 rounds. Meanwhile, in a case where Non-Patent Literatures 2 and 3 are combined, the communication cost of type conversion is (42n−42) bits·n−1 rounds when the probability of successful cheating is $2^{-40}$. Therefore, the method disclosed in the present application is more efficient. Further, the implementation of the present invention is not limited to the n-bit ripple-carry adder. An n-bit carry-lookahead or parallel prefix adder may also be used.

The second effect is that, when type conversion is performed on shares using four-party secure computation capable of detecting dishonesty, the probability of detecting dishonesty is always "1." In a case where Non-Patent Literatures 2 and 3 are combined, since the dishonesty detection probability is parameterized, the communication cost increases as the dishonesty detection probability is improved. There are various secure computation applications, and the required level of the dishonesty detection probability depends on the application. Investigating the requirements and setting each parameter associated with the investigation will be a burden for a user. In the disclosure of the present application, since the dishonesty detection probability is "1," the burden of investigating the requirements and setting parameters is reduced.

Second Example Embodiment

A type conversion processing system relating to a second example embodiment will be described with reference to FIGS. 6 to 8.

Figure 6:
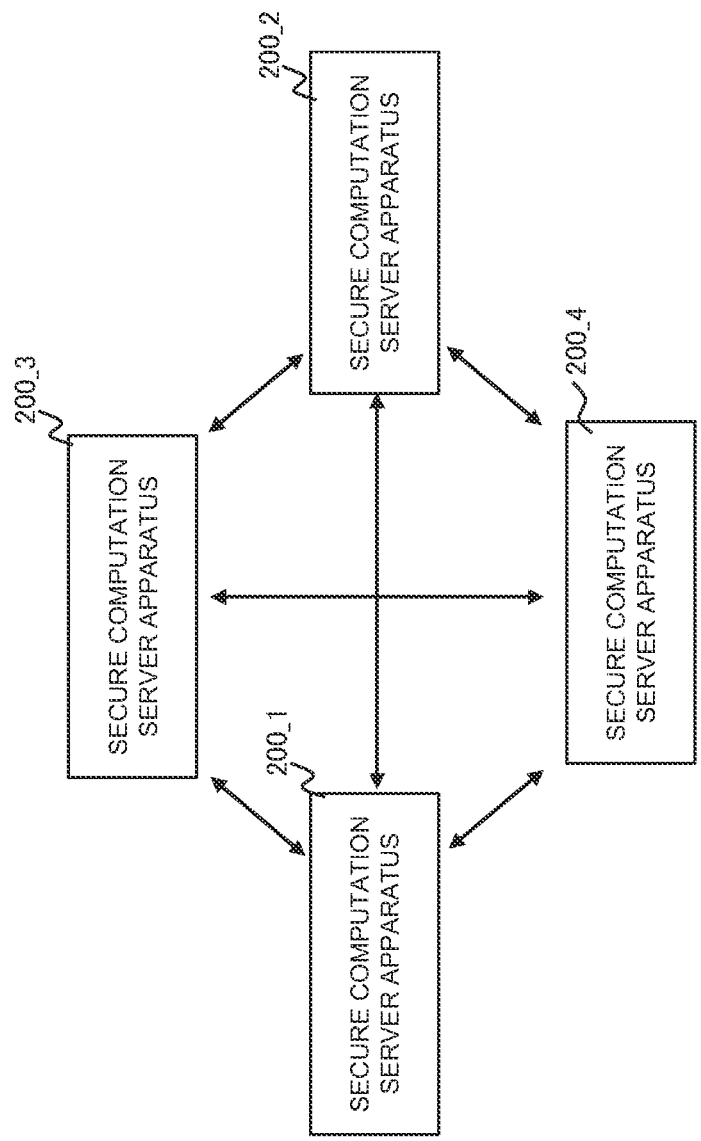
FIG. 6 is a block diagram illustrating an example of the functional configuration of a type conversion system according to a second example embodiment.

FIG. 6 is a block diagram illustrating an example of the functional construction of the type conversion processing system according to the second example embodiment. With reference to FIG. 6, the type conversion processing system according to the second example embodiment is constituted by i-th server apparatuses (i=1, 2, 3, 4) referred to in FIG. 7 described later. In the type conversion processing system according to the second example embodiment, the server apparatuses 200_1, 200_2, 200_3, and 200_4 are connected to each other via a network and are able to communicate with each other. FIG. 7 is a block diagram illustrating an example of the functional construction of the i-th server apparatus 200_i (i=1, 2, 3, 4).

Figure 7:
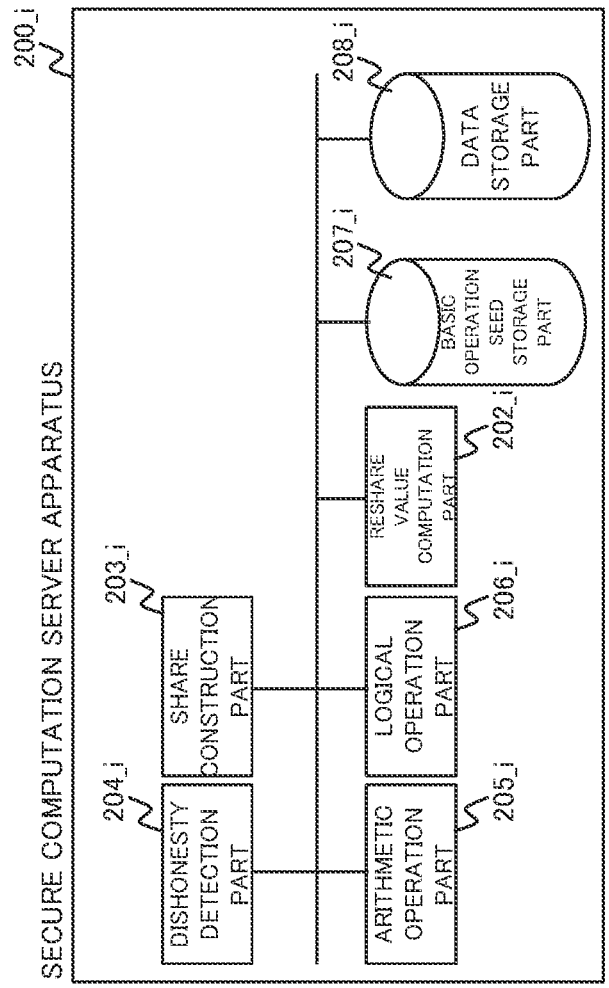
FIG. 7 is a block diagram illustrating the functional configuration of a server apparatus according to the second example embodiment.
Figure 8:
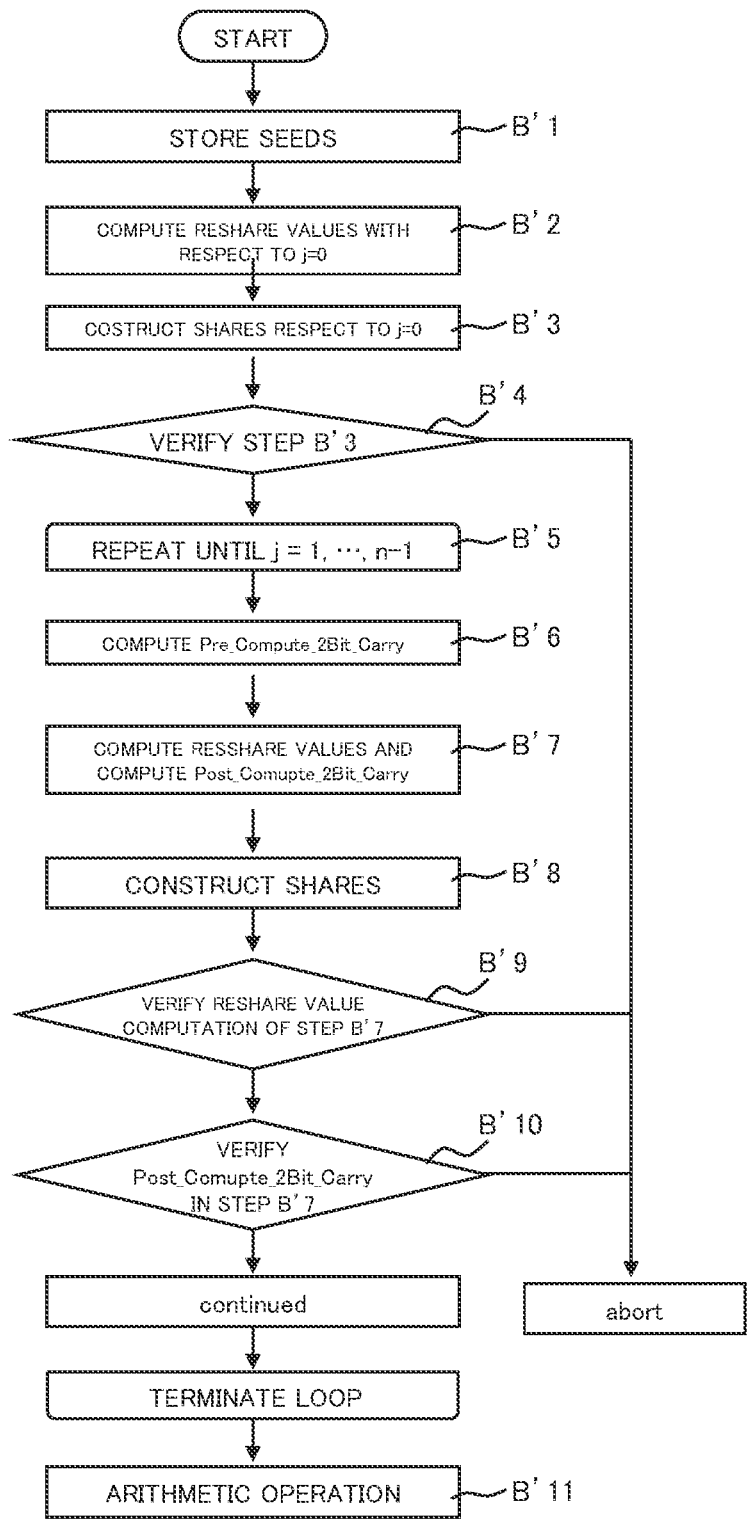
FIG. 8 is a flowchart showing an example of the operation by the type conversion system with respect to ring composition in the second example embodiment.

As shown in FIG. 7, the i-th server apparatus 200_i includes an i-th reshare value computation part 202_i, an i-th share construction part 203_i, an i-th dishonesty detection part 204_i, an i-th arithmetic operation part 205_i, an i-th logical operation part 206_i, an i-th basic operation seed storage part 207_i, and an i-th data storage part 208_i. Further, the i-th reshare value computation part 202_i, the i-th share construction part 203_i, the i-th dishonesty detection part 204_i, the i-th arithmetic operation part 205_i, the i-th logical operation part 206_i, the i-th basic operation seed storage part 207_i, and the i-th data storage part 208_i are connected to each other.

In the type conversion processing system configured as described above, for a value $x \in \mathbb{Z}_{2^n}$ input by any of the first to the fourth server apparatuses 200_1 to 200_4 or shares $[x]^n$ stored in the first to the fourth data storage parts 208_1 to 208_4 or a share $[x]^n$ supplied by an external apparatus that is not any of the first to the fourth server apparatuses 200_1 to 200_4, while the value of x is not known from the input and the values during the computation process, $[x_0], \ldots, [x_{n-1}](x = \Sigma_{i=0}^{n-1} 2^i \cdot x_i, x_i \in \mathbb{Z}_2)$ is computed and the result is stored in the first to the fourth data storage parts 208_1 to 208_4. Shares of the computation result above may be reconstructed by having the first to the fourth server apparatuses 200_1 to 200_4 transmit/receive the shares. Alternatively, the shares may be transmitted to an external apparatus that is not any of the first to the fourth server apparatuses 200_1 to 200_4 and reconstructed thereby.

Further, in the type conversion processing system configured as described above, for a value $x_0, \ldots, x_{n-1}$ ($x = \Sigma_{i=0}^{n-1} 2^i \cdot x_i, x_i \in \mathbb{Z}_2$) input by any of the first to the fourth server apparatuses 200_1 to 200_4 or shares $[x_0], \ldots, [x_{n-1}](x = \Sigma_{i=0}^{n-1} 2^i \cdot x_i, x_i \in \mathbb{Z}_2)$ stored in the first to the fourth data storage parts 208_1 to 208_4 or a share $[x_0], \ldots, [x_{n-1}](x = \Sigma_{i=0}^{n-1} 2^i \cdot x_i, x_i \in \mathbb{Z}_2)$ supplied by an external apparatus that is not any of the first to the fourth server apparatuses 200_1 to 200_4, while the value of $x_0, \ldots, x_{n-1}$ ($x=\sum_{i=0}^{n-1} 2^i \cdot x_i$, $x_i \in \mathbb{Z}_2$) is not known from the input and the values during the computation process, $[x]^n$ is computed and the result is stored in the first to the fourth data storage parts 208_1 to 208_4. Shares of the computation result above may be reconstructed by having the first to the fourth server apparatuses 200_1 to 200_4 transmit/receive the shares. Alternatively, the shares may be transmitted to an external apparatus that is not any of the first to the fourth server apparatuses 200_1 to 200_4 and reconstructed thereby.

Next, the operation of the type conversion processing system and the first to the fourth server apparatuses 200_1 to 200_4 in the second example embodiment will be described in detail. FIG. 8 is a flowchart showing an example of the operation by the first to the fourth server apparatuses 200_1 to 200_4 with respect to ring composition. Since bit decomposition can be performed as in the first example, the description thereof will be omitted.

The flowchart regarding ring composition shown in FIG. 8 will be described.

(Step B'1)

The basic operation seed storage parts 207_1, 207_2, 207_3, and 207_4 store the following, respectively.

(seed$_1$,seed$_2$,seed$_4$,seed$_1$",seed$_2$"), (seed$_2$,seed$_3$,seed$_4$,seed$_2$",seed$_3$"), (seed$_3$,seed$_1$,seed$_4$,seed$_3$",seed$_1$"), (seed$_1$,seed$_2$,seed$_3$).

The server apparatuses 200_1 to 200_4 share a pseudorandom function h'. Further, let seed$_1$,seed$_1$",seed$_2$", seed$_3$"$\in\{0,1\}^*$ (i=1, 2, 3,4) and the pseudorandom function h':$\{0,1\}^* \times \{0,1\}^* \to \{0,1\}$.

Then, the data storage parts 208_1 to 208_4 store the following, respectively.

$([x_j]_1)_{j=0}^{n-1}$, $([x_j]_2)_{j=0}^{n-1}$, $([x_j]_3)_{j=0}^{n-1}$, $([x_j]_4)_{j=0}^{n-1}$.

Further, the data storage parts 208_1 to 208_4 store a loop counter j (=1). Here, $x_j = x_{j,1} \oplus x_{j,2} \oplus x_{j,3}$, $[x_j]_1 = (x_{j,1}, x_{j,2})$, $[x_j]_2 = (x_{j,2}, x_{j,3})$, $[x_j]_3 = (x_{j,3}, x_{j,1})$, $[x_j]_4 = (x_{j,1} \oplus x_{j,2}, x_{j,2} \oplus x_{j,3})$.

Further, with respect to seed$_i$, it is intended to create a situation where one of the parties (the server apparatuses 200_i (i=1, 2, 3, 4)) is unable to compute the output of h' and the other three parties are able to compute the output of h'. As for seed$_1$",seed$_2$",seed$_3$", it is intended to create a situation where one party out of the server apparatuses 200_1, 200_2, and 200_3 is unable to compute the output of h', and the other two parties are able to compute the output of h'. If this situation can be created, the handling of seed$_i$,seed$_1$", seed$_2$",seed$_3$" is not particularly limited. Note that seed$_i$, seed$_1$",seed$_2$",seed$_3$" herein are merely an example.

(Step B'2)

As indicated by the following equations, each server apparatus 200_i determines the value of $[x]|_0$.

$[x]|_0 = [x_0]$, $[c_0] = [c_0'] = [0]$.

The data storage parts 208_1 to 208_4 store the following, respectively.

$([x]|_0)_1 = ([x]|_{0,1}, [x]|_{0,2})$, $([x]|_0)_2 = ([x]|_{0,2}, [x]|_{0,3})$, $([x]|_0)_3 = ([x]|_{0,3}, [x]|_{0,1})$, $([x]|_0)_4 = ([x]|_{0,1} \oplus [x]|_{0,2}, [x]|_{0,2} \oplus [x]|_{0,3})$, $[c_0], [c_0']$.

The first reshare value computation part 202_1 and the second reshare value computation part 202_2 obtain seed$_1$" from the first basic operation seed storage part 207_1 and the second basic operation seed storage part 207_2, respectively. Next, the first reshare value computation part 202_1 and the second reshare value computation part 202_2 generate $r_{0,2} = h'(sid_0, seed_2'')$, $r_{0,2}' = h'(sid_0', seed_2'')$, $x_{0,2}' = [x]|_{0,2} \oplus r_{0,2} \oplus r_{0,2}'$.

Then, the first reshare value computation part 202_1 stores $x_{0,2}', r_{0,2}, r_{0,2}'$ in the first data storage part 208_1. The second reshare value computation part 202_2 transmits $r_{0,2}, r_{0,2}'$ to the third share construction part 203_3. Further, the second reshare value computation part 202_2 transmits $r_{0,2} \oplus x_{0,2}', x_{0,2}' \oplus r_{0,2}'$ to the fourth share construction part 203_4.

Likewise, the second reshare value computation part 202_2 and the third reshare value computation part 202_3 generate $r_{0,3} = h'(sid_0, seed_3'')$, $r_{0,3}' = h'(sid_0', seed_3'')$, $x_{0,3}' = [x]|_{0,3} \oplus r_{0,3} \oplus r_{0,3}'$. The second reshare value computation part 202_2 stores $x_{0,3}', r_{0,3}, r_{0,3}'$ in the second data storage part 208_2. The third reshare value computation part 202_3 transmits $r_{0,3}, r_{0,3}'$ to the first share construction part 203_1. Further, the third reshare value computation part 202_3 transmits $r_{0,3} \oplus r_{0,3}', r_{0,3}' \oplus x_{0,3}'$ to the fourth share construction part 203_4.

Further, likewise, the third reshare value computation part 202_3 and the first reshare value computation part 202_1 generate $r_{0,1} = h'(sid_0, seed_1'')$, $r_{0,1}' = h'(sid_0', seed_1'')$, $x_{0,1}' = [x]|_{0,1} \oplus r_{0,1} \oplus r_{0,1}'$. The third reshare value computation part 202_3 stores $x_{0,1}', r_{0,1}, r_{0,1}'$ in the third data storage part 208_3. The first reshare value computation part 202_1 transmits $r_{0,1}, r_{0,1}'$ to the second share construction part 203_2. Further, the first reshare value computation part 202_1 transmits $x_{0,1}' \oplus r_{0,1}, r_{0,1} \oplus r_{0,1}'$ to the fourth share construction part 203_4.

Here, $sid_0, sid_0' \in \{0,1\}^*$. For instance $sid_0, sid_0'$ are counters shared by each of the server apparatuses 200_1 to 200_4.

(Step B'3)

Using the values transmitted in the step B'2, the share construction parts 203_1, 203_2, 203_3, and 203_4 construct shares with the following 12 equations.

$[[x]|_{0,2}]_1 = (r_{0,2}, x_{0,2}')$, $[[x]|_{0,2}]_2 = (x_{0,2}', r_{0,2}')$, $[[x]|_{0,2}]_3 = (r_{0,2}', r_{0,2})$, $[[x]|_{0,2}]_4 = (r_{0,2} \oplus x_{0,2}', x_{0,2}' \oplus r_{0,2}')$, $[[x]|_{0,3}]_1 = (r_{0,3}, r_{0,3}')$, $[[x]|_{0,3}]_2 = (r_{0,3}', x_{0,3}')$, $[[x]|_{0,3}]_3 = (x_{0,3}', r_{0,3})$, $[[x]|_{0,3}]_4 = (r_{0,3} \oplus r_{0,3}', r_{0,3}' \oplus x_{0,3}')$, $[[x]|_{0,1}]_1 = (x_{0,1}', r_{0,1})$, $[[x]|x_{0,1}]_2 = (r_{0,1}, r_{0,1}')$, $[[x]|_{0,1}]_3 = (r_{0,1}', x_{0,1}'),$ $[[x]|_{0,1}]_4 = (x_{0,1}' \oplus r_{0,1}, r_{0,1} \oplus r_{0,1}').$ Here, $[[x]|_{0,1}]$, $[[x]|_{0,2}]$, $[[x]|_{0,3}]$ are stored in each i-th data storage part 208_i.

(Step B'4)

The first reshare value computation part 202_1 reads $x_{0,2}'$, $r_{0,2}, r_{0,2}'$ from the first data storage part 208_1. Next, the first reshare value computation part 202_1 transmits $r_{0,2}, r_{0,2}'$ to the third dishonesty detection part 204_3. Further, the first reshare value computation part 202_1 transmits $r_{0,2} \oplus x_{0,2}'$, $x_{0,2} \oplus r_{0,2}'$ to the fourth dishonesty detection part 204_4. The third and the fourth dishonesty detection parts 204_3 and 204_4 read $[[x]|_{0,2}]_3$ stored in the third data storage part 208_3 and $[[x]|_{0,2}]_4$ stored in the fourth data storage part 208_4, respectively, and verify if the values match.

When the values match, the third dishonesty detection part 204_3 or the fourth dishonesty detection part 204_4 broadcasts a string "success" to the server apparatuses 200_1, 200_2, 200_3, and 200_4, and proceeds to the next step. When the values do not match, the third dishonesty detection part 204_3 or the fourth dishonesty detection part 204_4 broadcasts a string "abort" to the server apparatuses 200_1, 200_2, 200_3, and 200_4, and aborts the protocol.

Further, when a large amount of type conversion processing is performed in parallel, the verification described above may be performed by verifying if a hash value for the value obtained by concatenating each of $r_{0,2}, r_{0,2}'$ matches a hash value for the value obtained by concatenating each value with respect to $[[x]|_{0,2}]_4$. In this case, for the communication volume of the entire processing, the hash value for the value obtained by concatenating each of $r_{0,2}, r_{0,2}'$ can be regarded as negligible. The same applies to $r_{0,2} \oplus x_{0,2}'$, $x_{0,2}' \oplus r_{0,2}'$, $[[x]|_{0,2}]_4$.

Likewise, the second reshare value computation part 202_2 reads $x_{0,3}'$, $r_{0,3}, r_{0,3}'$ from the second data storage part 208_2. Next, the second reshare value computation part 202_2 transmits $r_{0,3}, r_{0,3}'$ to the first dishonesty detection part 204_1. Further, the second reshare value computation part 202_2 transmits $r_{0,3} \oplus r_{0,3}'$, $r_{0,3}' \oplus x_{0,3}'$ to the fourth dishonesty detection part 204_4. The first and the fourth dishonesty detection parts 204_1 and 204_4 read $[[x]|_{0,3}]_1$ stored in the first data storage part 208_1 and $[[x]|_{0,3}]_4$ stored in the fourth data storage part 208_4, respectively, and verify if the values match.

When the values match, the first dishonesty detection part 204_1 or the fourth dishonesty detection part 204_4 broadcasts a string "success" to the server apparatuses 200_1, 200_2, 200_3, and 200_4, and proceeds to the next step. When the values do not match, the first dishonesty detection part 204_1 or the fourth dishonesty detection part 204_4 broadcasts a string "abort" to the server apparatuses 200_1, 200_2, 200_3, and 200_4, and aborts the protocol.

When a large amount of type conversion processing is performed in parallel, the verification described above may be performed by verifying if a hash value for the value obtained by concatenating each of $r_{0,3}, r_{0,3}'$ matches a hash value for the value obtained by concatenating each value with respect to $[[x]|_{0,3}]_1$. In this case, for the communication volume of the entire processing, the hash value for the value obtained by concatenating each of $r_{0,3}, r_{0,3}'$ can be regarded as negligible. The same applies to $r_{0,3} \oplus r_{0,3}'$, $r_{0,3}' \oplus x_{0,3}'$, $[[x]|_{0,3}]_4$.

Likewise, the third reshare value computation part 202_3 reads $x_{0,1}', r_{0,1}, r_{0,1}'$ from the third data storage part 208_3. Next, the third reshare value computation part 202_3 transmits $r_{0,1}, r_{0,1}'$ to the second dishonesty detection part 204_2. Further, the third reshare value computation part 202_3 transmits $x_{0,1}' \oplus r_{0,1}, r_{0,1} \oplus r_{0,1}'$ to the fourth dishonesty detection part 204_4. The second and the fourth dishonesty detection parts 204_2 and 204_4 read $[[x]|_{0,1}]_2$ stored in the second data storage part 208_2 and $[[x]|_{0,1}]_4$ stored in the fourth data storage part 208_4, respectively, and verify if the values match.

When the values match, the second dishonesty detection part 204_2 or the fourth dishonesty detection part 204_4 broadcasts a string "success" to the server apparatuses 200_1, 200_2, 200_3, and 200_4, and proceeds to the next step. When the values do not match, the second dishonesty detection part 204_2 or the fourth dishonesty detection part 204_4 broadcasts a string "abort" to the server apparatuses 200_1, 200_2, 200_3, and 200_4, and aborts the protocol.

When a large amount of type conversion processing is performed in parallel, the verification described above may be performed by verifying if a hash value for the value obtained by concatenating each of $r_{0,1}, r_{0,1}'$ matches a hash value for the value obtained by concatenating each value with respect to $[[x]|_{0,1}]_2$. In this case, for the communication volume of the entire processing, a hash value for the value obtained by concatenating each of $r_{0,3}, r_{0,3}'$ can be regarded as negligible. The same applies to $x_{0,1}' \oplus r_{0,1}$, $r_{0,1} \oplus r_{0,1}'$, $[[x]|_{0,1}]_4$.

(Step B'5)

Each server apparatus 200_i reads the loop counter j from the data storage part 208_i. Each server apparatus 200_i executes steps B'6 to B'10 when j<n and executes step B'11 when j=n.

(Step B'6)

Here, we will divide the carry computation process Compute$_2$ Bit$_C$arry into two processes Pre$_C$ompute$_2$ Bit$_C$arry and Post$_C$ompute$_2$ Bit$_C$arry. Note that Compute$_2$ Bit$_C$arry is a process of receiving five inputs, inputs to a full adder $[\alpha_{j-1}]$, $[\beta_{j-1}]$, $[\gamma_{j-1}]$ and carry inputs from lower digits $[c_{j-1}], [c_{j-1}']$, and outputting carry outputs $[c_j], [c_j']$.

Pre$_C$ompute$_2$ Bit$_C$arry denotes communication-free processing of receiving $[[x]|_{j-1,1}]_i$, $[[x]|_{j-1,2}]_i$, $[[x]|_{j-1,3}]_i$, $[x]|_{j-1,i}$, $[c_{j-1}]_i, [c_{j-1}']_i$ (i=1, 2, 3) and outputting $[c_j]_i, [c_j']_i$ (i=1, 2, 3), computed by the logical operation parts 206_i (i=1, 2, 3). Further, Post$_C$ompute$_2$ Bit$_C$arry denotes processing of receiving $[[x]|_{j-1,1}]_i$, $[[x]|_{j-1,2}]_i$, $[[x]|_{j-1,3}]_i$, $[c_{j-1}]_i, [c_{j-1}']_i$ (i=1, 2, 3, 4) and $[c_j]_i, [c_j']_i$ (i=1, 2, 3) and outputting $[c_j]_i, [c_j']_i$ (i=1, 2, 3, 4), computed by the logical operation parts 206_i (i=1, 2, 3, 4) while communicating with each other.

In the step B'6, the logical operation parts 206_i (i=1, 2, 3) receive $[[x]|_{j-1,i}]_i$, $[[x]|_{j-1,2}]_i$, $[[x]|_{j-1,3}]_i$, $[x]|_{j-1,i}$, $[c_{j-1}]_i, [c_{j-1}']_i$ (i=1, 2, 3) as inputs, compute Pre$_C$ompute$_2$Bit$_C$arry and obtain $[c_j]_i, [c_j']_i$ (i=1, 2, 3).

Further, the logical operation parts 206_i (i=1, 2, 3) compute $[x]|_{j,i} = [x_j]_i \oplus [c_j]_i \oplus [c_j']_i$ (i=1, 2, 3) using $[x_j]_i, [c_j]_i, [c_j']_i$ (i=1, 2, 3). The logical operation parts 206_i (i=1, 2, 3) store $[x]|_{j,i}$ (i=1, 2, 3) in the data storage parts 208_i (i=1, 2, 3).

(Step B'7)

The first reshare value computation part 202_1 and the second reshare value computation part 202_2 obtain seed$_1$" from the first basic operation seed storage part 207_1 and the second basic operation seed storage part 207_2, respectively. Next, the first reshare value computation part 202_1 and the second reshare value computation part 202_2 generate $r_{j,2} = h'(sid_j, seed_2")$, $r_{j,2}' = h'(sid_j', seed_2")$, $x_{j,2}' = [x]|_{j,2} \oplus r_{j,2} \oplus r_{j,2}'$.

Then, the first reshare value computation part 202_1 stores $x_{j,2}', r_{j,2}, r_{j,2}'$ in the first data storage part 208_1. The second reshare value computation part 202_2 transmits $r_{j,2}, r_{j,2}'$ to the third share construction part 203_3. Further, the second reshare value computation part 202_2 transmits $r_{j,2} \oplus x_{j,2}'$, $x_{j,2}' \oplus r_{j,2}'$ to the fourth share construction part 203_4.

Likewise, the second reshare value computation part 202_2 and the third reshare value computation part 202_3 generate $r_{j,3} = h'(sid_j, seed_3'')$, $r_{j,3}' = h'(sid_j', seed_3'')$, $x_{j,3}' = [x]|_{j,3} \oplus r_{j,3} \oplus r_{j,3}'$. The second reshare value computation part 202_2 stores $x_{j,3}', r_{j,2}, r_{j,3}'$ in the second data storage part 208_2. The third reshare value computation part 202_3 transmits $r_{j,3}, r_{j,3}'$ to the first share construction part 203_1. Further, the third reshare value computation part 202_3 transmits $r_{j,3} \oplus r_{j,3}'$, $r_{j,3}' \oplus x_{j,3}'$ to the fourth share construction part 203_4.

Further, likewise, the third reshare value computation part 202_3 and the first reshare value computation part 202_1 generate $r_{j,1} = h'(sid_j, seed_1'')$, $r_{j,1}' = h'(sid_j', seed_1'')$, $x_{j,1}' = [x]|_{j,1} \oplus r_{j,1}'$. The third reshare value computation part 202_3 stores $x_{j,1}', r_{j,1}, r_{j,1}'$ in the third data storage part 208_3. The first reshare value computation part 202_1 transmits $r_{j,1}, r_{j,1}'$ to the second share construction part 203_2. Further, the first reshare value computation part 202_1 transmits $x_{j,1}' \oplus r_{j,1}$, $r_{j,1} \oplus r_{j,1}'$ to the fourth share construction part 203_4.

Here, $sid_j, sid_j' \in \{0,1\}^*$. For instance, $sid_1, sid_j'$ are counters shared by each of the server apparatuses 200_1 to 200_4.

Further, the logical operation parts 206_i (i=1, 2, 3, 4) receive $[[x]|_{j-1,1}]_i$, $[[x]|_{j-1,2}]_i$, $[[x]|_{j-1,3}]_i$, $[c_{j-1}]_i$, $[c_{j-1}']_i$ (i=1, 2, 3, 4) and $[c_j]_i, [c_j']_i$ (i=1,2,3) as inputs, compute Post$_C$ompute$_2$ Bit$_C$arry while communicating with each other, and obtain $[c_j]_i, [c_j']_i$ (i=1, 2, 3, 4). The logical operation parts 206_i (i=1, 2, 3, 4) store $[c_j]_i, [c_j']_i$ (i=1, 2, 3, 4) in the data storage parts 208_i (i=1, 2, 3, 4).

As described, the carry computation process can be divided into the first element (Pre$_C$ompute$_2$ Bit$_C$arry) and the second element following the first element (Post$_C$ompute$_2$ Bit$_C$arry). The i-th logical operation part 206_i computes the first element without communicating with the other server apparatuses and performs communication required to compute the reshare values of the shares and communication required to compute the carry computation process of the second element in parallel (the step B'7).

(Step B'8)

The logical operation parts 206_i (i=1, 2, 3, 4) compute $[x]|_{j,i} = [x_j]_i \oplus [c_j]_i \oplus [c_j']_i$ (i=1, 2, 3, 4) using $[x_j]_i, [c_j]_i, [c_j']_i$ (i=1, 2, 3, 4). Here, using the values obtained in the step B'7 and $[x]|_{j,i}$ (i=1, 2, 3, 4), the share construction parts 203_1, 203_2, 203_3, and 203_4 construct shares with the following 12 equations.

$$[[x]|_{j,2}]_1 = (r_{j,2}, x_{j,2}'),$$

$$[[x]|_{j,2}]_2 = (x_{j,2}', r_{j,2}'),$$

$$[[x]|_{j,2}]_3 = (r_{j,2}', r_{j,2}),$$

$$[[x]|_{j,2}]_4 = (r_{j,2} \oplus x_{j,2}', x_{j,2}' \oplus r_{j,2}'),$$

$$[[x]|_{j,3}]_1 = (r_{j,3}, r_{j,3}'),$$

$$[[x]|_{j,3}]_2 = (r_{j,3}', x_{j,3}'),$$

$$[[x]|_{j,3}]_3 = (x_{j,3}', r_{j,3}),$$

$$[[x]|_{j,3}]_4 = (r_{j,3} \oplus r_{j,3}', r_{j,3}' \oplus x_{j,3}'),$$

$$[[x]|_{j,1}]_1 = (x_{j,1}', r_{j,1}),$$

$$[[x]|_{j,1}]_2 = (r_{j,1}, r_{j,1}'),$$

$$[[x]|_{j,1}]_3 = (r_{j,1}', x_{j,1}'),$$

$$[[x]|_{j,1}]_4 = (x_{j,1}' \oplus r_{j,1}, r_{j,1} \oplus r_{j,1}').$$

Here, $[[x]|_{j,1}]_i$, $[[x]|_{j,2}]_i$, $[[x]|_{j,3}]_i$ are stored in each i-th data storage part 208_i. Further, the data storage part 208_i reads the loop counter j and updates the value thereof to j=j+1.

(Step B'9)

The first reshare value computation part 202_1 reads $x_{j,2}', r_{j,2}, r_{j,2}'$ from the first data storage part 208_1. Next, the first reshare value computation part 202_1 transmits $r_{j,2}, r_{j,2}'$ to the third dishonesty detection part 204_3. Further, the first reshare value computation part 202_1 transmits $r_{j,2} \oplus x_{j,2}'$, $x_{j,2}' \oplus r_{j,2}'$ to the fourth dishonesty detection part 204_4. The third and the fourth dishonesty detection parts 204_3 and 204_4 read $[[x]|_{j,2}]_3$ stored in the third data storage part 208_3 and $[[x]|_{j,2}]_4$ stored in the fourth data storage part 208_4, respectively, and verify if the values match.

When the values match, the third dishonesty detection part 204_3 or the fourth dishonesty detection part 204_4 broadcasts a string "success" to the server apparatuses 200_1, 200_2, 200_3, and 200_4, and proceeds to the next step. When the values do not match, the third dishonesty detection part 204_3 or the fourth dishonesty detection part 204_4 broadcasts a string "abort" to the server apparatuses 200_1, 200_2, 200_3, and 200_4, and aborts the protocol.

Further, when a large amount of type conversion processing is performed in parallel, the verification described above may be performed by verifying if a hash value for the value obtained by concatenating each of $r_{j,2}, r_{j,2}'$ matches a hash value for the value obtained by concatenating each value with respect to $[[x]|_{j,2}]_4$. In this case, for the communication volume of the entire processing, the hash value for the value obtained by concatenating each of $r_{j,2}, r_{j,2}'$ can be regarded as negligible. The same applies to $r_{j,2} \oplus x_{j,2}'$, $x_{j,2}' \oplus r_{j,2}', [[x]|_{j,2}]_4$.

Likewise, the second reshare value computation part 202_2 reads $x_{j,3}', r_{j,3}$, from the second data storage part 208_2. Next, the second reshare value computation part 202_2 transmits $r_{j,3}, r_{j,3}'$ to the first dishonesty detection part 204_1. Further, the second reshare value computation part 202_2 transmits $r_{j,3} \oplus r_{j,3}'$, $r_{j,3}' \oplus x_{j,3}'$ to the fourth dishonesty detection part 204_4. The first and the fourth dishonesty detection parts 204_1 and 204_4 read $[[x]|_{j,3}]_1$ stored in the first data storage part 208_1 and $[[x]|_{j,3}]_4$ stored in the fourth data storage part 208_4, respectively, and verify if the values match.

When the values match, the first dishonesty detection part 204_1 or the fourth dishonesty detection part 204_4 broadcasts a string "success" to the server apparatuses 200_1, 200_2, 200_3, and 200_4, and proceeds to the next step. When the values do not match, the first dishonesty detection part 204_1 or the fourth dishonesty detection part 204_4 broadcasts a string "abort" to the server apparatuses 200_1, 200_2, 200_3, and 200_4, and aborts the protocol.

When a large amount of type conversion processing is performed in parallel, the verification described above may be performed by verifying if a hash value for the value obtained by concatenating each of $r_{j,3}, r_{j,3}'$ matches a hash value for the value obtained by concatenating each value with respect to $[[x]|_{j,3}]_1$. In this case, for the communication volume of the entire processing, the hash value for the value obtained by concatenating each of $r_{j,3}, r_{j,3}'$ can be regarded as negligible. The same applies to $r_{j,3} \oplus r_{j,3}'$, $r_{j,3}' \oplus x_{j,3}', [[x]|_{j,3}]_4$.

Likewise, the third reshare value computation part 202_3 reads $x_{j,1}', r_{j,1}, r_{j,1}'$ from the third data storage part 208_3. Next, the third reshare value computation part 202_3 transmits $r_{j,1}, r_{j,1}'$ to the second dishonesty detection part 204_2.

Further, the third reshare value computation part 202_3 transmits $x_{j,1}' \oplus r_{j,1}, r_{j,1} \oplus r_{j,1}'$ to the fourth dishonesty detection part 204_4. The second and the fourth dishonesty detection parts 204_2 and 204_4 read $[[x]|_{j,1}]_2$ stored in the second data storage part 208_2 and $[[x]|_{j,1}]_4$ stored in the fourth data storage part 208_4, respectively, and verify if the values match.

When the values match, the second dishonesty detection part 204_2 or the fourth dishonesty detection part 204_4 broadcasts a string "success" to the server apparatuses 200_1, 200_2, 200_3, and 200_4, and proceeds to the next step. When the values do not match, the second dishonesty detection part 204_2 or the fourth dishonesty detection part 204_4 broadcasts a string "abort" to the server apparatuses 200_1, 200_2, 200_3, and 200_4, and aborts the protocol.

When a large amount of type conversion processing is performed in parallel, the verification described above may be performed by verifying if a hash value for the value obtained by concatenating each of $r_{j,1}, r_{j,1}'$ matches a hash value for the value obtained by concatenating each value with respect to $[[x]|_{j,1}]_2$. In this case, for the communication volume of the entire processing, a hash value for the value obtained by concatenating each of $r_{j,3}, r_{j,3}'$ can be regarded as negligible. The same applies to $x_{j,1}' \oplus r_{j,1}, r_{j,1} \oplus r_{j,1}'[[x]|_{j,1}]_4$.

Note that one may execute all the loops of the step B'9 in parallel when j=n−1 rather than execute each loop. Further, the step B'9 can be executed in parallel with the step B'4.
(Step B'10)

Each i-th dishonesty detection part 204_i performs dishonesty detection by comparing the transmitted/received data in Post$_C$ompute$_2$ Bit$_C$arry in the step B'7. When not detecting dishonesty, the first to the fourth server apparatuses 200_1, 200_2, 200_3, and 200_4 broadcast a string "success" to each server apparatus. When detecting dishonesty, the first to the fourth server apparatuses 200_1, 200_2, 200_3, and 200_4 broadcast a string "abort" to each server apparatus and abort the protocol. This is achieved by the above-described four-party secure computation capable of detecting dishonesty. The step B'10 can be executed in parallel with the steps B'4 and B'9. Further, one may execute all the loops of the step B'10 in parallel when j=n−1 rather than execute each loop.
(Step B'11)

Each i-th arithmetic operation part 205_i reads $(([x]|_j)_i)_{j=0}^{n-1}$ from the data storage part 208_i. Then the following computation is executed. $[x]^n = \Sigma_{j=0}^{n-1} 2^j \cdot [x]|_j$. Each i-th arithmetic operation part 205_i stores $[x]_i^n$ in the data storage part 208_i.

According to the second example embodiment, the same effects as those of the first example embodiment can be obtained. Note that, with respect to the first effect of the first example embodiment, the second example embodiment is more efficient in terms of the communication cost of ring composition. In the second example embodiment, the communication rounds are reduced by dividing the carry computation process Compute$_2$ Bit$_C$arry and performing the share resharing and the carry computation process that involves communication in parallel. As a result, the communication cost of ring composition in the second example embodiment is (16n−16) bits·n−1 rounds.

Third Example Embodiment

A type conversion processing system relating to a third example embodiment will be described with reference to FIGS. 9 to 12.

Figure 9:
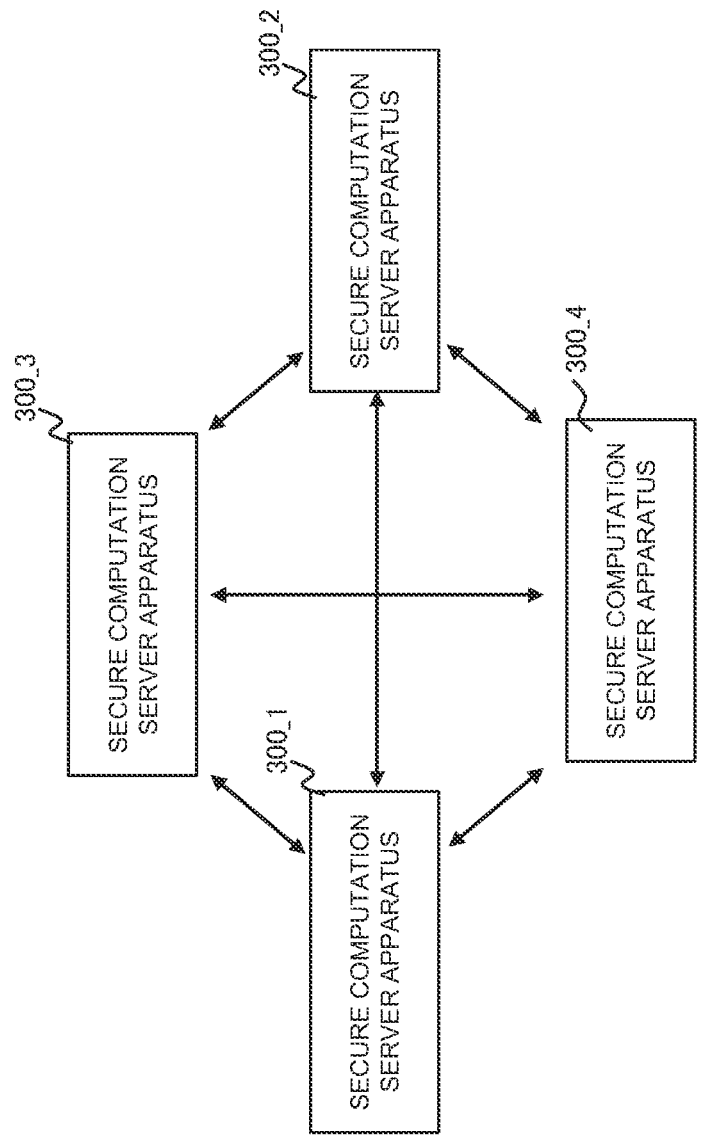
FIG. 9 is a block diagram illustrating an example of the functional configuration of a type conversion system according to a third example embodiment.

FIG. 9 is a block diagram illustrating an example of the functional construction of the type conversion processing system according to the third example embodiment. The type conversion processing system relating to the third example embodiment is a variation of the type conversion processing systems relating to the first and the second example embodiments described above.

Figure 10:
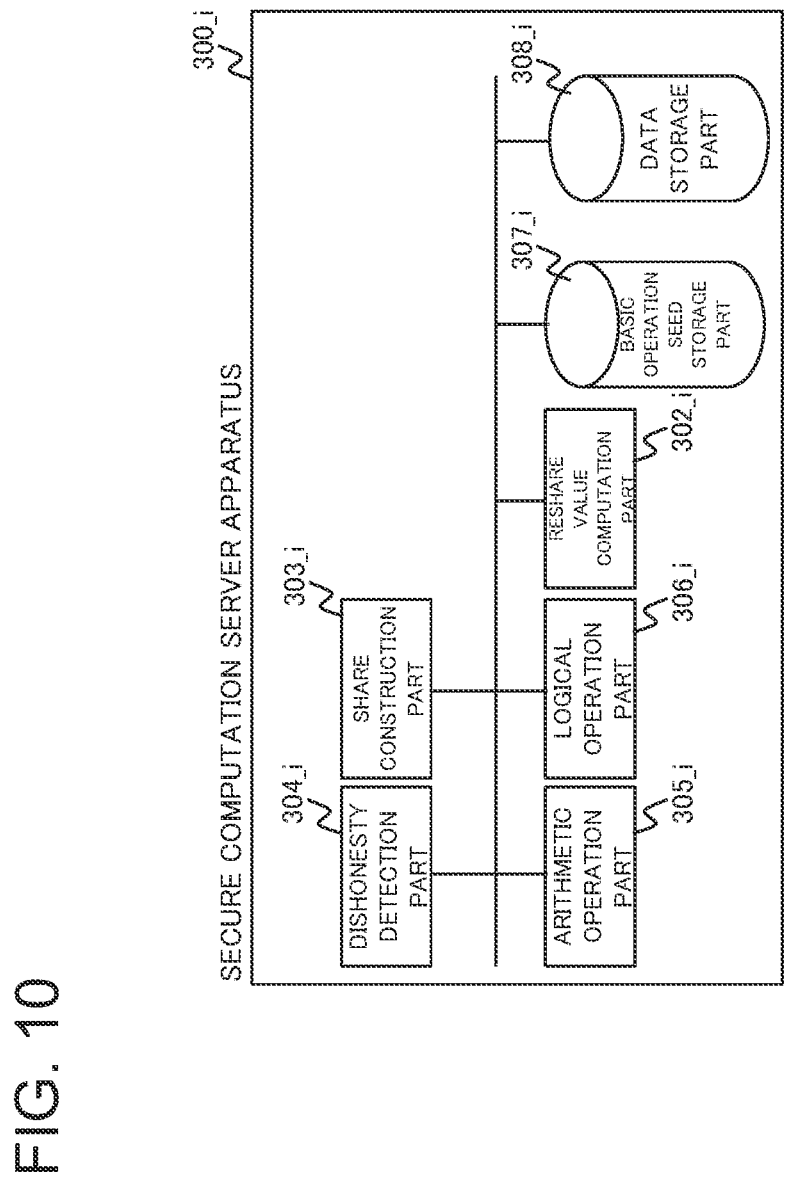
FIG. 10 is a block diagram illustrating the functional configuration of a server apparatus according to the third example embodiment.

With reference to FIG. 9, the type conversion processing system according to the third example embodiment is constituted by i-th server apparatuses (i=1, 2, 3, 4) referred to in FIG. 10 described later. In the type conversion processing system according to the third example embodiment, the server apparatuses 300_1, 300_2, 300_3, and 300_4 are connected to each other via a network and are able to communicate with each other. FIG. 10 is a block diagram illustrating an example of the functional construction of the i-th server apparatus 300_i (i=1, 2, 3, 4).

As shown in FIG. 10, the i-th server apparatus 300_i includes an i-th reshare value computation part 302_i, an i-th share construction part 303_i, an i-th dishonesty detection part 304_i, an i-th arithmetic operation part 305_i, an i-th logical operation part 306_i, an i-th basic operation seed storage part 307_i, and an i-th data storage part 308_i. Further, the i-th reshare value computation part 302_i, the i-th share construction part 303_i, the i-th dishonesty detection part 304_i, the i-th arithmetic operation part 305_i, the i-th logical operation part 306_i, the i-th basic operation seed storage part 307_i, and the i-th data storage part 308_i are connected to each other.

In the type conversion processing system configured as described above, for a value input by any of the first to the fourth server apparatuses 300_1 to 300_4 $x \in \mathbb{Z}_{2^n}$ or shares stored in the first to the fourth data storage parts 308_1 to 308_4 $[x]^n$ or a share supplied by an external apparatus that is not any of the first to the fourth server apparatuses 300_1 to 300_4 $[x]^n$, while the value of x is not known from the input and the values during the computation process, $[x_0], \ldots, [x_{n-1}](x = \Sigma_{i=0}^{n-1} 2^i \cdot x_1, x_1 \in \mathbb{Z}_2)$ is computed and the result is stored in the first to the fourth data storage parts 308_1 to 308_4. Shares of the computation result above may be reconstructed by having the first to the fourth server apparatuses 300_1 to 300_4 transmit/receive the shares. Alternatively, the shares may be transmitted to an external apparatus that is not any of the first to the fourth server apparatuses 300_1 to 300_4 and reconstructed thereby.

Further, in the type conversion processing system configured as described above, for a value $x_0, \ldots, x_{n-1}$ $(x = \Sigma_{i=0}^{n-1} 2^i \cdot x_i, x_i \in \mathbb{Z}_2)$ input by any of the first to the fourth server apparatuses 300_1 to 300_4 or shares $[x_0], \ldots, [x_{n-1}](x = \Sigma_{i=0}^{n-1} 2^i \cdot x_i, x_i \in \mathbb{Z}_2)$ stored in the first to the fourth data storage parts 308_1 to 308_4 or a share $[x_0], \ldots, [x_{n-1}](x = \Sigma_{i=0}^{n-1} 2^i \cdot x_i, x_i \in \mathbb{Z}_2)$ supplied by an external apparatus that is not any of the first to the fourth server apparatuses 300_1 to 300_4, while the value of $x_0, \ldots, x_{n-1}$ $(x = \Sigma_{i=0}^{n-1} 2^i \cdot x_i, x_i \in \mathbb{Z}_2)$ is not known from the input and the values during the computation process, $[x]^n$ is computed and the result is stored in the first to the fourth data storage parts 308_1 to 308_4. Shares of the computation result above may be reconstructed by having the first to the fourth server apparatuses 300_1 to 300_4 transmit/receive the shares. Alternatively, the shares may be transmitted to an external apparatus that is not any of the first to the fourth server apparatuses 300_1 to 300_4 and reconstructed thereby.

Figure 11:
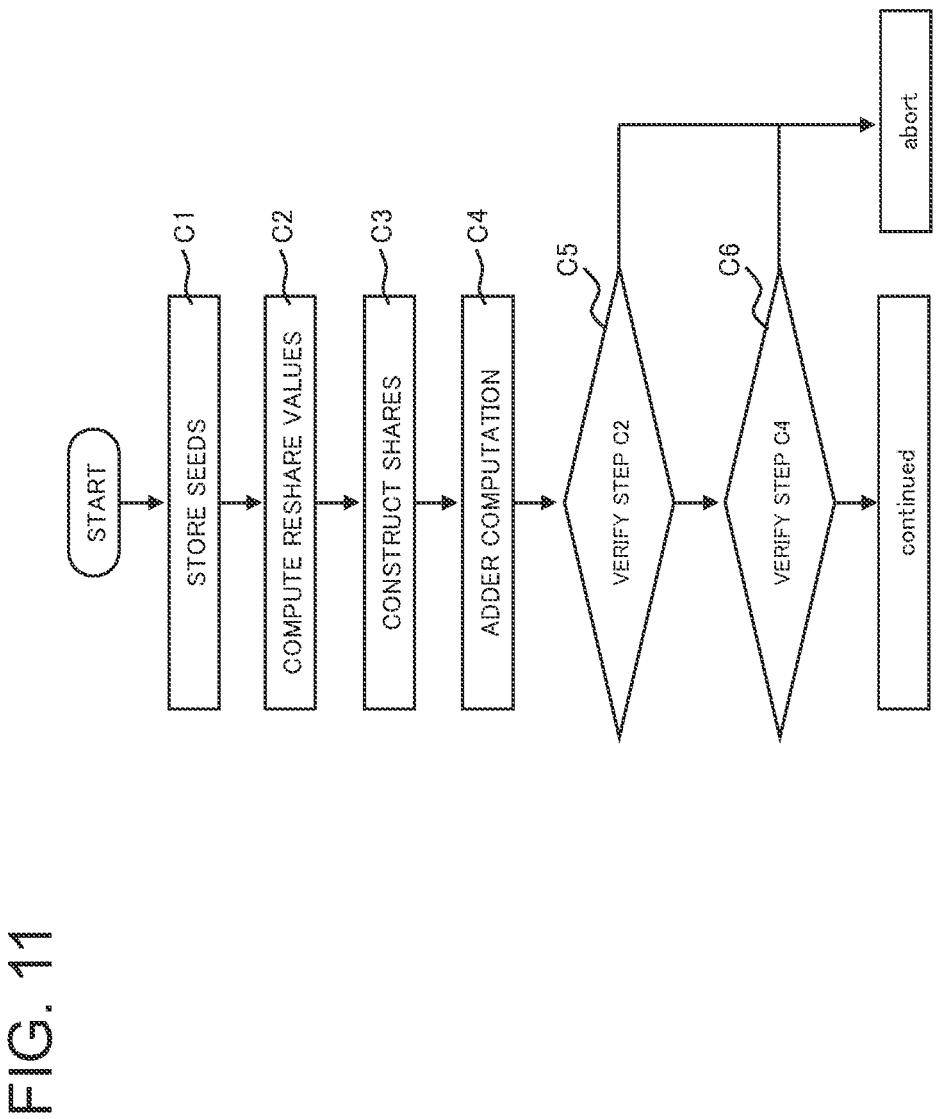
FIG. 11 is a flowchart showing an example of the operation by the type conversion system with respect to bit decomposition in the third example embodiment.
Figure 12:
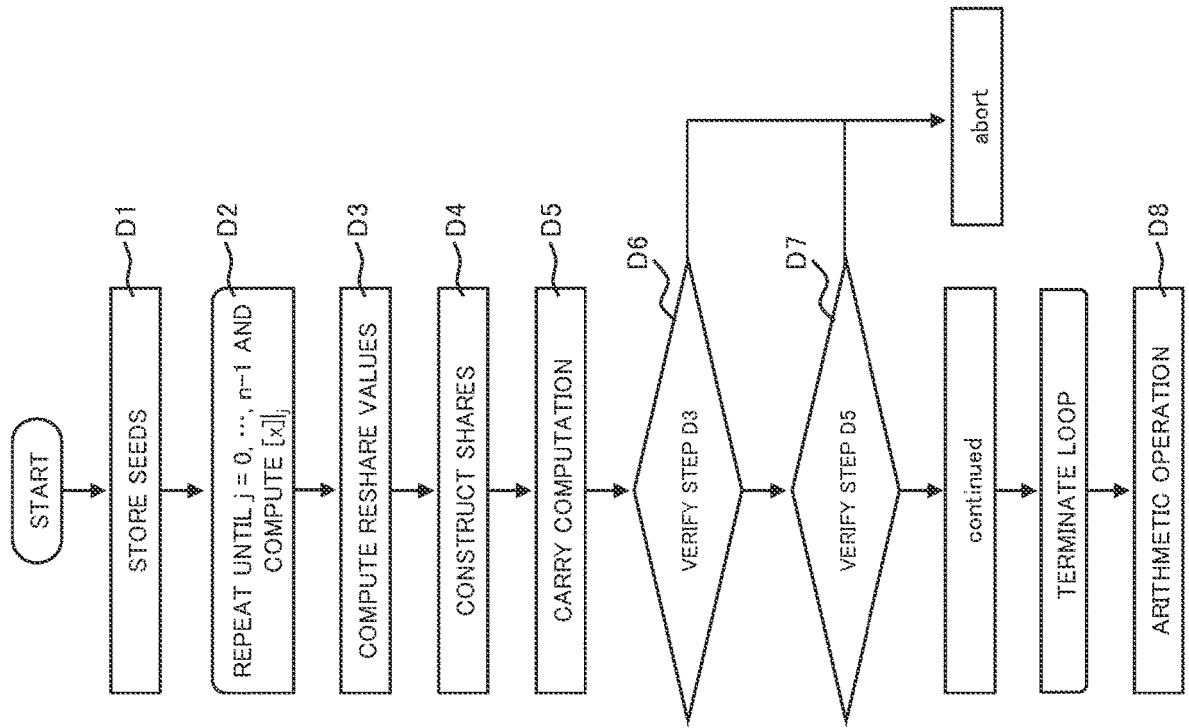
FIG. 12 is a flowchart showing an example of the operation by the type conversion system with respect to ring composition in the third example embodiment.

Next, the operation of the type conversion processing system and the first to the fourth server apparatuses 300_1 to 300_4 in the third example embodiment will be described in detail. FIG. 11 is a flowchart showing an example of the operation by the first to the fourth server apparatuses 300_1 to 300_4 with respect to bit decomposition. FIG. 12 is a flowchart showing an example of the operation by the first to the fourth server apparatuses 300_1 to 300_4 with respect to ring composition.

First, the flowchart regarding bit decomposition shown in FIG. 11 will be described.

(Step C1)
The basic operation seed storage parts 307_1, 307_2, 307_3, and 307_4 store the following, respectively.
($seed_1, seed_2, seed_4$),
($seed_2, seed_3, seed_4$),
($seed_3, seed_1, seed_4$),
($seed_1, seed_2, seed_3$).

The server apparatuses 300_1 to 300_4 share a pseudorandom function h. Further, let $seed_i \in \{0,1\}^*$ (i=1, 2, 3, 4) and the pseudorandom function is $h:\{0,1\}^* \times \{0,1\}^* \to \{0,1\}^n$. The data storage parts 308_1 to 308_4 store the following, respectively.

$[x]_1^n$, $[x]_2^n$, $[x]_3^n$, $[x]_4^n$.

Further, with respect to $seed_i$, it is intended to create a situation where one of the parties (the server apparatuses 300_i (i=1, 2, 3, 4)) is unable to compute the output of h, and the other three parties are able to compute the output of h. If this situation can be created, the handling of $seed_i$ is not particularly limited. Note that $seed_i$ herein is merely an example.

(Step C2)
The first reshare value computation part 302_1 and the second reshare value computation part 302_2 obtain $seed_4$ from the first basic operation seed storage part 307_1 and the second basic operation seed storage part 307_2, respectively. Next, the first, the second, and the third reshare value computation parts 302_1, 302_2, and 303_3 generate $r_2|_j = (h(sid\|2, seed_4))|_j$ (j=0, . . . n−1).

Then, the first reshare value computation part 302_1 stores $r_2|_j$ (j=0, . . . n−1) in the first data storage part 308_1. The third reshare value computation part 302_3 transmits $r_2|_j$ (j=0, . . . n−1) to the third share construction part 303_3. Further, the second reshare value computation part 302_2 transmits $r_2|_j \oplus x_2|_j$ (j=0, . . . n−1) to the fourth share construction part 303_4.

Likewise, the first, the second, and the third reshare value computation parts 302_1, 302_2, and 302_3 generate $r_3|_j = (h(sid\|3, seed_4))|_j$ (j=0, . . . n−1). The second reshare value computation part 302_2 stores $r_3|_j$ (j=0, . . . n−1) in the second data storage part 308_2. The first reshare value computation part 302_1 transmits $r_3|_j$ (j=0, . . . n−1) to the first share construction part 303_1. Further, the third reshare value computation part 302_3 transmits $r_3|_j \oplus x_3|_j$ (j=0, . . . n−1) to the fourth share construction part 303_4.

Further, likewise, the first, the second, and the third reshare value computation parts 302_1, 302_2, and 302_3 generate $r_1|_j = (h(sid\|1, seed_4))|_j$ (j=0, . . . n−1). The third reshare value computation part 302_3 stores $r_1|_j$ (j=0, . . . n−1) in the third data storage part 308_3. The second reshare value computation part 302_2 transmits $r_1|_j$ (j=0, . . . n−1) to the second share construction part 303_2. Further, the first reshare value computation part 302_1 transmits $x_1|_j \oplus r_1|_j$ (j=0, . . . n−1) to the fourth share construction part 303_4.

Here, $sid \in \{0,1\}^*$. For instance, sid is a counter shared by each of the server apparatuses 300_1 to 300_4.

(Step C3)
Using the values transmitted in the step C2, the share construction parts 303_1, 303_2, 303_3, and 303_4 construct shares with the following 12 equations.

$[x_2|_j]_1 = (r_2|_j, x_2|_j)$, $[x_2|_j]_2 = (x_2|_j, r_2|_j)$, $[x_2|_j]_3 = (r_2|_j, r_2|_j)$, $[x_2|_j]_4 = (r_2|_j \oplus x_2|_j, x_2|_j \oplus r_2|_j)$, $[x_3|_j]_1 = (r_3|_j, r_3|_j)$, $[x_3|_j]_2 = (r_3|_j, x_3|_j)$, $[x_3|_j]_3 = (x_3|_j, r_3|_j)$, $[x_3|_j]_4 = (0, x_3|_j \oplus r_3|_j)$, $[x_1|_j]_1 = (x_1|_j, r_1|_j)$, $[x_1|_j]_2 = (r_1|_j, r_1|_j)$, $[x_1|_j]_3 = (r_1|_j, x_1|_j)$, $[x_1|_j]_4 = (x_1|_j \oplus r_1|_j, 0)$.

Here, for $x \in \mathbb{Z}_{2^n}$, $x|_j \in \mathbb{Z}_2$ denotes the j-th bit of x (j=0, . . . , n−1). $[x_1|_j]_i$, $[x_2|_j]_i$, $[x_3|_j]_i$ are stored in each i-th data storage part 308_i.

In the 12 equations in the step C3, when $x_2|_j = x_1' \oplus x_2' \oplus x_3'$, $[x_2|_j]$ can be substituted by $x_1' = r_2|_j$, $x_2' = x_2|_j$, $x_3' = r_2|_j$. When computing the reshare values of the value x, since $x_1' = x_3'$, as indicated above, each reshare value computation part 302_i generates random numbers so that two values out of x1 to x3 are equal where the value x is the exclusive OR of x1, x2, and x3.

(Step C4)
By communicating with each other, the i-th logical operation parts 306_i compute n-bit adder processing BitwiseAdd as follows. Here, BitwiseAdd is a process of receiving, for instance, $([a_1|_j])_{j=0}^{n-1}$, $([a_2|_j])_{j=0}^{n-1}$ as input and outputting $([(a_1+a_2)|_j])_{j=0}^{n-1}$.

$([(x_1+x_2)|_j])_{j=0}^{n-1} \leftarrow \text{BitwiseAdd}(([x_1|_j])_{j=0}^{n-1}, ([x_2|_j])_{j=0}^{n-1})$, $([(x_1+x_2+x_3)|_j])_{j=0}^{n-1} \leftarrow \text{BitwiseAdd}(([(x_1+x_2)|_j])_{j=0}^{n-1}, ([x_3|_j])_{j=0}^{n-1})$.

Here, since $x_1+x_2+x_3=x$, $([x|_j])_{j=0}^{n-1}$ can be computed. Note that $([x|_j])_{j=0}^{n-1}$ denotes a series of shares $[x|_0], \ldots, [x|_{n-1}]$. Each i-th logical operation part 306_i stores $([x|_j]_i)_{j=0}^{n-1}$ in the data storage part 308_i thereof.

(Step C5)
The first reshare value computation part 302_1 reads $x_2|_j, r_2|_j$ (j=0, . . . n−1) from the first data storage part 308_1. Next, the first reshare value computation part 302_1 transmits $r_2|_j \oplus x_2|_j$ (j=0, . . . n−1) to the fourth dishonesty detection part 304_4. The fourth dishonesty detection part 304_4 reads $[x_2|_j]_4 = ((x_2|_j)_{4,1}, (x_2|_j)_{4,2})$ stored in the fourth data storage part 308_4 and verifies if $(x_2|_j)_{4,1} = (x_2|_j)_{4,2} = r_2|_j \oplus x_2|_j$ holds.

When it holds, the fourth dishonesty detection part 304_4 broadcasts a string "success" to the server apparatuses 300_1, 300_2, 300_3, and 300_4, and proceeds to the next step. When it does not hold, the fourth dishonesty detection part 304_4 broadcasts a string "abort" to the server apparatuses 300_1, 300_2, 300_3, and 300_4, and aborts the protocol.

Likewise, the second reshare value computation part 302_2 reads $x_3|_j, r_3|_j$ (j=0, ... n−1) from the second data storage part 308_2. Next, the second reshare value computation part 302_2 transmits $x_3|_j \oplus r_3|_j$ (j=0, ... n−1) to the fourth dishonesty detection part 304_4. The fourth dishonesty detection part 304_4 reads $[x_3|_j]_4 = (0, (x_3|_j)_{4,2})$ stored in the fourth data storage part 308_4 and verifies if $(x_3|_j)_{4,2} = x_3|_j \oplus r_3|_j$ holds.

When it holds, the fourth dishonesty detection part 304_4 broadcasts a string "success" to the server apparatuses 300_1, 300_2, 300_3, and 300_4, and proceeds to the next step. When it does not hold, the fourth dishonesty detection part 304_4 broadcasts a string "abort" to the server apparatuses 300_1, 300_2, 300_3, and 300_4, and aborts the protocol.

Further, likewise, the third reshare value computation part 302_3 reads $x_1|_j, r_1|_j$ (j=0, ... n−1) from the third data storage part 308_3. Next, the third reshare value computation part 302_3 transmits $x_1|_j \oplus r_1|_j$ (j=0, ... n−1) to the fourth dishonesty detection part 304_4. The fourth dishonesty detection part 304_4 reads $[x_1|_j]_4 = ((x_1|_j)_{4,1}, 0)$ stored in the fourth data storage part 308_4 and verifies if $(x_1|_j)_{4,1} = x_1|_j \oplus r_1|_j$ holds.

When it holds, the fourth dishonesty detection part 304_4 broadcasts a string "success" to the server apparatuses 300_1, 300_2, 300_3, and 300_4, and proceeds to the next step. When it does not hold, the fourth dishonesty detection part 304_4 broadcasts a string "abort" to the server apparatuses 300_1, 300_2, 300_3, and 300_4, and aborts the protocol.

Further, when a large amount of type conversion processing is performed in parallel, $x_i|_j \oplus r_i|_j$ (i=1, 2, 3; j=0, ... n−1) may be verified by transmitting hash values for the value obtained by concatenating each value thereof and comparing the hash values. For the computational amount of the entire processing, the amount required to transmit the hash values can be regarded as negligible.

(Step C6)

Each i-th dishonesty detection part 304_i performs dishonesty detection by comparing the transmitted/received data in BitwiseAdd in the step C4. When not detecting dishonesty, the first to the fourth server apparatuses 300_1, 300_2, 300_3, and 300_4 broadcast a string "success" to each server apparatus. When detecting dishonesty, the first to the fourth server apparatuses 300_1, 300_2, 300_3, and 300_4 broadcast a string "abort" to each server apparatus and abort the protocol. This is achieved by the above-described four-party secure computation capable of detecting dishonesty. The step C6 can be executed in parallel with the step C5.

The following describes the flowchart of ring composition shown in FIG. 12.

(Step D1)

The basic operation seed storage parts 307_1, 307_2, 307_3, and 307_4 store the following, respectively.

($seed_1, seed_2, seed_4$),
($seed_2, seed_3, seed_4$),
($seed_3, seed_1, seed_4$),
($seed_1, seed_2, seed_3$).

The server apparatuses 300_1 to 300_4 share a pseudo-random function h'. Further, let $seed_i$, $sid \in \{0,1\}^*$ (i=1, 2, 3, 4), and the pseudorandom function h': $\{0,1\}^* \times \{0,1\}^* \to \{0,1\}$. Then, the data storage parts 308_1 to 308_4 store the following, respectively.

$([x_j]_1)_{j=0}^{n-1}$, $([x_j]_2)_{j=0}^{n-1}$, $([x_j]_3)_{j=0}^{n-1}$, $([x_j]_4)_{j=0}^{n-1}$.

Further, the data storage parts 308_1 to 308_4 store a loop counter j (=0). Let $x_j = x_{j,1} \oplus x_{j,2} \oplus x_{j,3}$ and $[x_j]_1 = (x_{j,1}, x_{j,2})$, $[x_j]_2 = (x_{j,2}, x_{j,3})$, $[x_j]_3 = (x_{j,3}, x_{j,1})$, $[x_j]_4 = (x_{j,1} \oplus x_{j,2}, x_{j,2} \oplus x_{j,3})$.

Further, with respect to $seed_i$, it is intended to create a situation where one of the parties (the server apparatuses 300_i (i=1, 2, 3, 4)) is unable to compute the output of h' and the other three parties are able to compute the output of h'. If this situation can be created, the handling of $seed_i$ is not particularly limited. Note that $seed_i$ herein is merely an example.

(Step D2)

Each server apparatus 300_i reads the loop counter j from the data storage part 308_i. Each server apparatus 300_i executes steps D3 to D7 when j<n and executes step D8 when j=n.

Further, the arithmetic operation parts 305_1 to 305_4 read $[x_j], [c_j], [c_j']$ from the data storage parts 308_1 to 308_4. Then, the arithmetic operation parts 305_1 to 305_4 compute $[x]|_j = [x_j] \oplus [c_j] \oplus [c_j']$ and store $[x]|_j$ in each of the data storage parts 308_1 to 308_4. Note that $[x]|_j$ stored by the i-th data storage part 308_i is denoted as $([x]|_j)_i = (([x]|_j)_{i,1}, ([x]|_j)_{i,2})$.

Further, let $([x]|_j)_1 = ([x]|_{j,1}, [x]|_{j,2}), ([x]|_j)_2 = ([x]|_{j,2}, [x]|_{j,3}), ([x]|_j)_3 = ([x]|_{j,3}, [x]|_{j,1}), ([x]|_j)_4 = ([x]|_{j,1} \oplus [x]|_{j,2}, [x]|_{j,2} \oplus [x]|_{j,3})$.

(Step D3)

The first, the second, and the third reshare value computation parts 302_1, 302_2, and 302_3 obtain $seed_4$ from the first, the second, and the third basic operation seed storage parts 307_1, 307_2 and 307_3, respectively. Next, the first, the second, and the third reshare value computation parts 302_1, 302_2, and 302_3 generate $r_{j,2} = h'(sid_j \| 2, seed_4)$ (j=0, ... n−1). Then, the first reshare value computation part 302_1 transmits $r_{j,2}$ (j=0, ... n−1) to the first share construction part 303_1. The third reshare value computation part 302_3 transmits $r_{j,2}$ (j=0, ... n−1) to the third share construction part 303_3. The second reshare value computation part 302_2 reads $[x]|_{j,2}$ from the second data storage part 308_2 and transmits $r_{j,2} \oplus [x]|_{j,2}$ (j=0, ... n−1) to the fourth share construction part 303_4.

Likewise, the first, the second, and the third reshare value computation parts 302_1, 302_2, and 303_3 generate $r_{j,3} = h'(sid_1 \| 3, seed_4)$. The second reshare value computation part 302_2 transmits $r_{j,3}$ (j=0, ... n−1) to the second share construction part 303_2. The first reshare value computation part 302_1 transmits $r_{j,3}$ (j=0, ... n−1) to the first share construction part 303_1. Further, the third reshare value computation part 302_3 reads $[x]|_{j,3}$ from the third data storage part 308_3 and transmits $r_{j,3} \oplus [x]|_{j,3}$ (j=0, ... n−1) to the fourth share construction part 303_4.

Further, likewise, the first, the second, and the third reshare value computation parts 302_1, 302_2, and 303_3 generate $r_{j,1} = h'(sid_j \| 1, seed_4)$ (j=0, ... n−1). The third reshare value computation part 302_3 transmits $r_{j,1}$ (j=0, ... n−1) to the third share construction part 303_3. The second reshare value computation part 302_2 transmits $r_{j,1}$ (j=0, ... n−1) to the second share construction part 303_2. Further, the first reshare value computation part 302_1 reads $[x]|_{j,1}$ from the first data storage part 308_1 and transmits $[x]|_{j,1} \oplus r_{j,1}$ (j=0, ... n−1) to the fourth share construction part 303_4. Here, $sid_j \in \{0,1\}^*$. $sid_j$ is, for instance, a counter shared by each of the server apparatuses 300_1 to 300_4.

(Step D4)

Using the values transmitted in the step D3 and $([x]|_j)_i$ stored in each i-th data storage part 308_i, the share construction parts 303_1, 303_2, 303_3, and 303_4 construct shares with the following 12 equations.

$$[[x]|_{j,2}]_1 = (r_{j,2}, [x]|_{j,2}),$$

$$[[x]|_{j,2}]_2 = ([x]|_{j,2}, r_{j,2}),$$

$$[[x]|_{j,2}]_3 = (r_{j,2}, r_{j,2}),$$

$$[[x]|_{j,2}]_4 = (r_{j,2} \oplus [x]|_{j,2}, [x]|_{j,2} \oplus r_{j,2}),$$

$$[[x]|_{j,3}]_1 = (r_{j,3}, r_{j,3}),$$

$$[[x]|_{j,3}]_2 = (r_{j,3}, [x]|_{j,3}),$$

$$[[x]|_{j,3}]_3 = ([x]|_{j,3}, r_{j,3}),$$

$$[[x]|_{j,3}]_4 = (0, r_{j,3} \oplus [x]|_{j,3}),$$

$$[[x]|_{j,1}]_1 = ([x]|_{j,1}, r_{j,1}),$$

$$[[x]|_{j,1}]_2 = (r_{j,1}, r_{j,1}),$$

$$[[x]|_{j,1}]_3 = (r_{j,1}, [x]|_{j,1}),$$

$$[[x]|_{j,1}]_4 = ([x]|_{j,1} \oplus r_{j,1}, 0).$$

Here, $[[x]|_{j,1}]_i$, $[[x]|_{j,2}]_i$, $[[x]|_{j,3}]_i$ are stored in each i-th data storage part 308_i.

(Step D5)

The same process as in the step B5 is performed.

(Step D6)

The first reshare value computation part 302_1 reads $r_{j,2}$, $[x]|_{j,2}$ (j=0, ... n−1) from the first data storage part 308_1. Next, the first reshare value computation part 302_1 transmits $r_{j,2} \oplus [x]|_{j,2}$ (j=0, ... n−1) to the fourth dishonesty detection part 304_4. The fourth dishonesty detection part 304_4 reads $[[x]|_{j,2}]_4 = ([x]|_{j,2,1}, [x]|_{j,2,2})$ stored in the fourth data storage part 308_4 and verifies if $[x]|_{j,2,1} = [x]|_{j,2,2} = r_{j,2} \oplus [x]|_{j,2}$ holds.

When it holds, the fourth dishonesty detection part 304_4 broadcasts a string "success" to the server apparatuses 300_1, 300_2, 300_3, and 300_4, and proceeds to the next step. When it does not hold, the fourth dishonesty detection part 304_4 broadcasts a string "abort" to the server apparatuses 300_1, 300_2, 300_3, and 300_4, and aborts the protocol.

Likewise, the second reshare value computation part 302_2 reads $r_{j,3}, [x]|_{j,3}$ (j=0, ... n−1) from the second data storage part 308_2. Next, the second reshare value computation part 302_2 transmits $r_{j,3} \oplus [x]|_{j,3}$ (j=0, ... n−1) to the fourth dishonesty detection part 304_4. The fourth dishonesty detection part 304_4 reads $[[x]|_{j,3}]_4 = (0, [x]|_{j,3,2})$ stored in the fourth data storage part 308_4 and verifies if $[x]|_{j,3,2} = r_{j,3} \oplus [x]|_{j,3}$ holds.

When it holds, the fourth dishonesty detection part 304_4 broadcasts a string "success" to the server apparatuses 300_1, 300_2, 300_3, and 300_4, and proceeds to the next step. When it does not hold, the fourth dishonesty detection part 304_4 broadcasts a string "abort" to the server apparatuses 300_1, 300_2, 300_3, and 300_4, and aborts the protocol.

Further, likewise, the third reshare value computation part 302_3 reads $r_{j,1}, [x]|_{j,1}$ (j=0, ... n−1) from the third data storage part 308_3. Next, the third reshare value computation part 302_3 transmits $[x]|_{j,1} \oplus r_{j,1}$ (j=0, ... n−1) to the fourth dishonesty detection part 304_4. The fourth dishonesty detection part 304_4 reads $[[x]|_{j,1}]_4 = ([x]|_{j,1,1}, 0)$ stored in the fourth data storage part 308_4 and verifies if $[x]|_{j,1,1} = [x]|_{j,1} \oplus r_{j,1}$ holds.

When it holds, the fourth dishonesty detection part 304_4 broadcasts a string "success" to the server apparatuses 300_1, 300_2, 300_3, and 300_4, and proceeds to the next step. When it does not hold, the fourth dishonesty detection part 304_4 broadcasts a string "abort" to the server apparatuses 300_1, 300_2, 300_3, and 300_4, and aborts the protocol.

Further, when a large amount of type conversion processing is performed in parallel, $r_{j,1} \oplus x_{j,1}$ (i=1, 2, 3; j=0, ... n−1) may be verified by transmitting hash values for the value obtained by concatenating each value thereof and comparing the hash values. For the computational amount of the entire processing, the amount required to transmit the hash values can be regarded as negligible.

(Step D7)

Each i-th dishonesty detection part 304_i performs dishonesty detection by comparing the transmitted/received data in Compute$_2$ Bit$_C$arry in the step D5. When not detecting dishonesty, the first to the fourth server apparatuses 300_1, 300_2, 300_3, and 300_4 broadcast a string "success" to each server apparatus. When detecting dishonesty, the first to the fourth server apparatuses 300_1, 300_2, 300_3, and 300_4 broadcast a string "abort" to each server apparatus and abort the protocol. This is achieved by the above-described four-party secure computation capable of detecting dishonesty. The step D7 can be executed in parallel with the step D6. Further, one may execute n loops of the steps D6 and D7 in parallel when j=n−1 rather than execute each loop.

(Step D8)

The same process as in the step B8 is performed.

According to the third example embodiment, the same effects as those of the first and the second example embodiments can be obtained. Note that, with respect to the first effects of the first and the second example embodiments, the third example embodiment is more efficient in terms of communication cost. As in the first and the second example embodiments, bit decomposition can be executed with two rounds of BitwiseAdd computation, and ring composition can be executed with the computation of Compute$_2$ Bit$_C$arry in the third example embodiment. The third example embodiment differs from the first and the second example embodiments in that the resharing before the adder computation is efficiently executed. When an n-bit ripple-carry adder is used to perform the processing with respect to dishonesty detection in parallel, the third example embodiment requires 13n−10 bits·n+1 rounds as the communication cost of bit decomposition and 13n−13 bits·2n+2 rounds as the communication cost of ring composition. Therefore, the third example embodiment is more efficient than the first and the second example embodiments in terms of communication cost. Further, the implementation of the disclosure of the present application is not limited to the n-bit ripple-carry adder. An n-bit carry-lookahead or parallel prefix adder may also be used.

Fourth Example Embodiment

A type conversion processing system relating to a fourth example embodiment will be described with reference to FIGS. 13 to 15.

Figure 13:
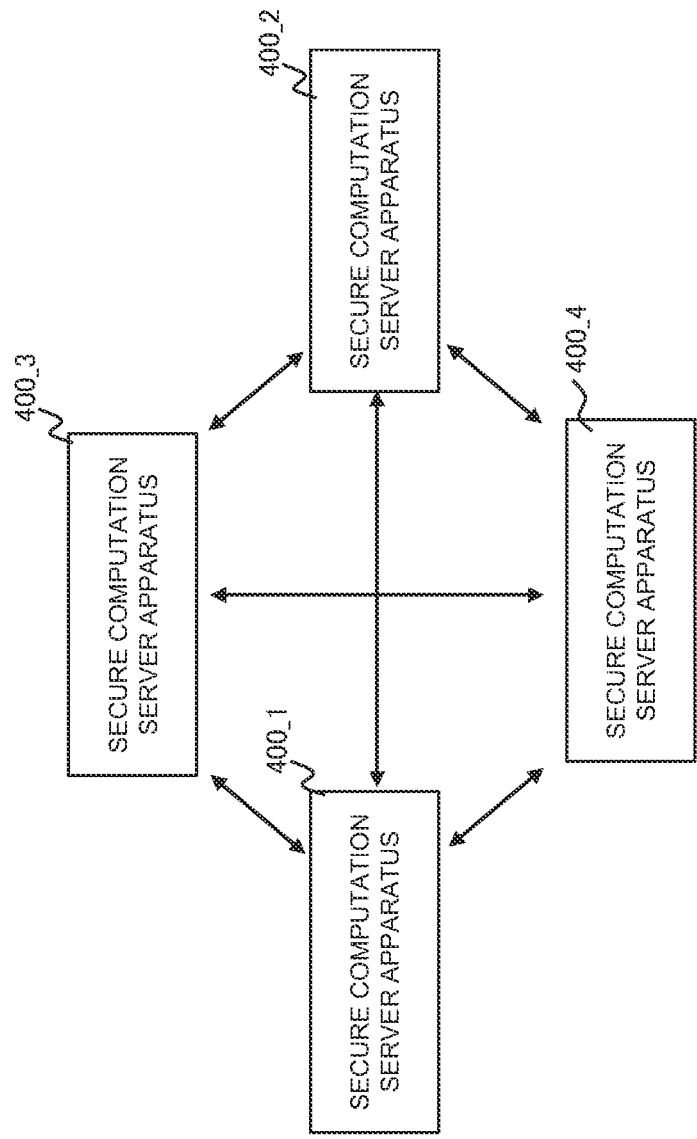
FIG. 13 is a block diagram illustrating an example of the functional configuration of a type conversion system according to a fourth example embodiment.

FIG. 13 is a block diagram illustrating an example of the functional configuration of the type conversion processing system according to the fourth example embodiment. The type conversion processing system relating to the fourth example embodiment is a variation of the type conversion processing systems relating to the first to the third example embodiments described above.

With reference to FIG. 13, the type conversion processing system according to the fourth example embodiment is constituted by i-th server apparatuses (i=1, 2, 3, 4) referred to in FIG. 14 described later. In the type conversion processing system according to the fourth example embodiment, the server apparatuses 400_1, 400_2, 400_3, and 400_4 are connected to each other via a network and are able to communicate with each other. FIG. 14 is a block diagram illustrating an example of the functional configuration of the i-th server apparatus 400_i (i=1, 2, 3, 4).

Figure 14:
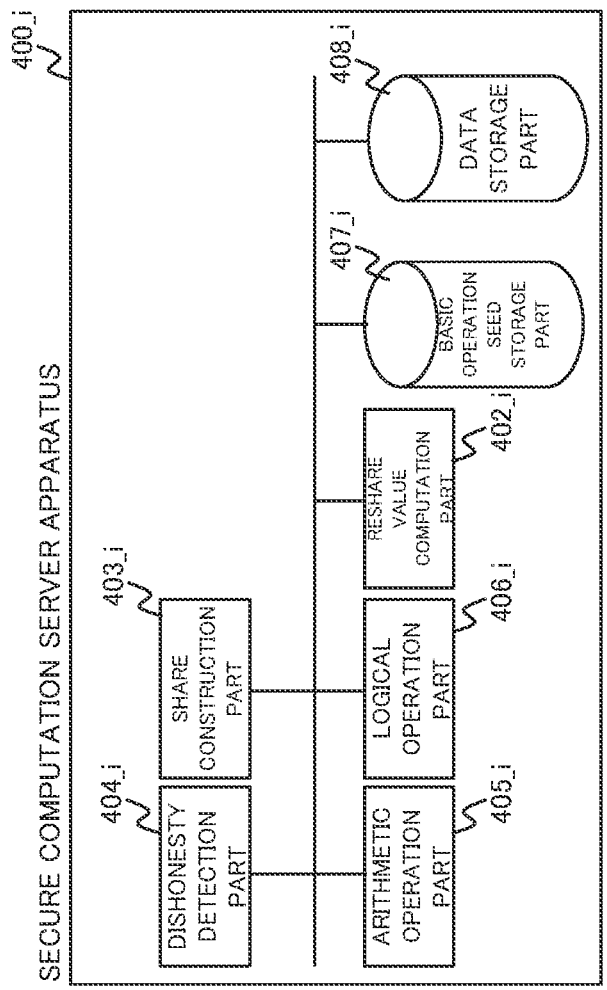
FIG. 14 is a block diagram illustrating the functional configuration of a server apparatus according to the fourth example embodiment.
Figure 15:
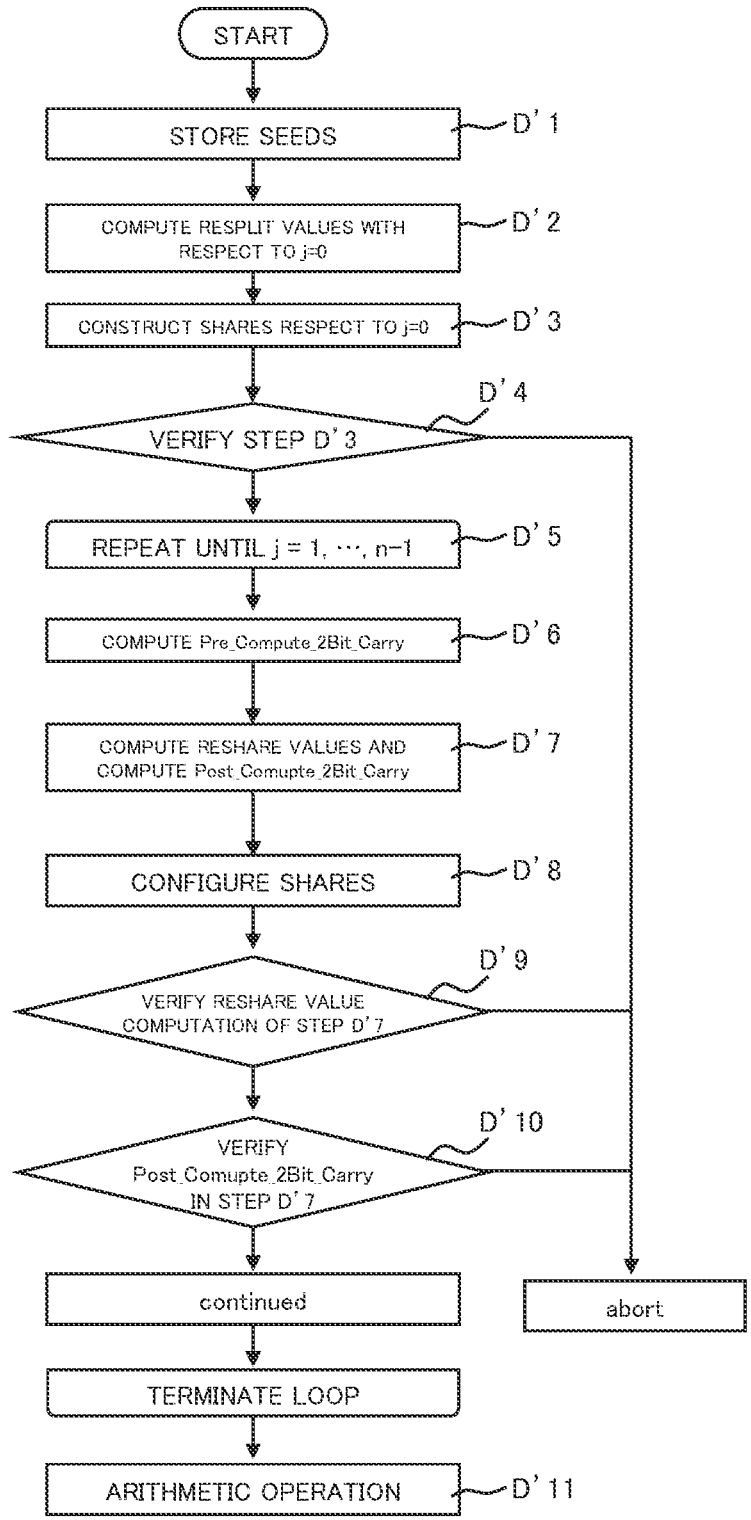
FIG. 15 is a flowchart showing an example of the operation by the type conversion system with respect to ring composition in the fourth example embodiment.

As shown in FIG. 14, the i-th server apparatus 400_i includes an i-th reshare value computation part 402_i, an i-th share construction part 403_i, an i-th dishonesty detection part 404_i, an i-th arithmetic operation part 405_i, an i-th logical operation part 406_i, an i-th basic operation seed storage part 407_i, and an i-th data storage part 408_i. Further, the i-th reshare value computation part 402_i, the i-th share construction part 403_i, the i-th dishonesty detection part 404_i, the i-th arithmetic operation part 405_i, the i-th logical operation part 406_i, the i-th basic operation seed storage part 407_i, and the i-th data storage part 408_i are connected to each other.

In the type conversion processing system configured as described above, for a value $x \in \mathbb{Z}_{2^n}$ input by any of the first to the fourth server apparatuses 400_1 to 400_4 or shares $[x]^n$ stored in the first to the fourth data storage parts 408_1 to 408_4 or a share $[x]^n$ supplied by an external apparatus that is not any of the first to the fourth server apparatuses 400_1 to 400_4, while the value of x is not known from the input and the values during the computation process, $[x_0], \ldots, [x_{n-1}]$ ($x=\sum_{i=0}^{n-1} 2^i \cdot x_i$, $x_i \in \mathbb{Z}_2$) is computed and the result is stored in the first to the fourth data storage parts 408_1 to 408_4. Shares of the computation result above may be reconstructed by having the first to the fourth server apparatuses 400_1 to 400_4 transmit/receive the shares. Alternatively, the shares may be transmitted to an external apparatus that is not any of the first to the fourth server apparatuses 400_1 to 400_4 and reconstructed thereby.

Further, in the type conversion processing system configured as described above, for a value $x_0, \ldots, x_{n-1}$ ($x=\sum_{i=0}^{n-1} 2^i \cdot x_i$, $x_i \in \mathbb{Z}_2$) input by any of the first to the fourth server apparatuses 400_1 to 400_4 or shares $[x_0], \ldots, [x_{n-1}]$($x=\sum_{i=0}^{n-1} 2^i \cdot x_i, x_i \in \mathbb{Z}_2$) stored in the first to the fourth data storage parts 408_1 to 408_4 or a share $[x_0], \ldots, [x_{n-1}]$ ($x=\sum_{i=0}^{n-1} 2^i \cdot x_i$, $x_i \Sigma \mathbb{Z}_2$), supplied by an external apparatus that is not any of the first to the fourth server apparatuses 400_1 to 400_4, while the value of $x_0, \ldots, x_{n-1}$ ($x=\sum_{i=0}^{n-1} 2^i \cdot x_i$, $x_i \in \mathbb{Z}_2$) is not known from the input and the values during the computation process, $[x]^n$ is computed and the result is stored in the first to the fourth data storage parts 408_1 to 408_4. Shares of the computation result above may be reconstructed by having the first to the fourth server apparatuses 400_1 to 400_4 transmit/receive the shares. Alternatively, the shares may be transmitted to an external apparatus that is not any of the first to the fourth server apparatuses 400_1 to 400_4 and reconstructed thereby.

Next, the operation of the type conversion processing system and the first to the fourth server apparatuses 400_1 to 400_4 in the fourth example embodiment will be described in detail. FIG. 15 is a flowchart showing an example of the operation by the first to the fourth server apparatuses 400_1 to 400_4 with respect to ring composition. Since bit decomposition can be performed as in the third example, the description thereof will be omitted.

The flowchart regarding ring composition shown in FIG. 15 will be described.

(Step D'1)

The basic operation seed storage parts 407_1, 407_2, 407_3, and 407_4 store the following, respectively.

($seed_1, seed_2, seed_4$),
($seed_2, seed_3, seed_4$),
($seed_3, seed_1, seed_4$),
($seed_1, seed_2, seed_3$).

The server apparatuses 400_1 to 400_4 share a pseudorandom function h'. Further, let $seed_i$, $sid \in \{0,1\}^*$ (i=1, 2, 3, 4) and the pseudorandom function h': $\{0,1\}^* \times \{0,1\}^* \to \{0,1\}$. Then, the data storage parts 408_1 to 408_4 store the following, respectively.

$([x_j]_1)_{j=0}^{n-1}$, $([x_j]_2)_{j=0}^{n-1}$, $([x_j]_3)_{j=0}^{n-1}$, $([x_j]_4)_{j=0}^{n-1}$.

Further, the data storage parts 408_1 to 408_4 store a loop counter j (=1). Let $x_j = x_{j,1} \oplus x_{j,2} \oplus x_{j,3}$ and $[x_j]_1 = (x_{j,1}, x_{j,2})$, $[x_j]_2 = (x_{j,2}, x_{j,3})$, $[x_j]_3 = (x_{j,3}, x_{j,1})$, $[x_j]_4 = (x_{j,1} \oplus x_{j,2}, x_{j,2} \oplus x_{j,3})$.

Further, with respect to $seed_i$, it is intended to create a situation where one of the parties (the server apparatuses 400_i (i=1, 2, 3, 4)) is unable to compute the output of h' and the other three parties are able to compute the output of h'. If this situation can be created, the handling of $seed_i$ is not particularly limited. Note that $seed_i$ herein is merely an example.

(Step D'2)

As indicated by the following equations, each server apparatus 400_i determines the value of $[x]|_0$.

$[x]|_0 = [x_0]$, $[c_0] = [c_0'] = [0]$.

The data storage parts 408_1 to 408_4 store the following, respectively.

$([x]|_0)_1 = ([x]|_{0,1}, [x]|_{0,2})$, $([x]|_0)_2 = ([x]|_{0,2}, [x]|_{0,3})$, $([x]|_0)_3 = ([x]|_{0,3}, [x]|_{0,1})$, $([x]|_0)_4 = ([x]|_{0,1} \oplus [x]|_{0,2}, [x]|_{0,2} \oplus [x]|_{0,3})$, $[c_0], [c_0]'$.

The first, the second, and the third reshare value computation parts 402_1, 402_2, and 402_3 obtain $seed_4$ from the first, the second, and the third basic operation seed storage parts 407_1, 407_2, and 407_3, respectively. Next, the first, the second, and the third reshare value computation parts 402_1, 402_2, and 402_3 generate $r_{0,2} = h'(sid_0 || 2, seed_4)$.

Then, the first reshare value computation part 402_1 transmits $r_{0,2}$ to the first share construction part 403_1. The third reshare value computation part 402_3 transmits $r_{0,2}$ to the third share construction part 403_3. The second reshare value computation part 402_2 reads from the second data storage part 408_2 and transmits $r_{0,2} \oplus [x]|_{0,2}$ to the fourth share construction part 403_4.

Likewise, the first, the second, and the third reshare value computation parts 402_1, 402_2, and 402_3 generate $r_{0,3}$=h'$(sid_0\|3,seed_4)$. The second reshare value computation part 402_2 transmits $r_{0,3}$ to the second share construction part 403_2. The first reshare value computation part 402_1 transmits $r_{0,3}$ to the first share construction part 403_1. Further, the third reshare value computation part 402_3 reads $[x]|_{0,3}$ from the third data storage part 408_3 and transmits $r_{0,3} \oplus [x]|_{0,3}$ to the fourth share construction part 403_4.

Further, likewise, the first, the second, and the third reshare value computation parts 402_1, 402_2, and 402_3 generate $r_{0,1}$=h'$(sid_0\|1,seed_4)$. The third reshare value computation part 402_3 transmits $r_{0,1}$ to the third share construction part 403_3. The second reshare value computation part 402_2 transmits $r_{0,1}$ to the second share construction part 403_2. Further, the first reshare value computation part 402_1 reads $[x]|_{0,1}$ from the first data storage part 408_1 and transmits $[x]|_{0,1} \oplus r_{0,1}$ to the fourth share construction part 403_4.

Here, $sid_0 \in \{0,1\}^*$. For instance, $sid_0$ is a counter shared by each of the server apparatuses 400_1 to 400_4.
(Step D'3)
Using the values transmitted in the step D'2 and $([x]|_0)_i$ stored in each i-th data storage part 408_$i$, the share construction parts 403_1, 403_2, 403_3, and 403_4 construct shares with the following 12 equations.

$[[x]|_{0,2}]_1 = (r_{0,2}, [x]|_{0,2})$, $[[x]|_{0,2}]_2 = ([x]|_{0,2}, r_{0,2})$, $[[x]|_{0,2}]_3 = (r_{0,2}, r_{0,2})$, $[[x]|_{0,2}]_4 = (r_{0,2} \oplus [x]|_{0,2}, [x]|_{0,2} \oplus r_{0,2})$, $[[x]|_{0,3}]_1 = (r_{0,3}, r_{0,3})$, $[[x]|_{0,3}]_2 = (r_{0,3}, [x]|_{0,3})$, $[[x]|_{0,3}]_3 = ([x]|_{0,3}, r_{0,3})$, $[[x]|_{0,3}]_4 = (0, r_{0,3} \oplus [x]|_{0,3})$, $[[x]|_{0,1}]_1 = ([x]|_{0,1}, r_{0,3})$, $[[x]|_{0,1}]_2 = (r_{0,1}, r_{0,1})$, $[[x]|_{0,1}]_3 = (r_{0,1}, [x]|_{0,1})$, $[[x]|_{0,1}]_4 = ([x]|_{0,1} \oplus r_{0,1}, 0)$.

Here, $[[x]|_{0,1}]_i$, $[[x]|_{0,2}]_i$, $[[x]|_{0,3}]_i$ are stored in each i-th data storage part 408_$i$.
(Step D'4)
The first reshare value computation part 402_1 reads $r_{0,2}$, $[x]|_{0,2}$ from the first data storage part 408_1. Next, the first reshare value computation part 402_1 transmits $r_{0,2} \oplus [x]|_{0,2}$ to the fourth dishonesty detection part 404_4. The fourth dishonesty detection part 404_4 reads $[[x]|_{0,2}]_4 = ([x]|_{0,2,1}, [x]|_{0,2,2})$ stored in the fourth data storage part 408_4 and verifies if $[x]|_{0,2,1} = [x]|_{0,2,2} = r_{0,2} \oplus [x]|_{0,2}$ holds.

When it holds, the fourth dishonesty detection part 404_4 broadcasts a string "success" to the server apparatuses 400_1, 400_2, 400_3, and 400_4, and proceeds to the next step. When it does not hold, the fourth dishonesty detection part 404_4 broadcasts a string "abort" to the server apparatuses 400_1, 400_2, 400_3, and 400_4, and aborts the protocol.

Likewise, the second reshare value computation part 402_2 reads $r_{0,3}, [x]|_{0,3}$ from the second data storage part 408_2. Next, the second reshare value computation part 402_2 transmits $r_{0,3} \oplus [x]|_{0,3}$ to the fourth dishonesty detection part 404_4. The fourth dishonesty detection part 404_4 reads $[[x]|_{0,3}]_4 = (0, [x]|_{0,3,2})$ stored in the fourth data storage part 408_4 and verifies if $[x]|_{0,3,2} = r_{0,3} \oplus [x]|_{0,3}$ holds.

When it holds, the fourth dishonesty detection part 404_4 broadcasts a string "success" to the server apparatuses 400_1, 400_2, 400_3, and 400_4, and proceeds to the next step. When it does not hold, the fourth dishonesty detection part 404_4 broadcasts a string "abort" to the server apparatuses 400_1, 400_2, 400_3, and 400_4, and aborts the protocol.

Further, likewise, the third reshare value computation part 402_3 reads $r_{0,1}, [x]|_{0,1}$ from the third data storage part 408_3. Next, the third reshare value computation part 402_3 transmits $[x]|_{0,1} \oplus r_{0,1}$ to the fourth dishonesty detection part 404_4. The fourth dishonesty detection part 404_4 reads $[[x]|_{0,1}]_4 = ([x]|_{0,1,1}, 0)$ stored in the fourth data storage part 408_4 and verifies if $[x]|_{0,1,1} = [x]|_{0,1} \oplus r_{0,1}$ holds.

When it holds, the fourth dishonesty detection part 404_4 broadcasts a string "success" to the server apparatuses 400_1, 400_2, 400_3, and 400_4, and proceeds to the next step. When it does not hold, the fourth dishonesty detection part 404_4 broadcasts a string "abort" to the server apparatuses 400_1, 400_2, 400_3, and 400_4, and aborts the protocol.

Further, when a large amount of type conversion processing is performed in parallel, $r_{0,1} \oplus x_{0,1}$ (i=1, 2, 3) may be verified by transmitting hash values for the value obtained by concatenating each value thereof and comparing the hash values. For the computational amount of the entire processing, the amount required to transmit the hash values can be regarded as negligible.
(Step D'5)
Each server apparatus 400_$i$ reads the loop counter j from the data storage part 408_$i$. Each server apparatus 400_$i$ executes steps D'6 to D'10 when j<n and executes step D'11 when j=n.
(Step D'6)
Since this process is the same as the step B'6, the description thereof will be omitted.
(Step D'7)
The first, the second, and the third reshare value computation parts 402_1, 402_2, and 402_3 obtain $seed_4$ from the first, the second, and the third basic operation seed storage parts 407_1, 407_2, and 407_3, respectively. Next, the first, the second, and the third reshare value computation parts 402_1, 402_2, and 402_3 generate $r_{j,2}$=h'$(sid_j\|2,seed_4)$.

Then, the first reshare value computation part 402_1 transmits $r_{j,2}$ to the first share construction part 403_1. The third reshare value computation part 402_3 transmits $r_{j,2}$ to the third share construction part 403_3. The second reshare value computation part 402_2 reads $[x]|_{j,2}$ from the second data storage part 408_2 and transmits $r_{j,2} \oplus [x]|_{j,2}$ to the fourth share construction part 403_4.

Likewise, the first, the second, and the third reshare value computation parts 402_1, 402_2, and 402_3 generate $r_{j,3}$=h'$(sid_j\|3,seed_4)$. The second reshare value computation part 402_2 transmits $r_{j,3}$ to the second share construction part 403_2. The first reshare value computation part 402_1 transmits $r_{j,3}$ to the first share construction part 403_1.

Further, the third reshare value computation part 402_3 reads $[x]|_{j,3}$ from the third data storage part 408_3 and transmits $r_{j,3} \oplus [x]|_{j,3}$ to the fourth share construction part 403_4.

Further, likewise, the first, the second, and the third reshare value computation parts 402_1, 402_2, and 402_3 generate $r_{j,1}$=h'(sid$_j$||1,seed$_4$). The third reshare value computation part 402_3 transmits $r_{j,1}$ to the third share construction part 403_3. The second reshare value computation part 402_2 transmits $r_{j,1}$ to the second share construction part 403_2. Further, the first reshare value computation part 402_1 reads $[x]|_{j,1}$ from the first data storage part 408_1 and transmits $[x]|_{j,1} \oplus r_{j,1}$ to the fourth share construction part 403_4.

Here, sid$_j \in \{0,1\}^*$. For instance, sid$_j$ is a counter shared by each of the server apparatuses 400_1 to 400_4.

Further, the logical operation parts 406_i (i=1, 2, 3, 4) receive $[[x]|_{j-1,1}]_i$, $[[x]|_{j-1,2}]_i$, $[[x]|_{j-1,3}]_i$, $[c_{j-1}]_i$,$[c_{j-1}']_i$ (i=1, 2, 3,4) and $[c_j]_i$,$[c_j']_i$ (i=1,2,3) as inputs, compute Post$_C$ompute$_2$ Bit$_C$arry while communicating with each other, and obtain $[c_j]_i$,$[c_j']_i$  0=1,2,3,4). The logical operation parts 406_i (i=1, 2, 3, 4) store $[c_j]_i$,$[c_j']_i$ (i=1, 2, 3,4) in the data storage parts 408_i (i=1, 2, 3, 4).

(Step D'8)

Using the values transmitted in the step D'7 and ($[x]|_j)_i$ stored in each i-th data storage part 408_i, the share construction parts 403_1, 403_2, 403_3, and 403_4 construct shares with the following 12 equations.

$$[[x]|_{j,2}]_1=(r_{j,2},[x]|_{j,2}),$$

$$[[x]|_{j,2}]_2=([x]|r_{j,2},r_{j,2}),$$

$$[[x]|_{j,2}]_3=(r_{j,2},r_{j,2}),$$

$$[[x]|_{j,2}]_4=(r_{j,2}\oplus[x]|_{j,2},[x]|_{j,2}\oplus r_{j,2}),$$

$$[[x]|_{j,3}]_1=(r_{j,3},r_{j,3}),$$

$$[[x]|_{j,3}]_2=(r_{j,3},[x]|_{j,3}),$$

$$[[x]|_{j,3}]_3=([x]|_{j,3},r_{j,3}),$$

$$[[x]|_{j,3}]_4=(0,r_{j,3}\oplus[x]|_{j,3}),$$

$$[[x]|_{j,1}]_1=([x]|_{j,1},r_{j,1}),$$

$$[[x]|_{j,1}]_2=(r_{j,1},r_{j,1}),$$

$$[[x]|_{j,1}]_3=(r_{j,1},[x]|_{j,1}),$$

$$[[x]|_{j,1}]_4=([x]|_{j,1}\oplus r_{j,1},0).$$

Here, $[[x]|_{j,1}]_i$, $[[x]|_{j,2}]_i$, $[[x]|_{j,3}]_i$ are stored in each i-th data storage part 408_i. Further, the data storage part 408_i reads the loop counter j and updates the value thereof to j=j+1.

(Step D'9)

The first reshare value computation part 402_1 reads $r_{j,2}$,$[x]|_{j,2}$ from the first data storage part 408_1. Next, the first reshare value computation part 402_1 transmits $r_{j,2} \oplus [x]|_{j,2}$ to the fourth dishonesty detection part 404_4. The fourth dishonesty detection part 404_4 reads $[[x]|_{j,2}]_4=([x]|_{j,2,1}, [x]|_{j,2,2})$ stored in the fourth data storage part 408_4 and verifies if $[x]|_{j,2,1}=[x]|_{j,2,2}=r_{j,2} \oplus [x]|_{j,2}$ holds.

When it holds, the fourth dishonesty detection part 404_4 broadcasts a string "success" to the server apparatuses 400_1, 400_2, 400_3, and 400_4, and proceeds to the next step. When it does not hold, the fourth dishonesty detection part 404_4 broadcasts a string "abort" to the server apparatuses 400_1, 400_2, 400_3, and 400_4, and aborts the protocol.

Likewise, the second reshare value computation part 402_2 reads $r_{j,3}$,$[x]|_{j,3}$ from the second data storage part 408_2. Next, the second reshare value computation part 402_2 transmits $r_{j,3}\oplus[x]|_{j,3}$ to the fourth dishonesty detection part 404_4. The fourth dishonesty detection part 404_4 reads $[[x]|_{j,3}]_4=(0,[x]|_{j,3,2})$ stored in the fourth data storage part 408_4 and verifies if $[x]|_{j,3,2}=r_{j,3}\oplus[x]|_{j,3}$ holds.

When it holds, the fourth dishonesty detection part 404_4 broadcasts a string "success" to the server apparatuses 400_1, 400_2, 400_3, and 400_4, and proceeds to the next step. When it does not hold, the fourth dishonesty detection part 404_4 broadcasts a string "abort" to the server apparatuses 400_1, 400_2, 400_3, and 400_4, and aborts the protocol.

Further, likewise, the third reshare value computation part 402_3 reads $r_{j,1}$,$[x]|_{j,1}$ from the third data storage part 408_3. Next, the third reshare value computation part 402_3 transmits $[x]|_{j,1} \oplus r_{j,1}$ to the fourth dishonesty detection part 404_4. The fourth dishonesty detection part 404_4 reads $[[x]|_{j,1}]_4=([x]|_{j,1,1},0)$ stored in the fourth data storage part 408_4 and verifies if $[x]|_{j,1,1}=[x]|_{j,1}\oplus r_{j,1}$ holds.

When it holds, the fourth dishonesty detection part 404_4 broadcasts a string "success" to the server apparatuses 400_1, 400_2, 400_3, and 400_4, and proceeds to the next step. When it does not hold, the fourth dishonesty detection part 404_4 broadcasts a string "abort" to the server apparatuses 400_1, 400_2, 400_3, and 400_4, and aborts the protocol.

Further, when a large amount of type conversion processing is performed in parallel, $r_{j,1}\oplus x_{j,1}$ (i=1, 2, 3) may be verified by transmitting hash values for the value obtained by concatenating each value thereof and comparing the hash values. For the computational amount of the entire processing, the amount required to transmit the hash values can be regarded as negligible. Note that one may execute all the loops of the step D'9 in parallel when j=n−1 rather than execute each loop. Further, the step D'9 can be executed in parallel with the step D'4.

(Step D'10)

Each i-th dishonesty detection part 404_i performs dishonesty detection by comparing the transmitted/received data in Post$_C$ompute$_2$ Bit$_C$arry in the step D'7. When not detecting dishonesty, the first to the fourth server apparatuses 400_1, 400_2, 400_3, and 400_4 broadcast a string "success" to each server apparatus. When detecting dishonesty, the first to the fourth server apparatuses 400_1, 400_2, 400_3, and 400_4 broadcast a string "abort" to each server apparatus and abort the protocol. This is achieved by the above-described four-party secure computation capable of detecting dishonesty. The step D'10 can be executed in parallel with the steps D'4 and D'9. Further, one may execute all the loops of the step D'10 in parallel when j=n−1 rather than execute each loop.

(Step D'11)

Since this process is the same as the step B' 11, the description thereof will be omitted.

According to the fourth example embodiment, the same effects as those of the first to the third example embodiments can be obtained. Note that, with respect to the first effect of the third example embodiment, the fourth example embodiment is more efficient in terms of the communication cost of ring composition. The communication rounds are reduced by dividing the carry computation process Compute$_2$ Bit$_C$arry and performing the share resharing and the carry computation process that involves communication in parallel. As a result, the communication cost of ring composition in the fourth example embodiment is (13n−13) bits·n−1 rounds.

Fifth Example Embodiment

A type conversion processing system relating to a fifth example embodiment will be described with reference to FIGS. 16 to 18. The type conversion processing system relating to the fifth example embodiment is a variation of the type conversion processing systems relating to the first to the fourth example embodiments described above.

Figure 16:
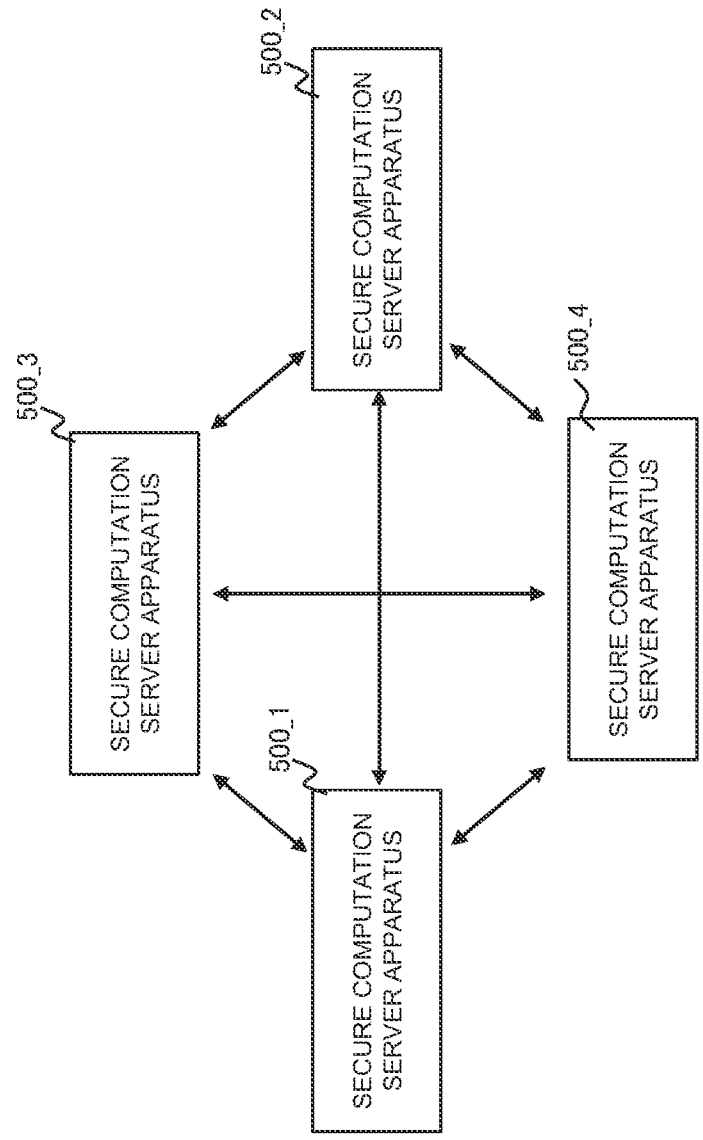
FIG. 16 is a block diagram illustrating an example of the functional configuration of a type conversion system according to a fifth example embodiment.

FIG. 16 is a block diagram illustrating an example of the functional configuration of the type conversion processing system according to the fifth example embodiment. With reference to FIG. 16, the type conversion processing system according to the fifth example embodiment is constituted by i-th server apparatuses (i=1, 2, 3, 4) referred to in FIG. 17 described later. In the type conversion processing system according to the fifth example embodiment, the server apparatuses 500_1, 500_2, 500_3, and 500_4 are connected to each other via a network and are able to communicate with each other. FIG. 17 is a block diagram illustrating an example of the functional configuration of the i-th server apparatus 500_i (i=1, 2, 3, 4).

Figure 17:
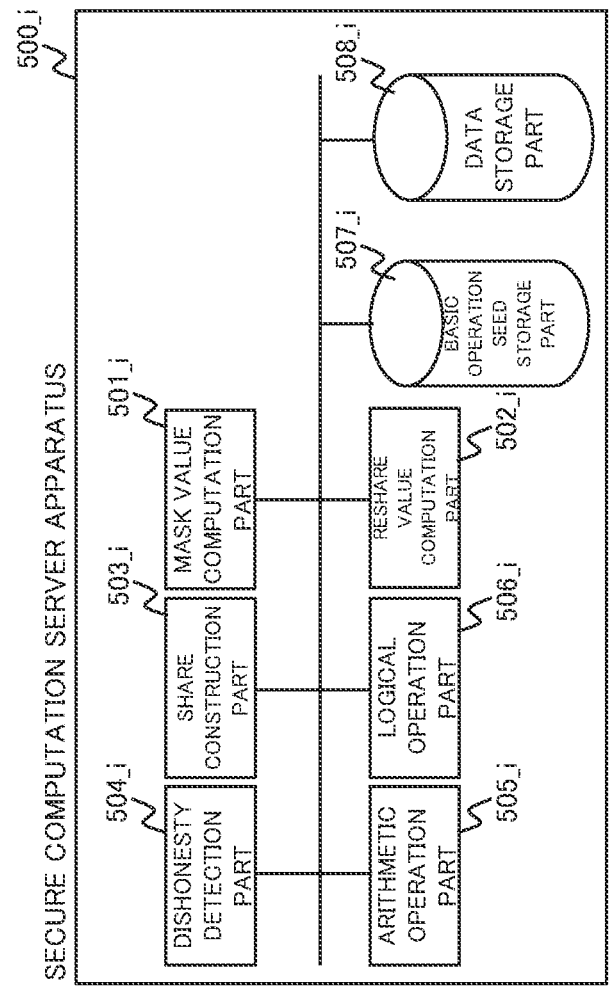
FIG. 17 is a block diagram illustrating the functional configuration of a server apparatus according to the fifth example embodiment.

As shown in FIG. 17, the i-th server apparatus 500_i includes an i-th mask value computation part 501_i, an i-th reshare value computation part 502_i, an i-th share construct part 503_i, an i-th dishonesty detection part 504_i, an i-th arithmetic operation part 505_i, an i-th logical operation part 506_i, an i-th basic operation seed storage part 507_i, and an i-th data storage part 508_i. Further, the i-th mask value computation part 501_i, the i-th reshare value computation part 502_i, the i-th share construct part 503_i, the i-th dishonesty detection part 504_i, the i-th arithmetic operation part 505_i, the i-th logical operation part 506_i, the i-th basic operation seed storage part 507_i, and the i-th data storage part 508_i are connected to each other.

In the type conversion processing system configured as described above, for a value $x \in \mathbb{Z}_{2^n}$ input by any of the first to the fourth server apparatuses 500_1 to 500_4 or shares $[x]^n$ stored in the first to the fourth data storage parts 508_1 to 508_4 or a share $[x]^n$ supplied by an external apparatus that is not any of the first to the fourth server apparatuses 500_1 to 500_4, while the value of x is not known from the input and the values during the computation process, $[x_0], \ldots, [x_{n-1}] (x = \Sigma_{i=0}^{n-1} 2^i \cdot x_i, x_i \in \mathbb{Z}_2)$ is computed and the result is stored in the first to the fourth data storage parts 508_1 to 508_4. Shares of the computation result above may be reconstructed by having the first to the fourth server apparatuses 500_1 to 500_4 transmit/receive the shares. Alternatively, the shares may be transmitted to an external apparatus that is not any of the first to the fourth server apparatuses 500_1 to 500_4 and reconstructed thereby.

Next, the operation of the type conversion processing system and the first to the fourth server apparatuses 500_1 to 500_4 in the fifth example embodiment will be described in detail. FIG. 18 is a flowchart showing an example of the operation by the first to the fourth server apparatuses 500_1 to 500_4 with respect to bit decomposition. Since ring composition can be performed, for instance, as in the third or the fourth example embodiment, the description thereof will be omitted.

Figure 18:
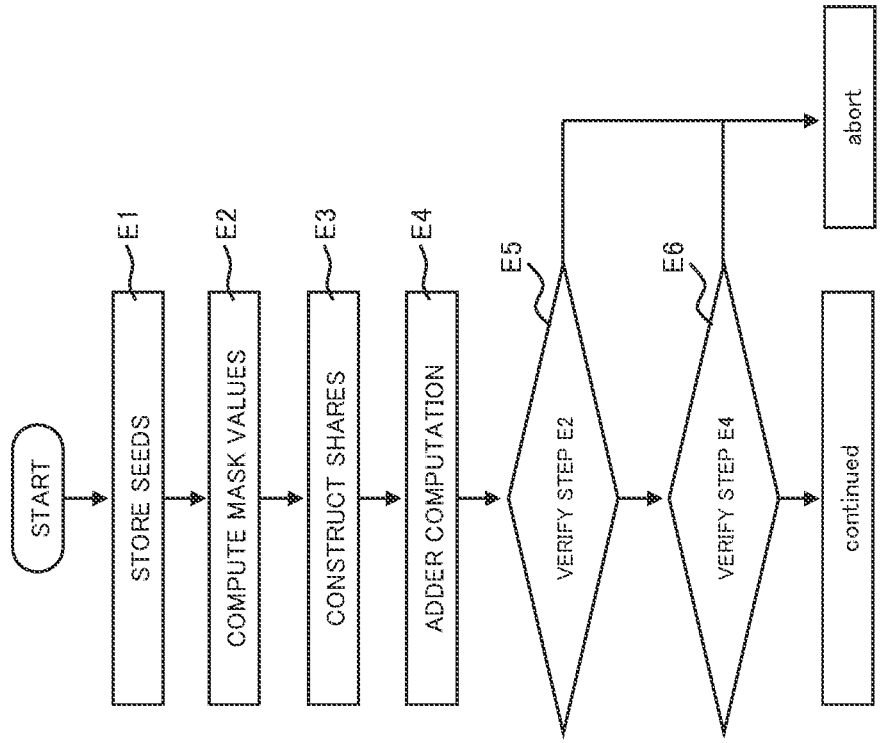
FIG. 18 is a flowchart showing an example of the operation by the type conversion system with respect to bit decomposition in the fifth example embodiment.

The following describes the flowchart regarding bit decomposition shown in FIG. 18.

(Step E1)
The basic operation seed storage parts 507_1, 507_2, 507_3, and 507_4 store the following, respectively.
($seed_1, seed_2, seed_4$),
($seed_2, seed_3, seed_4$),
($seed_3, seed_1, seed_4$),
($seed_1, seed_2, seed_3$).

The server apparatuses 500_1 to 500_4 share a pseudo-random function h. Further, let $seed_i \in \{0,1\}^* (i=1, 2, 3, 4)$ and the pseudorandom function $h: \{0,1\}^* \times \{0,1\}^* \to \{0,1\}^n$. The data storage parts 508_1 to 508_4 store the following, respectively.

$[x]_1^n$, $[x]_2^n$, $[x]_3^n$, $[x]_4^n$.

Here, let ∥ be a string concatenation operator. Further, with respect to $seed_i$, it is intended to create a situation where one of the server apparatuses 500_i (i=1, 2, 3, 4) is unable to compute the output of h, and the other three server apparatuses are able to compute the output of h. If this situation can be created, the handling of $seed_i$ is not particularly limited. Note that $seed_i$ herein is merely an example.

(Step E2)
The first, the second, and the third mask value computation parts 501_1, 501_2, and 501_3 compute $r = h(sid \| sid_4)$ and store r in the first, the second, and the third data storage parts 508_1, 508_2, and 508_3. The second mask value computation part 501_2 reads the share $[x]_2^n = (x_2, x_3)$ from the data storage part 508_2. The second mask value computation part 501_2 generates $y = x_2 + r$ and transmits y to the fourth server apparatus 500_4, which stores y in the fourth data storage part 508_4.

Here, $sid \in \{0,1\}^*$. For instance, sid is a counter shared by each of the server apparatuses 500_1 to 500_4.

As described, the i-th mask value computation part 501_i computes a mask value (for instance, r in the above example) for masking a share (for instance, $x_2$ in the above example). The share masked by the computed mask value ($y = x_2 + r$ in the above example) is transmitted to another server apparatus.

(Step E3)
From the data storage parts 508_1, 508_2, 508_3, and 508_4, the share construction parts 503_1, 503_2, 503_3, and 503_4 read $([x]_1^n, r)$, $([x]_2^n, r)$, $([x]_3^n, r)$, $([x]_4^n, y)$ respectively, and construct shares with the following 16 equations.

$[(x_1+r)|_j]_1 = ((x_1+r)|_j, 0)$, $[(x_1+r)|_j]_2 = (0,0)$, $[(x_1+r)|_j]_3 = (0, (x_1+r)|_j)$, $[(x_1+r)|_j]_4 = ((x_1-x_2+y)|_j, 0)$, $[(x_2+r)|_j]_1 = (0, (x_2+r)|_j)$, $[(x_2+r)|_j]_2 = ((x_2+r)|_j, 0)$, $[(x_2+r)|_j]_3 = (0,0)$, $[(x_2+r)|_j]_4 = (y|_j, y|_j)$, $[(x_3+r)|_j]_1 = (0,0)$, $[(x_3+r)|_j]_2 = (0, (x_3+r)|_j)$, $[(x_3+r)|_j]_3=((x_3+r)|_j,0),$ $[(x_3+r)|_j]_4=(0,(-(x_2-x_3)+y)|_j),$ $[(-3r)|_j]_1=((-3r)|_j,(-3r)|_j),$ $[(-3r)|_j]_2=((-3r)|_j,(-3r)|_j),$ $[(-3r)|_j]_3=((-3r)|_j,(-3r)|_j),$ $[(-3r)|_j]_4=(0,0).$

Here, for $x \in \mathbb{Z}_{2^n}$, $x|_j \in \mathbb{Z}_2$ denotes the j-th bit (j=0, ..., n−1) of x. $[(x_1+r)|_j]_i$, $[(x_2+r)|_j]_i$, $[(x_3+r)|_j]_i$, $[(-3r)|_j]_i$ are stored in each i-th data storage part 508_$i$. As described, the i-th share construction part 503_$i$ constructs a share for type conversion using the transmitted mask value.

(Step E4)

By communicating with each other, the i-th logical operation parts 506_$i$ perform n-bit adder processing BitwiseAdd as follows. Here, BitwiseAdd is a process of receiving, for instance, $([a_1|_j])_{j=0}^{n-1}$, $([a_2|_j])_{j=0}^{n-1}$, as input and outputting $([(a_1+a_2)|_j])_{j=0}^{n-1}$.

$([(x_1+x_2+2r)|_j])_{j=0}^{n-1} \leftarrow \text{BitwiseAdd}(([(x_1+r)|_j])_{j=0}^{n-1}, ([(x_2+r)|])_{j=0}^{n-1}),$ $([(x_1+x_2+x_3+3r)|_j])_{j=0}^{n-1} \leftarrow \text{BitwiseAdd}(([(x_1+x_2+2r)|_j])_{j=0}^{n-1}, ([(x_3+r)|_j])_{j=0}^{n-1}),$ $([(x_1+x_2+x_3)|_j])_{j=0}^{n-1} \leftarrow \text{BitwiseAdd}(([(x_1+x_2+x_3+3r)|_j])_{j=0}^{n-1}, ([(-3r)|])_{j=0}^{n-1}).$ Here, since $x_1+x_2+x_3=x$, $([x|_j])_{j=0}^{n-1}$ can be computed. Note that $([x|_j])_{j=0}^{n-1}$ denotes a series of shares $[x|_0], \ldots, [x|_{n-1}]$. Each i-th logical operation part 506_$i$ stores $([x|_j]_i)_{j=0}^{n-1}$ in the data storage part 508_$i$ thereof.

(Step E5)

Like the second server apparatus 500_2 in the step E2, the first server apparatus 500_1 has the first mask value computation part 501_1 generate $y'=x_2+r$ and transmits y' to the fourth server apparatus 500_4, which stores y' in the fourth data storage part 508_4. The fourth dishonesty detection part 504_4 reads y,y' from the fourth data storage part 508_4 and verifies if y=y' holds.

When y=y' holds, the fourth dishonesty detection part 504_4 broadcasts a string "success" to the server apparatuses 500_1, 500_2, and 500_3 and proceeds to the next step. When y=y' does not hold, the fourth dishonesty detection part 504_4 broadcasts a string "abort" to the server apparatuses 500_1, 500_2, and 500_3 and aborts the protocol.

Further, when a large amount of type conversion processing is performed in parallel, verification of whether or not y=y' holds may be regarded as verification of whether or not σ=σ' holds by concatenating each y' in the step E5 and computing a hash value σ' and computing a hash value σ for the value obtained by concatenating each y as well. For the computational amount of the entire processing, the communication volume with respect to y' can be regarded as negligible.

(Step E6)

Each i-th dishonesty detection part 504_$i$ performs dishonesty detection by comparing the transmitted/received data in BitwiseAdd in the step E4. When not detecting dishonesty, the first to the fourth server apparatuses 500_1, 500_2, 500_3, and 500_4 broadcast a string "success" to each server apparatus. When detecting dishonesty, the first to the fourth server apparatuses 500_1, 500_2, 500_3, and 500_4 broadcast a string "abort" to each server apparatus and abort the protocol. This is achieved by the above-described four-party secure computation capable of detecting dishonesty. The step E6 can be executed in parallel with the step E5.

According to the fifth example embodiment, the same effects as those of the first to the fourth example embodiments can be obtained. With respect to bit decomposition, the fifth example embodiment is inferior to the other example embodiments in terms of theoretical communication cost, however, one should note that the form of communication is changed. For instance, in the third example embodiment, the first, the second, and the third server apparatuses 300_1, 300_2, and 300_3 communicate to the fourth server apparatus 300_4 in the step C2. By contrast, only the second server apparatus 500_2 needs to communicate to the fourth server apparatus 500_4 in the step E2 in the fifth example embodiment. Due to this difference in the form of communication, the fifth example embodiment may be more efficient in some communication environments.

Sixth Example Embodiment

Figure 19:
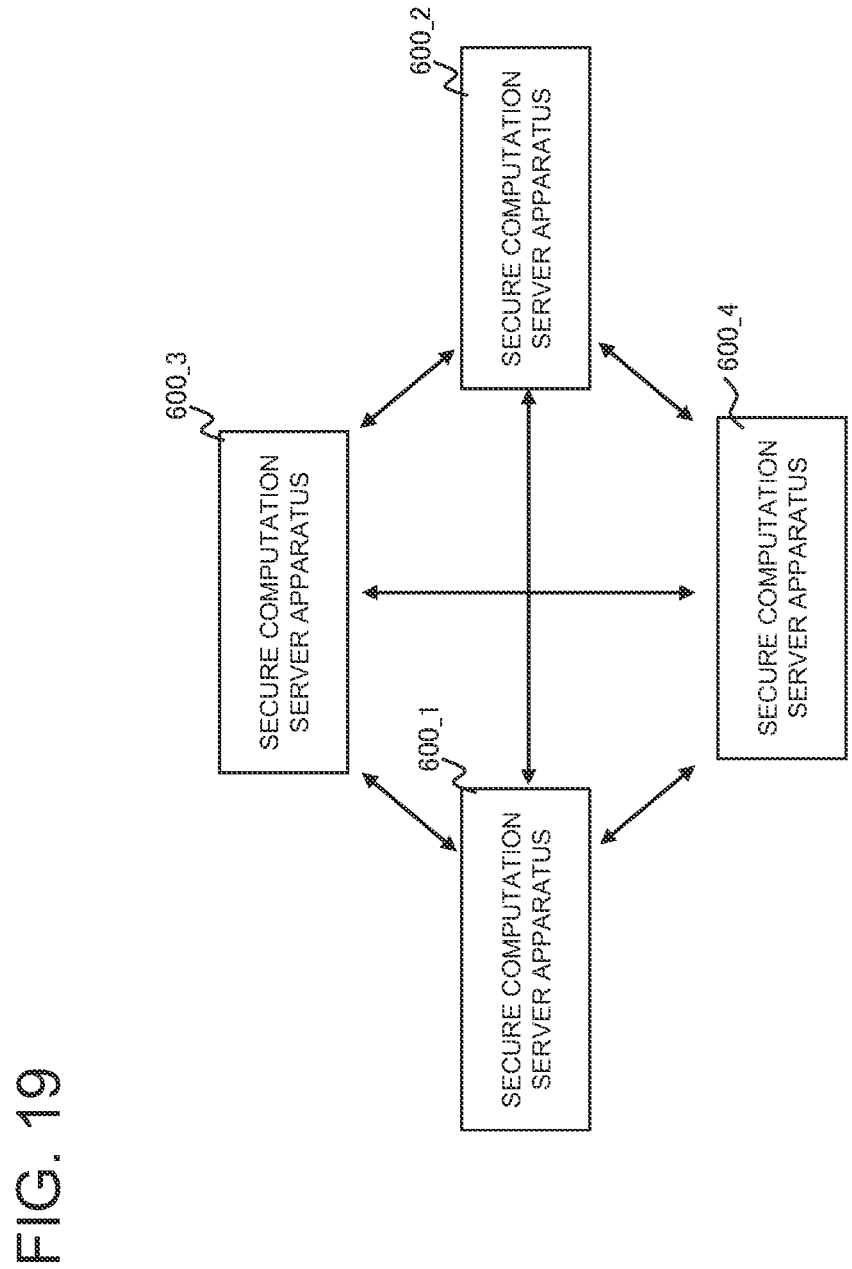
FIG. 19 is a block diagram illustrating an example of the functional configuration of a type conversion system according to a sixth example embodiment.

A type conversion processing system relating to a sixth example embodiment will be described with reference to FIGS. 19 to 21. FIG. 19 is a block diagram illustrating an example of the functional configuration of the type conversion processing system according to the sixth example embodiment. The type conversion processing system relating to the sixth example embodiment is a variation of the type conversion processing systems relating to the first to the fifth example embodiments described above.

With reference to FIG. 19, the type conversion processing system according to the sixth example embodiment is constituted by i-th server apparatuses (i=1, 2, 3, 4) referred to in FIG. 20 described later. In the type conversion processing system according to the sixth example embodiment, the server apparatuses 600_1, 600_2, 600_3, and 600_4 are connected to each other via a network and are able to communicate with each other. FIG. 20 is a block diagram illustrating an example of the functional configuration of the i-th server apparatus 600_$i$ (i=1, 2, 3, 4).

Figure 20:
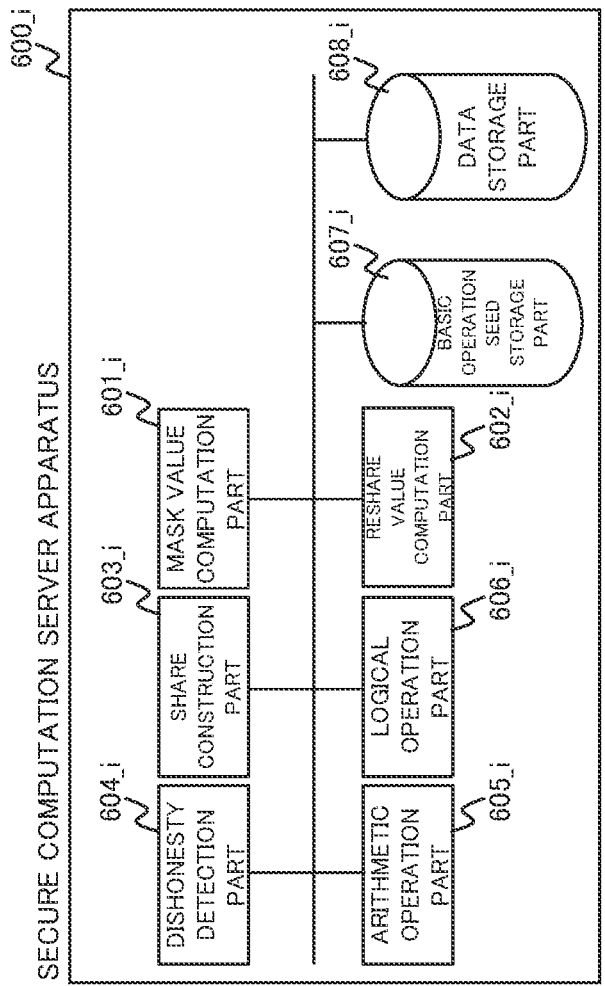
FIG. 20 is a block diagram illustrating the functional configuration of a server apparatus according to the sixth example embodiment.

As shown in FIG. 20, the i-th server apparatus 600_$i$ includes an i-th mask value computation part 601_$i$, an i-th reshare value computation part 602_$i$, an i-th share construction part 603_$i$, an i-th dishonesty detection part 604_$i$, an i-th arithmetic operation part 605_$i$, an i-th logical operation part 606_$i$, an i-th basic operation seed storage part 607_$i$, and an i-th data storage part 608_$i$. Further, the i-th mask value computation part 601_$i$, the i-th reshare value computation part 602_$i$, the i-th share construction part 603_$i$, the i-th dishonesty detection part 604_$i$, the i-th arithmetic operation part 605_$i$, the i-th logical operation part 606_$i$, the i-th basic operation seed storage part 607_$i$, and the i-th data storage part 608_$i$ are connected to each other.

In the type conversion processing system configured as described above, for a value input by any of the first to the fourth server apparatuses 600_1 to 600_4 $x \in \mathbb{Z}_{2^n}$ or shares stored in the first to the fourth data storage parts 608_1 to 608_4 $[x]^n$ or a share supplied by an external apparatus that is not any of the first to the fourth server apparatuses 600_1 to 600_4 $[x]^n$, while the value of x is not known from the input and the values during the computation process, $[x_0], \ldots, [x_{n-1}]$ ($x = \sum_{i=0}^{n-1} 2^i \cdot x_i$, $x_i \in \mathbb{Z}_2$) is computed and the result is stored in the first to the fourth data storage parts 608_1 to 608_4. Shares of the computation result above may be reconstructed by having the first to the fourth server apparatuses 600_1 to 600_4 transmit/receive the shares. Alternatively, the shares may be transmitted to an external apparatus that is not any of the first to the fourth server apparatuses 600_1 to 600_4 and reconstructed thereby.

Further, in the type conversion processing system configured as described above, for a value $x_0, \ldots, x_{n-1}$ ($x=\Sigma_{i=0}^{n-1} 2^i \cdot x_i$, $x_i \in \mathbb{Z}_2$) input by any of the first to the fourth server apparatuses 600_1 to 600_4 or shares $[x_0], \ldots, [x_{n-1}]$ ($x=\Sigma_{i=0}^{n-1} 2^i \cdot x_i$, $x_i \in \mathbb{Z}_2$) stored in the first to the fourth data storage parts 608_1 to 608_4 or a share $[x_0], \ldots, [x_{n-1}]$ ($x=\Sigma_{i=0}^{n-1} 2^i \cdot x_i$, $x_i \in \mathbb{Z}_2$) supplied by an external apparatus that is not any of the first to the fourth server apparatuses 600_1 to 600_4, while the value of $x_0, \ldots, x_{n-1}$ ($x=\Sigma_{i=0}^{n-1} 2^i \cdot x_i$, $x_i \in \mathbb{Z}_2$) is not known from the input and the values during the computation process, $[x]''$ is computed and the result is stored in the first to the fourth data storage parts 608_1 to 608_4. Shares of the computation result above may be reconstructed by having the first to the fourth server apparatuses 600_1 to 600_4 transmit/receive the shares. Alternatively, the shares may be transmitted to an external apparatus that is not any of the first to the fourth server apparatuses 600_1 to 600_4 and reconstructed thereby.

Next, the operation of the type conversion processing system and the first to the fourth server apparatuses 600_1 to 600_4 in the sixth example embodiment will be described in detail. FIG. 21 is a flowchart showing an example of the operation by the first to the fourth server apparatuses 600_1 to 600_4 with respect to bit decomposition. Since ring composition can be performed, for instance, as in the third or the fourth example embodiment, the description thereof will be omitted.

Figure 21:
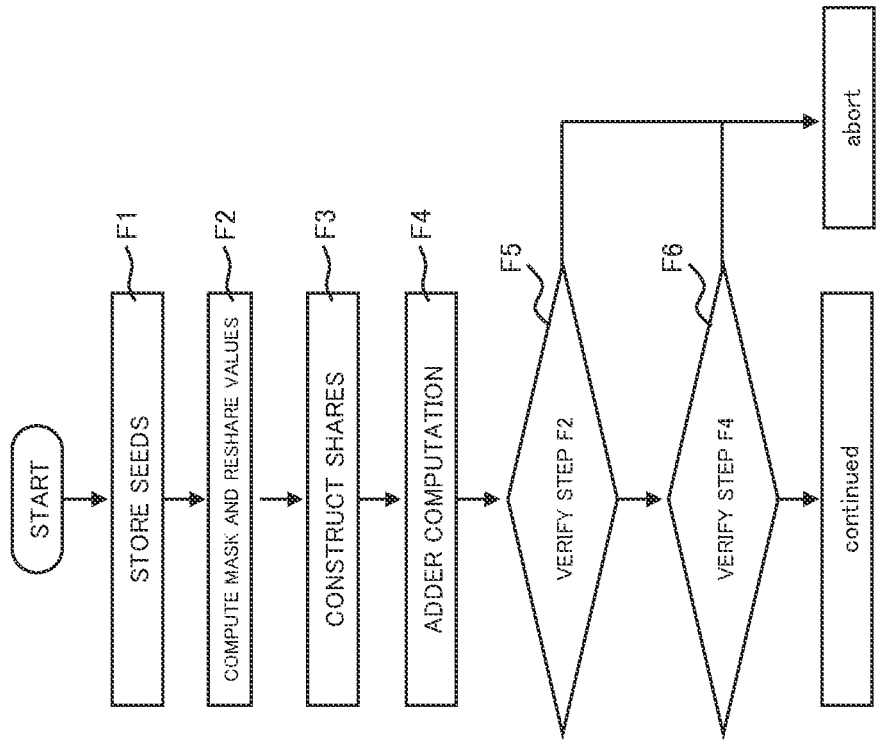
FIG. 21 is a flowchart showing an example of the operation by the type conversion system with respect to bit decomposition in the sixth example embodiment.

The following describes the flowchart regarding bit decomposition shown in FIG. 21.
(Step F1)
The basic operation seed storage parts 607_1, 607_2, 607_3, and 607_4 store the following, respectively.
(seed$_1$,seed$_2$,seed$_4$),
(seed$_2$,seed$_3$,seed$_4$),
(seed$_3$,seed$_1$,seed$_4$),
(seed$_1$,seed$_2$,seed$_3$).

The server apparatuses 600_1 to 600_4 share a pseudo-random function h. Further, let seed$_i \in \{0,1\}^*$ ($i=1, 2, 3, 4$) and the pseudorandom function $h:\{0,1\}^* \times \{0,1\}^* \to \{0,1\}^n$. The data storage parts 608_1 to 608_4 store the following, respectively.

$[x]_1''$, $[x]_2''$, $[x]_3''$, $[x]_4''$.

Further, with respect to seed$_i$, it is intended to create a situation where one of the parties (the server apparatuses 600_i ($i=1, 2, 3, 4$)) is unable to compute the output of h, and the other three parties are able to compute the output of h. If this situation can be created, the handling of seed$_i$ is not particularly limited. Note that seed$_i$ herein is merely an example.
(Step F2)
The first, the second, and the third mask value computation parts 601_1, 601_2, and 601_3 compute $r=h(sid\|1,sid_4)$ and store r in the first, the second, and the third data storage parts 608_1, 608_2, and 608_3. The second mask value computation part 601_2 reads the share $[x]_2''=(x_2,x_3)$ from the data storage part 608_2. The second mask value computation part 601_2 generates $y=x_2+r$ and transmits y to the fourth server apparatus 600_4, which stores y in the fourth data storage part 608_4.

Next, the first, the second, and the third reshare value computation parts 602_1, 602_2, and 602_3 obtain seed$_4$ from the first, the second, and the third basic operation seed storage parts 607_1, 607_2 and 607_3, respectively. Then, the first, the second, and the third reshare value computation parts 602_1, 602_2, and 602_3 generate $r'|_1 = (h(sid\|3,seed_4))|_j$ ($j=0, \ldots n-1$). Further, the third reshare value computation part 602_3 stores $r'|_j$ ($j=0, \ldots n-1$) in the third data storage part 608_3. The first reshare value computation part 602_1 transmits $r'|_1$ ($j=0, \ldots n-1$) to the first share construction part 603_1. Further, the second reshare value computation part 602_2 reads $x_3,r$ from the second data storage part 608_2 and transmits $(x_3-2r)|_j \oplus r'|_j$ ($j=0, \ldots n-1$) to the fourth share construction part 603_4.

Here, sid$\in \{0,1\}^*$. For instance, sid is a counter shared by each of the server apparatuses 600_1 to 600_4.
(Step F3)
From the data storage parts 608_1, 608_2, 608_3, and 608_4, the share construction parts 603_1, 603_2, 603_3, and 603_4 read $([x]_1'',r)$, $([x]_2'',r)$, $([x]_3'',r)$, $([x]_4'',y)$ respectively, and construct shares with the following 12 equations using the values transmitted in the step F2. $[(x_1+r)|_j]_1=((x_1+r)|_j,0)$, $[(x_1 \pm r)|_j]_2=(0,0)$, $[(x_1+r)|_j]_3=(0,(x_1+r)|_j)$, $[(x_1+r)|_j]_4=((x_1-x_2+y)|_j,0)$, $[(x_2+r)|_j]_1=(0,(x_2 \pm r)|_j)$, $[(x_2+r)|_j]_2=((x_2+r)|_j,0)$, $[(x_2+r)|_j]_3=(0,0)$, $[(x_2+r)|_j]_4=(y|_j,y|_j)$, $[(x_3-2r)|_j]_1=(r'|_j,r'|_j)$, $[(x_3-2r)|_j]_2=(r'|_j,(x_3-2r)|_j)$, $[(x_3-2r)|_j]_3=((x_3-2r)|_j,r'|_j)$, $[(x_3-2r)|_j]_4=(0,(x_3-2r)|_j \oplus r'|_j)$, Here, for $x \in \mathbb{Z}_{2^n}$, $x|_j \in \mathbb{Z}_2$ denotes the j-th bit ($j=0, \ldots, n-1$) of x. $[(x_1+r)|_j]_i$, $[(x_2+r)|_j]_1$, $[(x_3-2r)|_j]_i$ are stored in each i-th data storage part 608_i.
(Step F4)
By communicating with each other, the i-th logical operation parts 606_i compute n-bit adder processing BitwiseAdd as follows. Here, BitwiseAdd is a process of receiving, for instance, $([a_1|_j])_{j=0}^{n-1}$, $([a_2|_j])_{j=0}^{n-1}$, as input and outputting $([(a_1+a_2)|_j])_{j=0}^{n-1}$.

$([(x_1+x_2+2r)|_j])_{j=0}^{n-1} \leftarrow \text{BitwiseAdd}(([(x_1+r)|_j])_{j=0}^{n-1}, ([(x_2+r)|_j])_{j=0}^{n-1},$ $([(x_1+x_2+x_3)|_j])_{j=0}^{n-1} \leftarrow \text{BitwiseAdd}(([(x_1+x_2+2r)|_j])_{j=0}^{n-1},([(x_3-2r)|_j])_{j=0}^{n-1})$.

Here, since $x_1+x_2+x_3=x$, $([x|_j])_{j=0}^{n-1}$ can be computed. Note that $([x|_j])_{j=0}^{n-1}$ denotes a series of shares $[x|_0], \ldots, [x|_{n-1}]$. Each i-th logical operation part 606_i stores $([x|_j]_i)_{j=0}^{n-1}$ in the data storage part 608_i thereof.
(Step F5)
Like the second server apparatus 600_2 in the step F2, the first server apparatus 600_1 has the first mask value computation part 601_1 generate $y'=x_2+r$ and transmits y' to the fourth server apparatus 600_4, which stores y' in the fourth data storage part 608_4. The fourth dishonesty detection part 604_4 reads y,y' from the fourth data storage part 608_4 and verifies if y=y' holds.

When y=y' holds, the fourth dishonesty detection part 604_4 broadcasts a string "success" to the server apparatuses 600_1, 600_2, and 600_3 and proceeds to the next step. When y=y' does not hold, the fourth dishonesty detection part 604_4 broadcasts a string "abort" to the server apparatuses 600_1, 600_2, and 600_3 and aborts the protocol.

The second reshare value computation part 602_2 reads $(x_3-2r)|_j, r'|_j$ (j=0, ... n-1) from the second data storage part 608_2. Next, the second reshare value computation part 602_2 transmits $(x_3-2r)|_j \oplus r'|_j$ (j=0, ... n-1) to the fourth dishonesty detection part 604_4, which reads $[(x_3-2r)|_j]_4 = (0,((x_3-2r)|_j)_{4,2})$ stored in the fourth data storage part 608_4 and verifies if $((x_3-2r)|_j)_{4,2} = (x_3-2r)|_j \oplus r'|_j$ holds.

When it holds, the fourth dishonesty detection part 604_4 broadcasts a string "success" to the server apparatuses 600_1, 600_2, 600_3, and 600_4 and proceeds to the next step. When it does not hold, the fourth dishonesty detection part 604_4 broadcasts a string "abort" to the server apparatuses 600_1, 600_2, 600_3, and 600_4 and aborts the protocol.

Further, when a large amount of type conversion processing is performed in parallel, y', $(x_3-2r)|_j \oplus r'|_j$ may be verified by transmitting hash values for the value obtained by concatenating each value thereof and comparing the hash values. For the computational amount of the entire processing, the amount required to transmit the hash values can be regarded as negligible.

(Step F6)
Each i-th dishonesty detection part 604_i performs dishonesty detection by comparing the transmitted/received data in BitwiseAdd in the step F4. When not detecting dishonesty, the first to the fourth server apparatuses 600_1, 600_2, 600_3, and 600_4 broadcast a string "success" to each server apparatus. When detecting dishonesty, the first to the fourth server apparatuses 600_1, 600_2, 600_3, and 600_4 broadcast a string "abort" to each server apparatus and abort the protocol. This is achieved by the above-described four-party secure computation capable of detecting dishonesty. The step F6 can be executed in parallel with the step F5.

According to the sixth example embodiment, the same effects as those of the first to the fifth example embodiments can be obtained. Further, the sixth example embodiment is superior to the first to the fifth example embodiments in terms of the theoretical communication cost of bit decomposition. In the sixth example embodiment, bit decomposition can be achieved by performing the computation of BitwiseAdd twice as in the first to the fourth example embodiments.

The sixth example embodiment differs from the first to the fourth example embodiments in that the resharing before the adder computation is efficiently executed. When an n-bit ripple-carry adder is used to perform the processing with respect to dishonesty detection in parallel, the sixth example embodiment requires 12n−10 bits·n+1 rounds as the communication cost of bit decomposition. Therefore, bit decomposition according to the sixth example embodiment is more efficient than bit decomposition according to the first to the fifth example embodiments in terms of communication cost. Further, the implementation of the disclosure of the present application is not limited to the n-bit ripple-carry adder. An n-bit carry-lookahead or parallel prefix adder may also be used.

Seventh Example Embodiment

Figure 22:
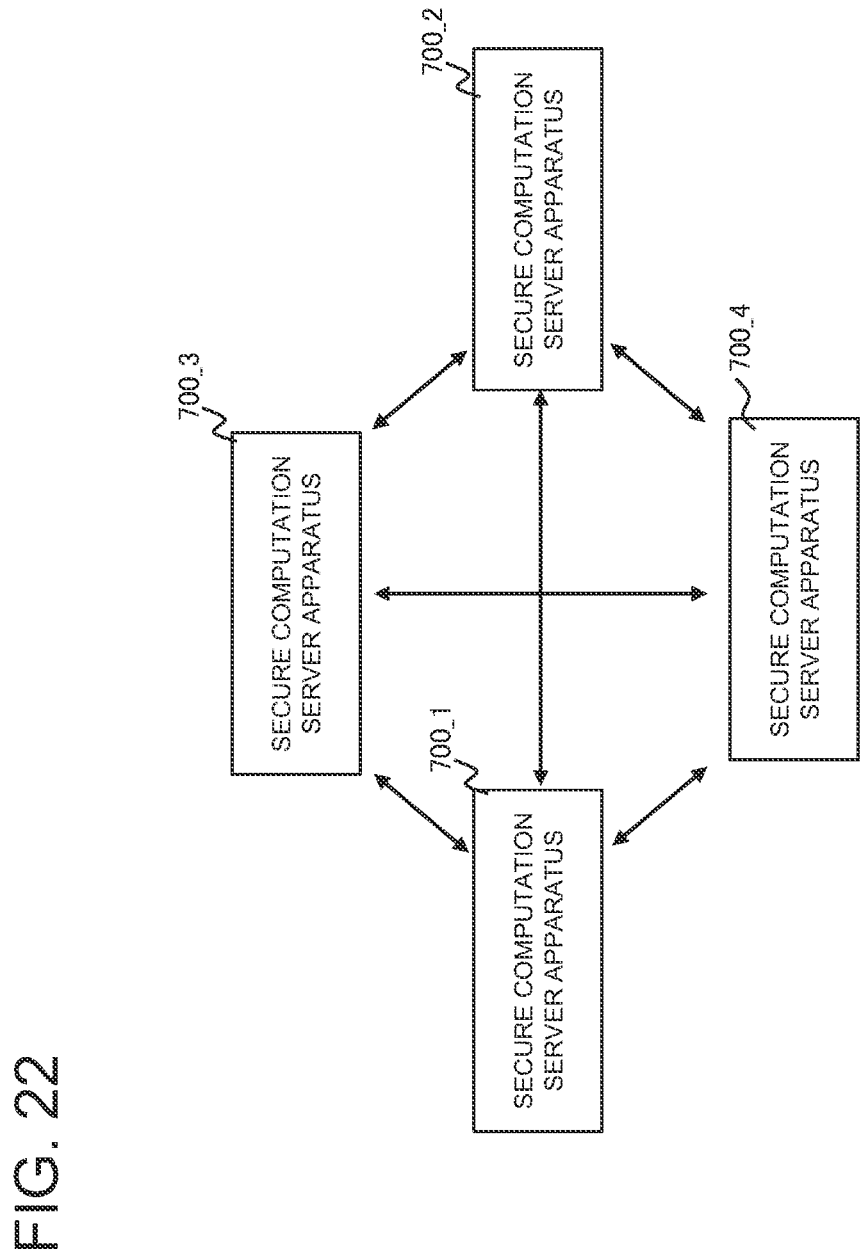
FIG. 22 is a block diagram illustrating an example of the functional configuration of a type conversion system according to a seventh example embodiment.

A type conversion processing system relating to a seventh example embodiment will be described with reference to FIGS. 22 to 24. FIG. 22 is a block diagram illustrating an example of the functional configuration of the type conversion processing system according to the seventh example embodiment. The type conversion processing system relating to the seventh example embodiment is a variation of the type conversion processing systems relating to the first to the sixth example embodiments described above.

With reference to FIG. 22, the type conversion processing system according to the seventh example embodiment is constituted by i-th server apparatuses (i=1, 2, 3, 4) referred to in FIG. 23 described later. In the type conversion processing system according to the seventh example embodiment, the server apparatuses 700_1, 700_2, 700_3, and 700_4 are connected to each other via a network and are able to communicate with each other. FIG. 23 is a block diagram illustrating an example of the functional configuration of the i-th server apparatus 700_i (i=1, 2, 3, 4).

Figure 23:
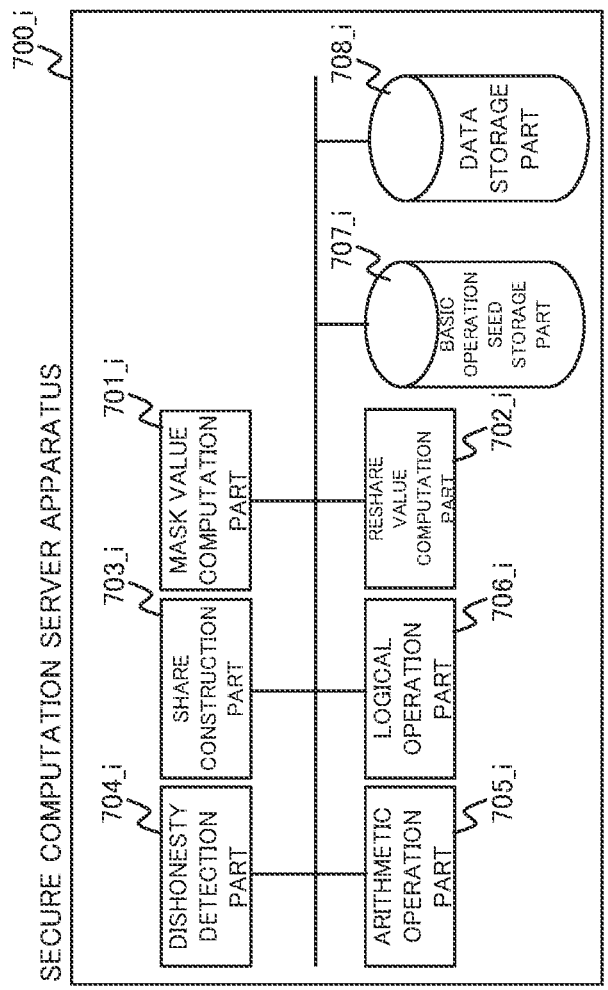
FIG. 23 is a block diagram illustrating the functional configuration of a server apparatus according to the seventh example embodiment.

As shown in FIG. 23, the i-th server apparatus 700_i includes an i-th mask value computation part 701_i, an i-th reshare value computation part 702_i, an i-th share construction part 703_i, an i-th dishonesty detection part 704_i, an i-th arithmetic operation part 705_i, an i-th logical operation part 706_i, an i-th basic operation seed storage part 707_i, and an i-th data storage part 708_i. Further, the i-th mask value computation part 701_i, the i-th reshare value computation part 702_i, the i-th share construction part 703_i, the i-th dishonesty detection part 704_i, the i-th arithmetic operation part 705_i, the i-th logical operation part 706_i, the i-th basic operation seed storage part 707_i, and the i-th data storage part 708_i are connected to each other.

In the type conversion processing system configured as described above, for a value $x \in \mathbb{Z}_{2^n}$ input by any of the first to the fourth server apparatuses 700_1 to 700_4 or shares $[x]^n$ stored in the first to the fourth data storage parts 708_1 to 708_4 or a share $[x]^n$ supplied by an external apparatus that is not any of the first to the fourth server apparatuses 700_1 to 700_4, while the value of x is not known from the input and the values during the computation process, $[x_0], \ldots, [x_{n-1}](x=\Sigma_{i=0}^{n-1} 2^i \cdot x_i, x_i \in \mathbb{Z}_2)$ is computed and the result is stored in the first to the fourth data storage parts 708_1 to 708_4. Shares of the computation result above may be reconstructed by having the first to the fourth server apparatuses 700_1 to 700_4 transmit/receive the shares. Alternatively, the shares may be transmitted to an external apparatus that is not any of the first to the fourth server apparatuses 700_1 to 700_4 and reconstructed thereby.

In the type conversion processing system configured as described above, for a value $x_0, \ldots, x_{n-1}$ ($x=\Sigma_{i=0}^{n-1} 2^i \cdot x_i, x_i \in \mathbb{Z}_2$) input by any of the first to the fourth server apparatuses 700_1 to 700_4 or shares $[x_0], \ldots, [x_{n-1}]$ ($x=\Sigma_{i=0}^{n-1} 2^i \cdot x_i, x_i \in \mathbb{Z}_2$) stored in the first to the fourth data storage parts 708_1 to 708_4 or a share $[x_0], \ldots, [x_{n-1}]$ ($x=\Sigma_{i=0}^{n-1} 2^i \cdot x_i, x_i \in \mathbb{Z}_2$) supplied by an external apparatus that is not any of the first to the fourth server apparatuses 700_1 to 700_4, while the value of $x_0, \ldots, x_{n-1}$ ($x=\Sigma_{i=0}^{n-1} 2^i \cdot x_i, x_i \in \mathbb{Z}_2$) is not known from the input and the values during the computation process, $[x]^n$ is computed and the result is stored in the first to the fourth data storage parts 708_1 to 708_4. Shares of the computation result above may be reconstructed by having the first to the fourth server apparatuses 700_1 to 700_4 transmit/receive the shares. Alternatively, the shares may be transmitted to an external apparatus that is not any of the first to the fourth server apparatuses 700_1 to 700_4 and reconstructed thereby.

Next, the operation of the type conversion processing system and the first to the fourth server apparatuses 700_1 to 700_4 in the seventh example embodiment will be described in detail. FIG. 24 is a flowchart showing an example of the operation by the first to the fourth server apparatuses 700_1 to 700_4 with respect to bit decomposition. Since ring composition can be performed, for instance, as in the third or the fourth example embodiment, the description thereof will be omitted.

Figure 24:
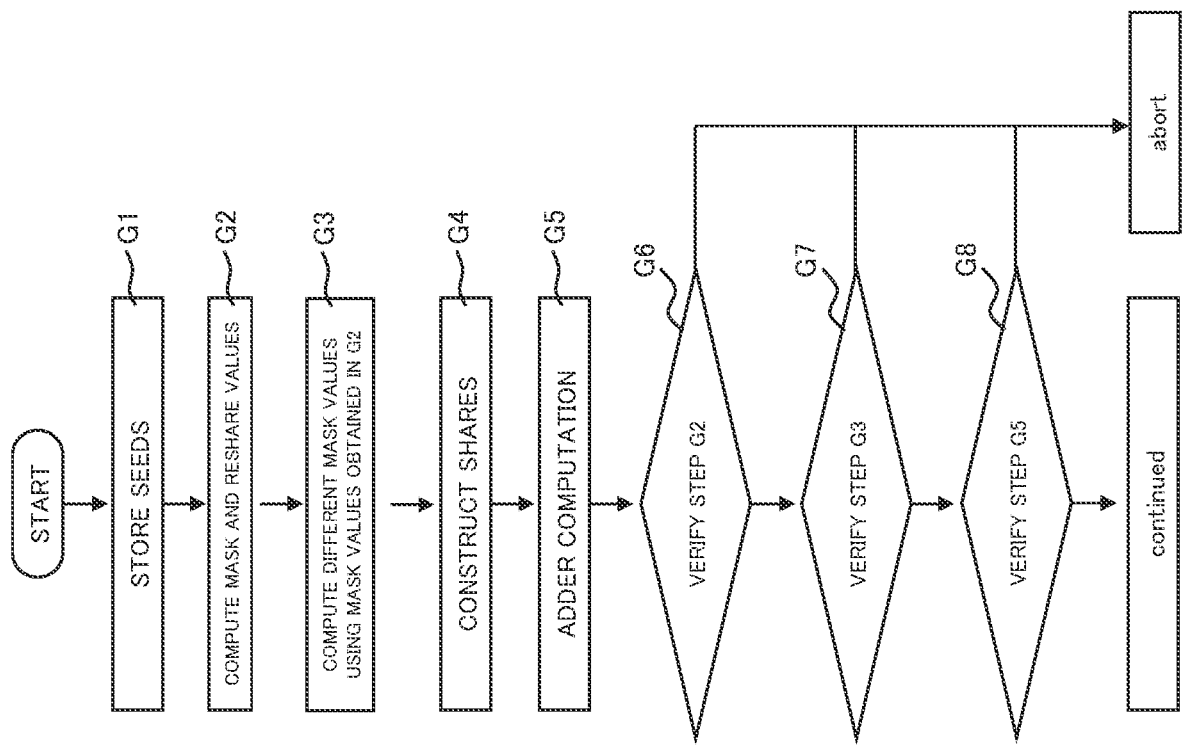
FIG. 24 is a flowchart showing an example of the operation by the type conversion system with respect to bit decomposition in the seventh example embodiment.

The following describes the flowchart regarding bit decomposition shown in FIG. 24.

(Step G1)

The basic operation seed storage parts 707_1, 707_2, 707_3, and 707_4 store the following, respectively.

($seed_1$, $seed_2$, $seed_4$),
($seed_2$, $seed_3$, $seed_4$),
($seed_3$, $seed_1$, $seed_4$),
($seed_1$, $seed_2$, $seed_3$).

The server apparatuses 700_1 to 700_4 share pseudorandom functions h,h'. Further, let $seed_i \in \{0,1\}^*$ (i=1, 2, 3, 4) and the pseudorandom functions h: $\{0,1\}^* \times \{0,1\}^* \to \{0,1\}^n$, h': $\{0,1\}^* \times \{0,1\}^* \to \{0,1\}$. The data storage parts 708_1 to 708_4 store the following, respectively.

$[x]_1^n$, $[x]_2^n$, $[x]_3^n$, $[x]_4^n$.

Further, with respect to $seed_i$, it is intended to create a situation where one of the parties (the server apparatuses 700_i (i=1, 2, 3, 4)) is unable to compute the output of h,h' and the other three parties are able to compute the output of h,h'. If this situation can be created, the handling of $seed_i$ is not particularly limited. Note that $seed_i$ herein is merely an example.

(Step G2)

The first, the second, and the third mask value computation parts 701_1, 701_2, and 701_3 compute r=h(sid||1,$seed_4$) and store r in the first, the second, and the third data storage parts 708_1, 708_2, and 708_3. The second mask value computation part 701_2 reads the share $[x]_2^n = (x_2, x_3)$ from the data storage part 708_2. The second mask value computation part 701_2 generates $y = 2x_2 + r$ and transmits y to the fourth server apparatus 700_4, which stores y in the fourth data storage part 708_4.

Next, the first, the second, and the third reshare value computation parts 702_1, 702_2, and 702_3 obtain $seed_4$ from the first, the second, and the third basic operation seed storage parts 707_1, 707_2 and 707_3, respectively. Then, the first, the second, and the third reshare value computation parts 702_1, 702_2, and 702_3 generate $r'|_j = (h(sid||2,seed_4))|_j$ (j=0, ... n−1). Further, the first reshare value computation part 702_1 stores $r'|_j$ (j=0, ... n−1) in the first data storage part 708_1. The third reshare value computation part 702_3 transmits $r'|_j$ (j=0, ... n−1) to the third share construction part 703_3. Further, the second reshare value computation part 702_2 reads $x_2$,r from the second data storage part 708_2 and transmits $(x_2-r)|_j \oplus r'|_j$ (j=0, ... n−1) to the fourth share construction part 703_4.

Here, sid∈$\{0,1\}^*$. For instance, sid is, a counter shared by each of the server apparatuses 700_1 to 700_4.

(Step G3)

From the second basic operation seed storage part 707_2, the second reshare value computation part 702_2 obtains $seed_3$. From the third basic operation seed storage part 707_3, the third reshare value computation part 702_3 obtains $seed_3$. From the fourth basic operation seed storage part 707_4, the fourth reshare value computation part 702_4 obtains $seed_3$. Further, from the fourth data storage part 708_4, the fourth reshare value computation part 702_4 obtains $y, [x]_4^n = (x_1-x_2, x_2-x_3)$.

Here, the second, the third, and the fourth reshare value computation parts 702_2, 702_3, and 702_4 compute $r'_j = h'(sid_j, seed_3)$ (j=0, ... , n−1). The second, the third, and the fourth reshare value computation parts 702_2, 702_3, and 702_4 transmit the result to the second, the third, and the fourth data storage parts 708_2, 708_3, and 708_4, respectively.

Further, using $y, [x]_4^n = (x_1-x_2, x_2-x_3)$, the fourth reshare value computation part 702_4 generates $z_j = ((x_1-x_2) + \{-(x_2-x_3)\} + y)|_1 \oplus r_j'' = (x_1+x_3+r)|_j \oplus r_j''$ and transmits it to the first and the fourth share construction parts 703_1 and 703_4. Likewise, the third reshare value computation part 702_4 generates $z_j' = (x_1+x_3+r)|_j \oplus r_j''$ and transmits it to the third share construction part 703_3 and the third data storage part 708_3.

Here, $sid_1 \in \{0,1\}^*$. For instance, $sid_j$ is, a counter shared by each of the server apparatuses 700_1 to 700_4.

(Step G4)

From the data storage parts 708_1, 708_2, 708_3, and 708_4, the share construction parts 703_1, 703_2, 703_3, and 703_4 read $([x]_1^n,r)$, $([x]_2^n,r)$, $([x]_3^n,r)$, $([x]_4^n,y)$ respectively, and construct shares with the following eight equations using the values transmitted in the steps G2 and G3.

$[(x_1+x_3+r)|_j]_1 = (z_j, 0)$, $[(x_1+x_3+r)|_j]_2 = (0, r_j'')$, $[(x_1+x_3+r)|_j]_3 = (r_j'', z_j)$, $[(x_1+x_3+r)|_j]_4 = (z_j, r_j'')$, $[(x_2-r)|_j]_1 = (r'|_j, (x_2-r)|_j)$, $[(x_2-r)|_j]_2 = ((x_2-r)|_j, r'|_j)$, $[(x_2-r)|_j]_3 = (r'|_j, r'|_j)$, $[(x_2-r)|_j]_4 = (r'|_j \oplus (x_2-r)|_j, (x_2-r)|_j \oplus r'|_j)$.

Here, for $x \in \mathbb{Z}_{2^n}$, $x|_j \in \mathbb{Z}_2$ denotes the j-th bit (j=0, ... , n−1) of x. $[(x_1+x_3+r)|_j]_i$, $[(x_2-r)|_j]_i$ are stored in each i-th data storage part 708_i.

In the eight equations in the step G4, when $(x_1+x_2+r)|_j = x_1'' \oplus x_2'' \oplus x_3''$, substitution can be made as follows.

$x_1'' = r''|_j$, $x_2'' = 0$, $x_3'' = z|_j = (x_1+x_3+r)|_j \oplus r''|_j$.

When computing the reshare values of the value x', since 4=0 as indicated above, each reshare value computation part 702_i generates random numbers so that x1' is equal to the random number r, x2' is zero, and x3' is where the exclusive OR of the random number r and the value x where the value x' is the exclusive OR of x1', x2', and x3'. In other words, the reshare value computation parts 702_i generate random numbers so that some reshare values are zero.

(Step G5)
By communicating with each other, the i-th logical operation parts 706_$i$ compute adder processing BitwiseAdd as follows. Here, BitwiseAdd is a process of receiving, for instance, $([a_1|_j])_{j=0}^{n-1}$, $([a_2|_j])_{j=0}^{n-1}$, as input and outputting $([(a_1+a_2)|_j])_{j=0}^{n-1}$.

$$([(x_1+x_2+x_3)|_j])_{j=0}^{n-1} \leftarrow \text{BitwiseAdd}(([(x_1+x_3+r)|_j])_{j=0}^{n-1}, ([(x_2-r)|_j])_{j=0}^{n-1}).$$

Here, since $x_1+x_2+x_3=x$, $([x|_j])_{j=0}^{n-1}$ can be computed. Note that $([x|_j])_{j=0}^{n-1}$ denotes a series of shares $[x|_0], \ldots, [x|_{n-1}]$. Each i-th logical operation part 706_$i$ stores $([x|_j]_i)_{j=0}^{n-1}$ in the data storage part 708_$i$ thereof.

(Step G6)
Like the second server apparatus 700_2 in the step G2, the first server apparatus 700_1 has the first mask value computation part 701_1 generate $y'=2x_2+r$ and transmits $y'$ to the fourth server apparatus 700_4, which stores $y'$ in the fourth data storage part 708_4. The fourth dishonesty detection part 704_4 reads y,y' from the fourth data storage part 708_4 and verifies if y=y' holds.

When y=y' holds, the fourth dishonesty detection part 704_4 broadcasts a string "success" to the server apparatuses 700_1, 700_2, and 700_3 and proceeds to the next step. When y=y' does not hold, the fourth dishonesty detection part 704_4 broadcasts a string "abort" to the server apparatuses 700_1, 700_2, and 700_3 and aborts the protocol.

The first reshare value computation part 702_1 reads $(x_2-r)|_j, r'|_j$ ($j=0, \ldots n-1$) from the first data storage part 708_1. Next, the first reshare value computation part 702_1 transmits $(x_2-r)|_j \oplus r'|_j$ ($j=0, \ldots n-1$) to the fourth dishonesty detection part 704_4, which reads $[(x_2-r)|_j]_4=(((x_2-r)|_j)_{4,1}, ((x_2-r)|_j)_{4,2})$ stored in the fourth data storage part 708_4 and verifies if $((x_2-r)|_j)_{4,1}=((x_2-r)|_j)_{4,2}=(x_2-r)|_j \oplus r'|_j$ holds.

When it holds, the fourth dishonesty detection part 704_4 broadcasts a string "success" to the server apparatuses 700_1, 700_2, 700_3, and 700_4 and proceeds to the next step. When it does not hold, the fourth dishonesty detection part 704_4 broadcasts a string "abort" to the server apparatuses 700_1, 700_2, 700_3, and 700_4 and aborts the protocol.

Further, when a large amount of type conversion processing is performed in parallel, y', $(x_2-r)|_j \oplus r'|_j$ may be verified by transmitting hash values for the value obtained by concatenating each value thereof and comparing the hash values. For the computational amount of the entire processing, the amount required to transmit the hash values can be regarded as negligible.

(Step G7)
The third dishonesty detection part 704_3 reads $z_j'$ from the third data storage part 708_3 and transmits $z_j'$ to the first dishonesty detection part 704_1, which reads $z_j$ from the first data storage part 708_1 and verifies if $z_j=z_j'$ holds. When $z_j=z_j'$ holds, the first dishonesty detection part 704_1 broadcasts a string "success" to the server apparatuses 700_2, 700_3, and 700_4 and proceeds to the next step. When $z_j=z_j'$ does not hold, the first dishonesty detection part 704_1 broadcasts a string "abort" to the server apparatuses 700_2, 700_3, and 700_4 and aborts the protocol.

Further, when a large amount of type conversion processing is performed in parallel, $z_j'$ may be verified by transmitting hash values for the value obtained by concatenating each value thereof and comparing the hash values. For the computational amount of the entire processing, the amount required to transmit the hash values can be regarded as negligible.

(Step G8)
Each i-th dishonesty detection part 704_$i$ performs dishonesty detection by comparing the transmitted/received data in BitwiseAdd in the step G5. When not detecting dishonesty, the first to the fourth server apparatuses 700_1, 700_2, 700_3, and 700_4 broadcast a string "success" to each server apparatus. When detecting dishonesty, the first to the fourth server apparatuses 700_1, 700_2, 700_3, and 700_4 broadcast a string "abort" to each server apparatus and abort the protocol. This is achieved by the above-described four-party secure computation capable of detecting dishonesty. The step G8 can be executed in parallel with the steps G6 and G7.

According to the seventh example embodiment of the present invention, the same effects as those of the first to the sixth example embodiments can be obtained. Further, the seventh example embodiment is superior to the other example embodiments in terms of the theoretical communication cost of bit decomposition. In the seventh example embodiment, bit decomposition can be achieved by performing the computation of BitwiseAdd once. When an n-bit ripple-carry adder is used to perform the processing with respect to dishonesty detection in parallel, the fifth example embodiment requires 8n−5 bits·n+1 rounds as the communication cost of bit decomposition. Therefore, the seventh example embodiment is more efficient than the other example embodiments in terms of the communication cost of bit decomposition. Further, the implementation of the disclosure of the present application is not limited to the n-bit ripple-carry adder. An n-bit carry-lookahead or parallel prefix adder may also be used.

[Hardware Configuration]
Next, the hardware configuration of the secure computation server constituting the secure computation system will be described.

Figure 25:
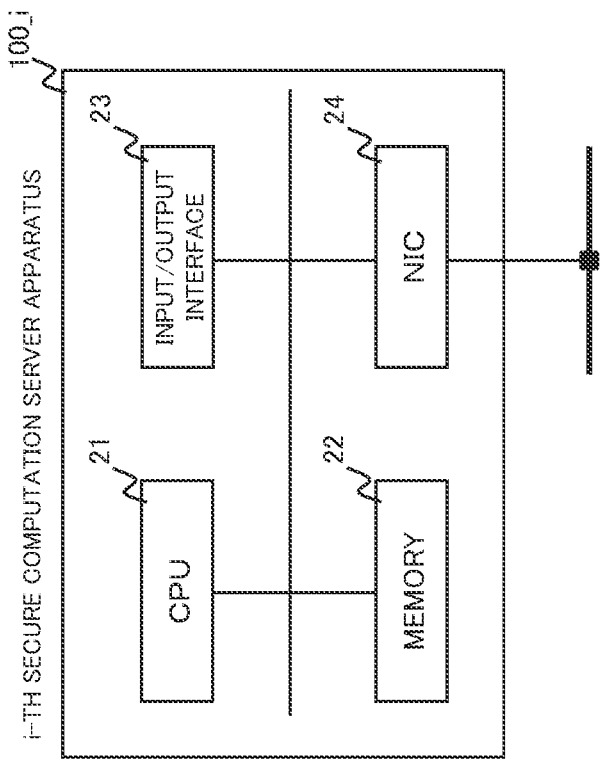
FIG. 25 is a drawing illustrating an example of the hardware configuration of the secure computation server apparatus.

FIG. 25 is a drawing illustrating an example of the hardware configuration of the i-th secure computation server apparatus 100_$i$. The i-th secure computation server apparatus 100_$i$ is realized by an information processing apparatus (computer) and comprises the configuration illustrated in FIG. 25. For instance, the i-th secure computation server apparatus 100_$i$ comprises a CPU (Central Processing Unit) 21, a memory 22, an input/output interface 23, and a NIC (Network Interface Card) 24, which is communication means. These elements are interconnected by an internal bus.

It should be noted that the configuration shown in FIG. 25 is not intended to limit the hardware configuration of the i-th secure computation server apparatus 100_$i$. The i-th secure computation server apparatus 100_$i$ may include hardware not shown in the drawing. The example of FIG. 25 is not intended to limit the number of CPUs, etc., included in the i-th secure computation server apparatus 100_$i$ and for instance, a plurality of the CPUs 21 may be included in the i-th secure computation server apparatus 100_$i$.

The memory 22 is a RAM (Random Access Memory), ROM (Read-Only Memory), or auxiliary storage device (such as a hard disk).

The input/output interface 23 is an interface for an input/output device not shown in the drawing. For instance, the input/output device may be a display device, an operation device, etc. An example of the display device is a liquid crystal display. Examples of the operation devices are a keyboard and a mouse.

The functions of the i-th secure computation server apparatus 100_$i$ are realized by the processing modules described above. For instance, these processing modules are realized by causing the CPU 21 to execute a program stored in the memory 22. This program may be downloaded via a network or updated using a storage medium storing the program. Further, the processing modules may be realized by a semiconductor chip. In other words, the functions performed by the processing modules may be realized by some kind of hardware or by software utilizing and running on hardware.

[Variation]

It should be noted that the configuration and operation of the secure computation verification systems described in the first to the seventh example embodiments are examples and various variations are possible. For instance, the four secure computation server apparatuses 100_1 to 100_4 are equal to each other in the example embodiments above, however, one of the server apparatuses may be designated as a representative server. In this case, the representative server may control the input/output of data used for secure computation (sharing and distributing input data, decoding the computation results).

Although a plurality of steps (processes) is described in order in the flowcharts used in the above description, the execution order of the steps performed in each example embodiment is not limited to the order in the description thereof. In each example embodiment, the order of the illustrated steps can be changed, such as executing the processes in parallel, as long as no substantial problem occurs. Further, the example embodiments described above can be combined as long as no substantial conflict with each other arises. In other words, any combination of the example embodiments is included as another example embodiment.

Although a plurality of steps (processes) is described in order in the flowcharts used in the above description, the execution order of the steps performed in each example embodiment is not limited to the order in the description thereof. In each example embodiment, the order of the illustrated steps can be changed, such as executing the processes in parallel, as long as no substantial problem occurs. Further, the example embodiments described above can be combined as long as no substantial conflict with each other arises. In other words, any combination of the example embodiments is included as another example embodiment.

The industrial applicability of the present invention is clear from the above description. For instance, the present invention is suitable for efficiently performing mixed-circuit computation such as biometric template matching and statistical computation by means of four-party secure computation using 2-out-of-4 replicated secret sharing executed over the ring of $\mathbb{Z}_{2^n}$ and capable of detecting dishonesty. Further, the present invention achieves different type conversions that achieve a tradeoff between the communication volume and the number of communication rounds by changing the circuit used when performing addition. As a result, type conversion can be efficiently performed according to the communication environment. In other words, a mixed circuit using type conversion as a subroutine can be efficiently executed by the above-described four-party secure computation according to the communication environment.

Some or all of the example embodiments above can be described as (but not limited to) the following Supplementary Notes.

[Supplementary Note 1]
As the information processing apparatus relating to the first aspect.

[Supplementary Note 2]
The information processing apparatus preferably according to Supplementary Note 1 further comprising a dishonesty detection part that detects the presence of a dishonest party using the data regarding the generated random number.

[Supplementary Note 3]
The information processing apparatus preferably according to Supplementary Note 2 further comprising a logical operation part that performs a logical operation on the type-converted share, wherein the logical operation part communicates with other apparatuses to execute a process of adding the type-converted shares, and the dishonesty detection part detects the presence of a dishonest party using data exchanged for the process of adding the type-converted shares.

[Supplementary Note 4]
The information processing apparatus preferably according to Supplementary Note 3, wherein, the logical operation part communicates with other apparatuses to execute a process of computing carries for the type-converted shares, and
the dishonesty detection part detects the presence of a dishonest party using data exchanged for the process of computing carries for the type-converted shares.

[Supplementary Note 5]
The information processing apparatus preferably according to Supplementary Note 4, wherein
the carry computation process can be divided into a first element and a second element following the first element, and
the logical operation part computes the first element without communicating with other apparatuses and performs communication required to compute the share reshare value and communication required for a carry computation process of the second element in parallel.

[Supplementary Note 6]
The information processing apparatus preferably according to any one of Supplementary Notes 1 to 5 further comprising a mask value computation part that computes a mask value for masking a share and transmits a share masked by the computed mask value to other apparatuses, wherein
the share construction part constructs the share for type conversion using the transmitted mask value.

[Supplementary Note 7]
The information processing apparatus preferably according to any one of Supplementary Notes 1 to 6, wherein
when computing reshare values of a value x, the reshare value computation part generates a random number so that two values out of x1, x2, and x3 are equal where the value x is the exclusive OR of x1, x2, and x3.

[Supplementary Note 8]
The information processing apparatus preferably according to Supplementary Note 7, wherein
when computing reshare values of a value x', the reshare value computation part lets x1' be equal to a random number r, x2' be zero, and x3' be the exclusive OR of the random number r and the value x where the value x' is the exclusive OR of x1', x2', and x3'.

[Supplementary Note 9]
The information processing apparatus preferably according to any one of Supplementary Notes 1 to 8, wherein
the reshare value computation part feeds the seed and a counter value shared with other apparatuses to a pseudorandom function to generate the random number using the seed.

[Supplementary Note 10]
The information processing apparatus preferably according to any one of Supplementary Notes 1 to 9, wherein
the share for type conversion is a share for bit decomposition or a share for ring composition.

[Supplementary Note 11]
As the secure computation method relating to the second aspect.

[Supplementary Note 12]
As the program relating to the third aspect.

Further, like the mode of Supplementary Note 1, the modes of Supplementary Notes 11 and 12 can be developed into the modes of Supplementary Notes 2 to 10.

Further, the disclosure of each Non-Patent Literature cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select (or partially remove) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof.

REFERENCE SIGNS LIST

10: information processing apparatus
11, 1071, 2071, 3071, 4071, 5071, 6071, 7071, 107_$i$ to 707_$i$: basic operation seed storage part
12, 1021, 2021, 3021, 4021, 502-1, 6021, 7021, 102_$i$ to 702_$i$: reshare value computation part
13, 103_1, 203_1, 303_1, 403-1, 503_1, 603_1, 703_1, 103_$i$ to 703_$i$: share construction part
21: CPU (Central Processing Unit)
22: memory
23: input/output interface
24: NIC (Network Interface Card)
100_1 to 1004, 200_1 to 2004, 300_1 to 3004, 400_1 to 4004, 500_1 to 5004, 6001 to 6004, 700_1 to 7004, 100_$i$ to 700_$i$: secure computation server apparatus
501_1, 601_1, 701_1, 501_$i$ to 501_$i$: mask value computation part
1041, 2041, 3041, 4041, 5041, 6041, 7041, 104_$i$ to 704_$i$: dishonesty detection part
1051, 2051, 3051, 4051, 5051, 6051, 7051, 105_$i$ to 705_$i$: arithmetic operation part
1061, 2061, 3061, 4061, 5061, 6061, 7061, 106_$i$ to 706_$i$: logical operation part
1081, 2081, 3081, 4081, 5081, 6081, 7081, 108_$i$ to 708_$i$: data storage part

What is claimed is:

1. An information processing apparatus comprising:
at least a processor; and
a memory in circuit communication with the processor, wherein the processor is configured to execute program instructions stored in the memory to implement:
a data storage part that stores a share that is secret, the share shared among four apparatuses including the information processing apparatus;
a basic operation seed storage part that stores a seed for generating a random number used in computing the share;
a reshare value computation part that generates the random number using the seed, computes a reshare value of the share using the generated random number, and transmits data regarding the generated random number to other of the four apparatuses; and
a share construction part that converts the share to a type-converted share while maintaining a share format before and after conversion, using the data regarding the generated random number and the reshare value as received from the other of the four apparatuses.

2. The information processing apparatus according to claim 1, further comprising a dishonesty detection part that detects presence of a dishonest party using the data regarding the generated random number.

3. The information processing apparatus according to claim 2, further comprising a logical operation part that performs a logical operation on the type-converted share, wherein
the logical operation part communicates with the other of the four apparatuses to execute a process of adding the type-converted share as converted by each of the four apparatuses, and
the dishonesty detection part detects the presence of the dishonest party using data exchanged with the other of the four apparatuses for the process of adding.

4. The information processing apparatus according to claim 3, wherein
the logical operation part communicates with the other of the four apparatuses to execute a process of computing carries for the type-converted share as converted by each of the four apparatuses, and
the dishonesty detection part detects the presence of the dishonest party using data exchanged with the other of the four apparatuses for the process of computing carries.

5. The information processing apparatus according to claim 4, wherein
the carry computation process is dividable into a first element and a second element following the first element, and
the logical operation part computes the first element without communicating with the other of the four apparatuses and performs communication required to compute the reshare value and communication required for the processing of computing carries of the second element in parallel.

6. The information processing apparatus according to claim 1, further comprising a mask value computation part that computes a mask value for masking the share and transmits the share masked by the computed mask value to other apparatuses, wherein
the share construction part converts the share to the type-converted share using the transmitted mask value.

7. The information processing apparatus according to claim 1, wherein
when computing the reshare value of a value x, the reshare value computation part generates the random number so that two values out of $x_1$, $x_2$, and $x_3$ are equal where the value x is the exclusive OR of $x_1$, $x_2$, and $x_3$.

8. The information processing apparatus according to claim 7, wherein
when computing the reshare value of a value x', the reshare value computation part lets $x_1'$ be equal to a random number r, $x_2'$ be zero, and $x_3'$ be the exclusive OR of the random number r and the value x where the value x' is the exclusive OR of $x_1'$, $x_2'$, and $x_3'$.

9. A secure computation method performed by an information processing apparatus and comprising:

storing a share that is secret, the share shared among four apparatuses including the information processing apparatus;

generating a random number using a seed;

computing a reshare value of the share using the generated random number and transmitting data regarding the generated random number to other of the four apparatuses; and converting the share to a type-converted share while maintaining a share format before and after conversion, using the data regarding the generated random number and the reshare value as received from the other of the four apparatuses.

10. The secure computation method according to claim 9, further including:

detecting presence of a dishonest party using the data regarding the generated random number.

11. The secure computation method according to claim 10, further including:

communicating with the other of the four apparatuses to execute a process of adding the type-converted share as converted by each of the four apparatuses, wherein detecting the presence of the dishonest party uses data exchanged with the other of the four apparatuses for the process of adding.

12. The secure computation method according to claim 10, further including:

communicating with the other of the four apparatuses to execute a process of computing carries for the type-converted share as converted by each of the four apparatuses, wherein detecting the presence of the dishonest party uses the data exchanged with the other of the four apparatuses for the process of computing carries.

13. The secure computation method according to claim 12, wherein the carry computation process is dividable into a first element and a second element following the first element, and the secure computation method comprises:

computing the first element without communicating with the other of the four apparatuses; and performing communication required to compute the reshare value and communication required for the processing of computing carries of the second element in parallel.

14. The secure computation method according to claim 9, further comprising:

computing a mask value for masking the share; and transmitting the share masked by the computed mask value to the other of the four apparatuses, wherein the constructing converting the share to the type-converted share uses the transmitted mask value.

15. The secure computation method according to claim 9, further comprising:

computing the reshare value of a value x; and generating the random number so that two values out of $x_1$, $x_2$, and $x_3$ are equal where the value x is the exclusive OR of $x_1$, $x_2$, and $x_3$.

16. The secure computation method according to claim 15, further including:

computing the reshare value of a value x', wherein $x_1'$ is equal to a random number r, $x_2'$ is zero, and $x_3'$ is the exclusive OR of the random number r and the value x where the value x' is the exclusive OR of $x_1'$, $x_2'$, and $x_3'$.

17. A non-transitory computer readable medium storing a program executable by an information processing apparatus to perform processing comprising:

storing a share that is secret, the share shared among four apparatuses including the information processing apparatus;

generating a random number using a seed;

computing a reshare value of the share using the generated random number and transmitting data regarding the generated random number to other of the four apparatuses; and converting the share to a type-converted share while maintaining a share format before and after conversion, using the data regarding the generated random number and the reshare value as received from the other of the four apparatuses.

18. The non-transitory computer readable medium storing the program according to claim 17, the processing further comprising:

detecting presence of a dishonest party using the data regarding the generated random number.

19. The non-transitory computer readable medium storing the program according to claim 18, further comprising:

communicating with the other of the four apparatuses to execute a process of adding the type-converted share as converted by each of the four apparatuses, wherein detecting the presence of the dishonest party uses data exchanged with the other of the four apparatuses for the process of adding.

20. The non-transitory computer readable medium storing the program according to claim 18, further comprising:

communicating with the other of the four apparatuses to execute a process of computing carries for the type-converted share as converted by each of the four apparatuses, wherein detecting the presence of the dishonest party uses the data exchanged with the other of the four apparatuses for the process of computing carries.

* * * * *